US010663745B2

(12) United States Patent
Ouderkirk et al.

(10) Patent No.: US 10,663,745 B2
(45) Date of Patent: May 26, 2020

(54) OPTICAL SYSTEM

(71) Applicant: 3M INNOVATIVE PROPERTIES COMPANY, St. Paul, MN (US)

(72) Inventors: Andrew J. Ouderkirk, St. Paul, MN (US); Erin A. McDowell, Afton, MN (US); Timothy L. Wong, St. Paul, MN (US); Zhisheng Yun, Woodbury, MN (US); Jo Anne Etter, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 144 days.

(21) Appl. No.: 15/671,272

(22) Filed: Aug. 8, 2017

(65) Prior Publication Data
US 2017/0357100 A1    Dec. 14, 2017

Related U.S. Application Data

(63) Continuation of application No. PCT/US2017/034954, filed on May 30, 2017.
(Continued)

(51) Int. Cl.
*G02B 27/28* (2006.01)
*G02B 27/09* (2006.01)
(Continued)

(52) U.S. Cl.
CPC .............. *G02B 27/281* (2013.01); *F21V 5/02* (2013.01); *F21V 5/04* (2013.01); *G02B 3/0056* (2013.01);
(Continued)

(58) Field of Classification Search
CPC .... G02B 27/281; G02B 27/0922; G02B 3/04; G02B 27/0172; G02B 19/0028;
(Continued)

(56) References Cited

U.S. PATENT DOCUMENTS 5,347,400 A    9/1994  Hunter
5,561,538 A    10/1996 Kato et al.
(Continued)

FOREIGN PATENT DOCUMENTS

AT        11607       1/2011
CN        205246924   5/2016
(Continued)

OTHER PUBLICATIONS

International Search Report for PCT International Application No. PCT/US2017034954 dated Dec. 28, 2017, 7 pages.
(Continued)

*Primary Examiner* — Charles S Chang
(74) *Attorney, Agent, or Firm* — Clifton F. Richardson

(57) ABSTRACT

Light emitting systems and optical systems including a light emitting system and a lens system are described. The light emitting system includes a pixelated light source having a plurality of discrete spaced apart pixels, and includes a plurality of light redirecting elements, each light redirecting element corresponding to a different pixel in the plurality of pixels. The light redirecting elements may be adapted to alter one or both of a central ray direction and a divergence angle of light received from the corresponding pixel. A lens system disposed to receive light from the light emitting system may include a reflective polarizer and a partial reflector.

21 Claims, 29 Drawing Sheets

Related U.S. Application Data

(60) Provisional application No. 62/347,650, filed on Jun. 9, 2016.

(51) Int. Cl.

| | | |
|---|---|---|
| *F21V 5/02* | (2006.01) | |
| *F21V 5/04* | (2006.01) | |
| *H04N 9/31* | (2006.01) | |
| *G02B 3/04* | (2006.01) | |
| *G02B 27/01* | (2006.01) | |
| *G02B 19/00* | (2006.01) | |
| *F21V 8/00* | (2006.01) | |
| *G02B 3/00* | (2006.01) | |
| *G02B 17/08* | (2006.01) | |

(52) U.S. Cl.
CPC ............. *G02B 3/04* (2013.01); *G02B 6/0048* (2013.01); *G02B 19/0028* (2013.01); *G02B 19/0047* (2013.01); *G02B 27/0172* (2013.01); *G02B 27/0922* (2013.01); *H04N 9/315* (2013.01); *H04N 9/3164* (2013.01); *G02B 17/0804* (2013.01); *G02B 17/0868* (2013.01); *G02B 27/283* (2013.01)

(58) Field of Classification Search
CPC ......................... G02B 19/0047; G02B 6/0048; G02B 3/0056; G02B 17/0868; G02B 27/283; G02B 17/08; H04N 9/3164; H04N 9/315; F21V 5/04; F21V 5/02
USPC ...................................... 349/11–13
See application file for complete search history.

(56) References Cited

U.S. PATENT DOCUMENTS

| | | | |
|---|---|---|---|
| 6,570,324 | B1 | 5/2003 | Tutt et al. |
| 7,318,646 | B2 | 1/2008 | Bernard et al. |
| 7,328,638 | B2 | 2/2008 | Gardiner et al. |
| 7,350,442 | B2 | 4/2008 | Ehnes et al. |
| 7,583,444 | B1 | 9/2009 | DeVoe et al. |
| 8,343,622 | B2 | 1/2013 | Liu et al. |
| 2002/0079289 | A1 | 6/2002 | Doh |
| 2003/0052616 | A1 | 3/2003 | Antoniadis et al. |
| 2004/0042198 | A1 | 3/2004 | Cok |
| 2005/0117347 | A1 | 6/2005 | Melpignano et al. |
| 2006/0114365 | A1 | 6/2006 | Takahashi |
| 2006/0227427 | A1 | 10/2006 | Dolgoff |
| 2007/0034890 | A1 | 2/2007 | Daschner et al. |
| 2007/0097277 | A1* | 5/2007 | Hong ................. G02B 3/14 349/11 |
| 2008/0204731 | A1 | 8/2008 | Williams |
| 2013/0321913 | A1 | 12/2013 | Harrold et al. |
| 2014/0168783 | A1 | 6/2014 | Luebke et al. |
| 2015/0049390 | A1 | 2/2015 | Lanman et al. |
| 2015/0160404 | A1* | 6/2015 | Robinson ............ G02B 6/0068 359/464 |
| 2017/0068030 | A1 | 3/2017 | Ambur et al. |
| 2017/0068100 | A1 | 3/2017 | Ouderkirk et al. |
| 2017/0146714 | A1 | 5/2017 | Ambur et al. |

FOREIGN PATENT DOCUMENTS

| | | |
|---|---|---|
| DE | 102010063608 | 6/2012 |
| JP | 2002049326 | 2/2002 |
| JP | 2008-003245 | 1/2008 |
| JP | 2010-086661 | 4/2010 |
| WO | WO 00-48037 | 8/2000 |
| WO | WO 01-33598 | 5/2001 |
| WO | WO 2003-007663 | 1/2003 |
| WO | WO 2005-024492 | 3/2005 |
| WO | WO 2006-134536 | 12/2006 |
| WO | WO 2008-001241 | 1/2008 |
| WO | WO 2010-036070 | 4/2010 |
| WO | WO 2010-012276 | 10/2010 |
| WO | WO 2011-045904 | 4/2011 |
| WO | WO 2015-077718 | 5/2015 |

OTHER PUBLICATIONS

Fattal, "A multi-directional backlight for a wide-angle, grasses-free three dimensional display", Nature, vol. 495, pp. 348-351, Mar. 21, 2013.

* cited by examiner

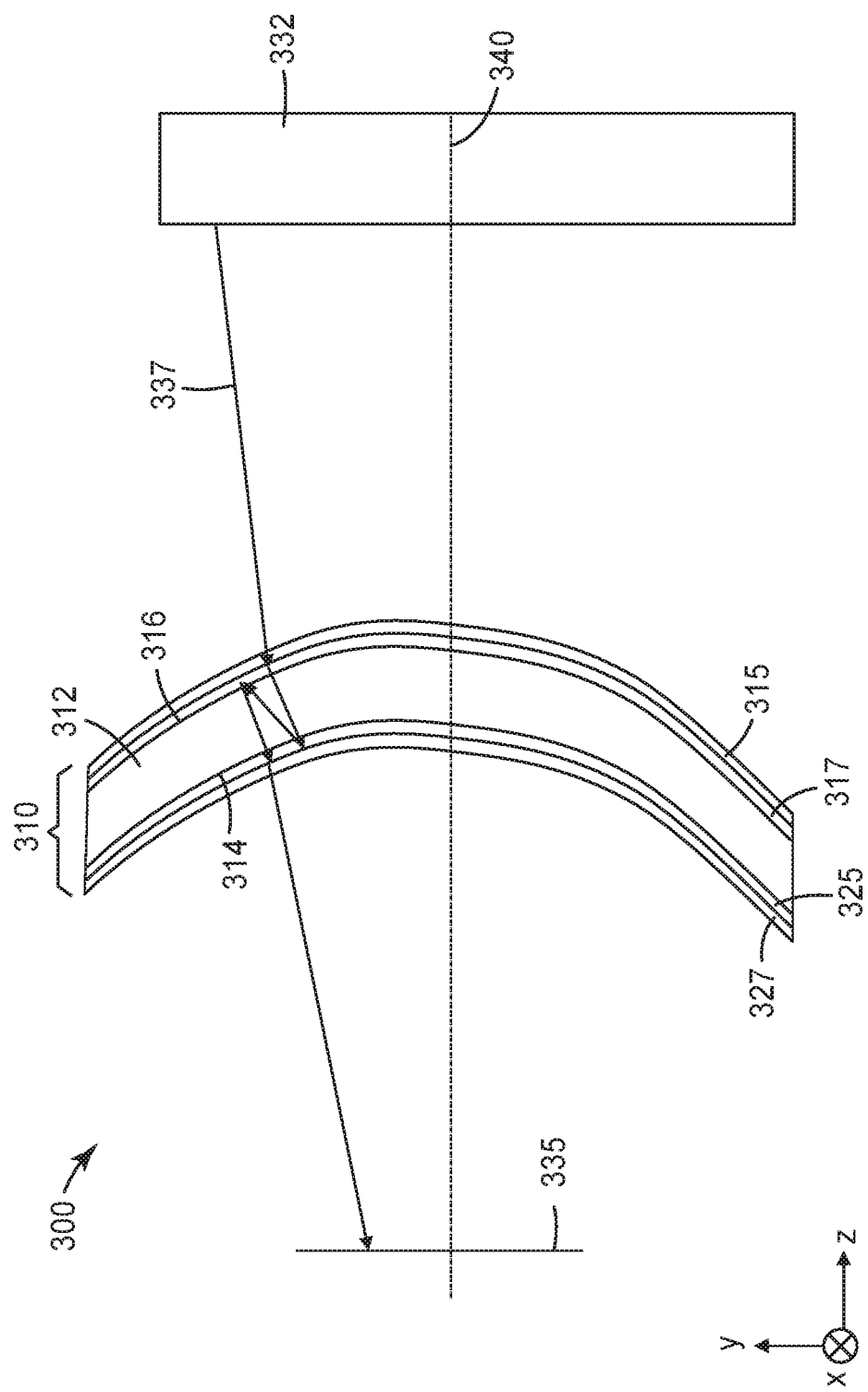

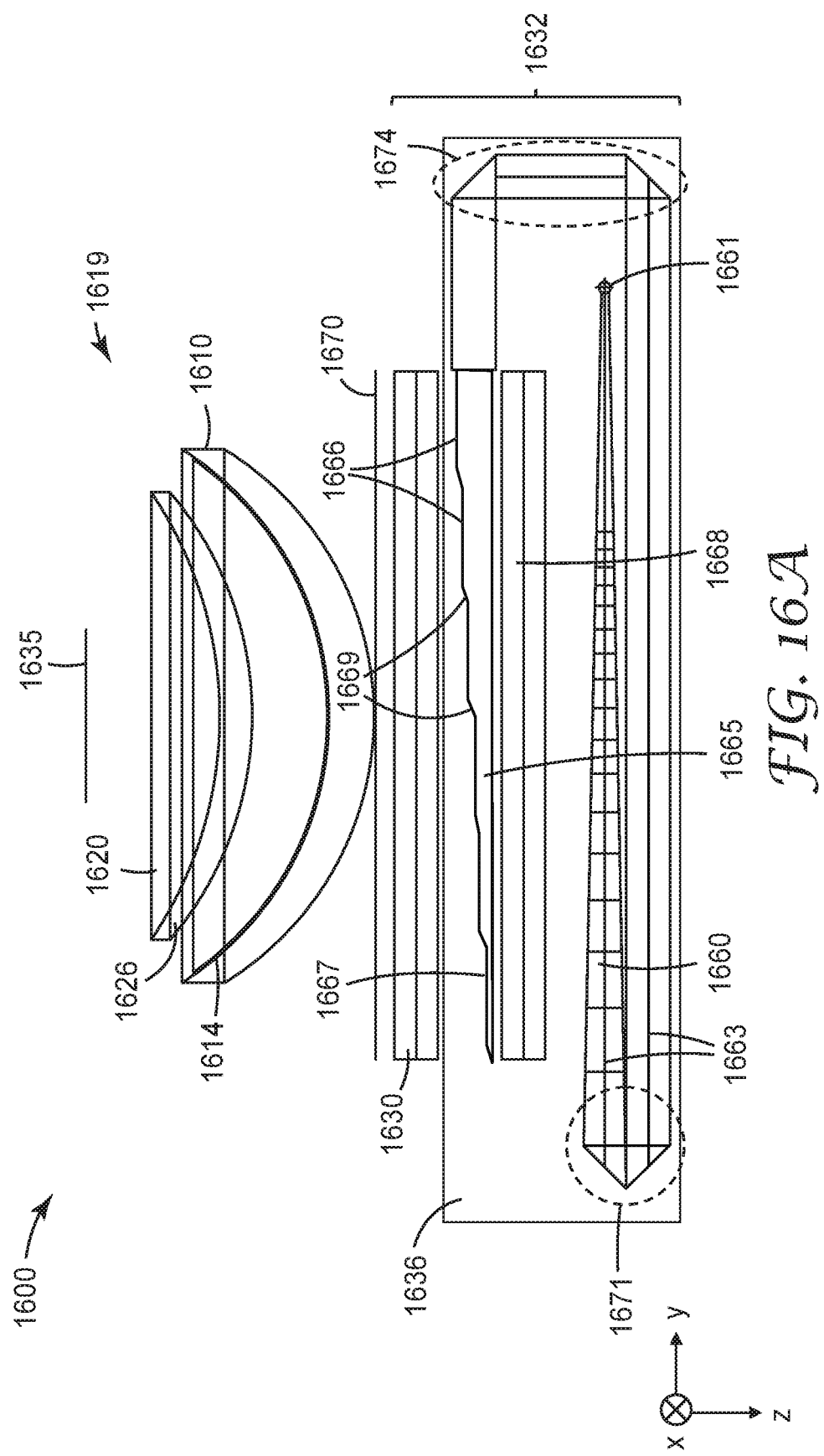

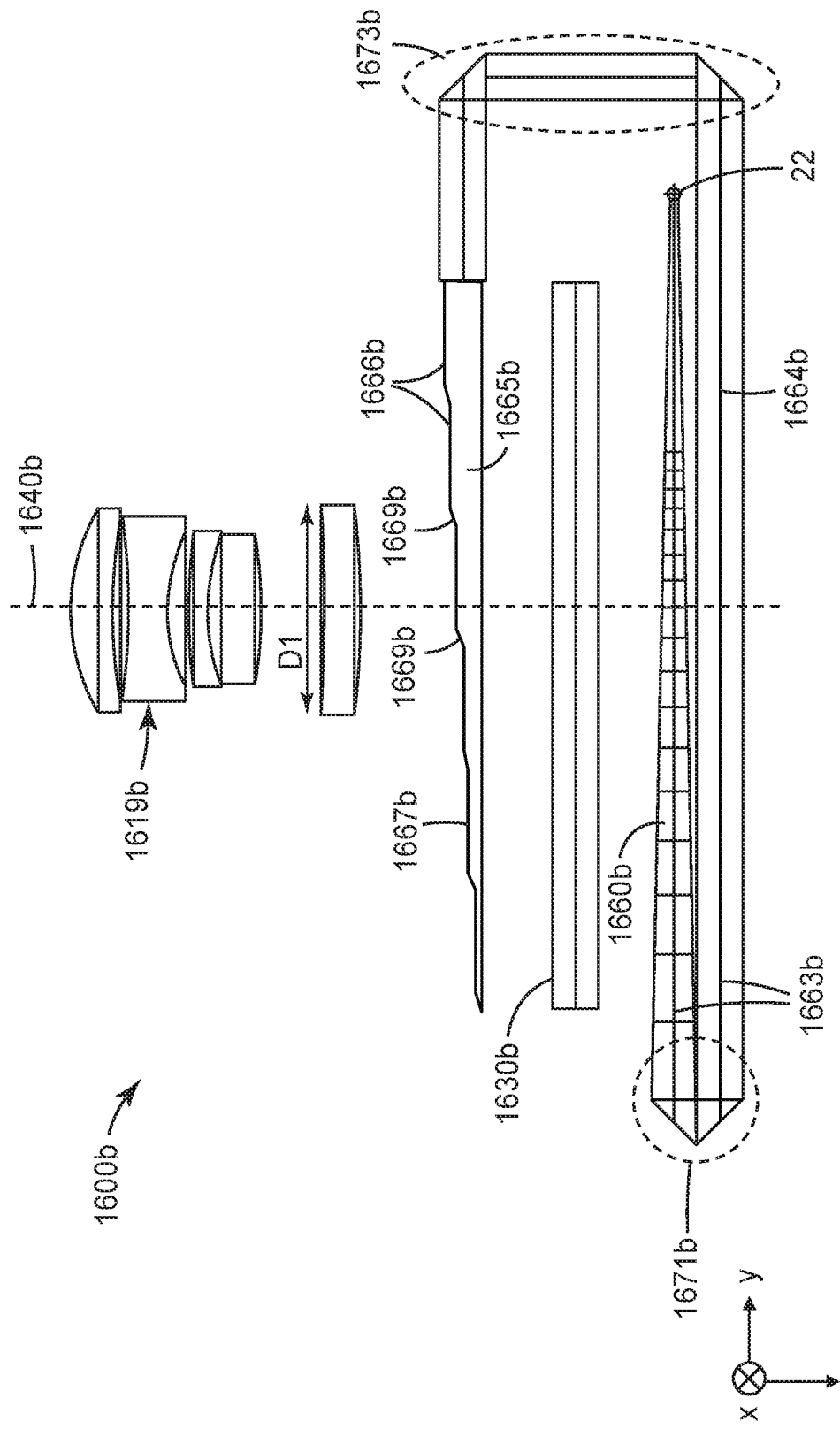

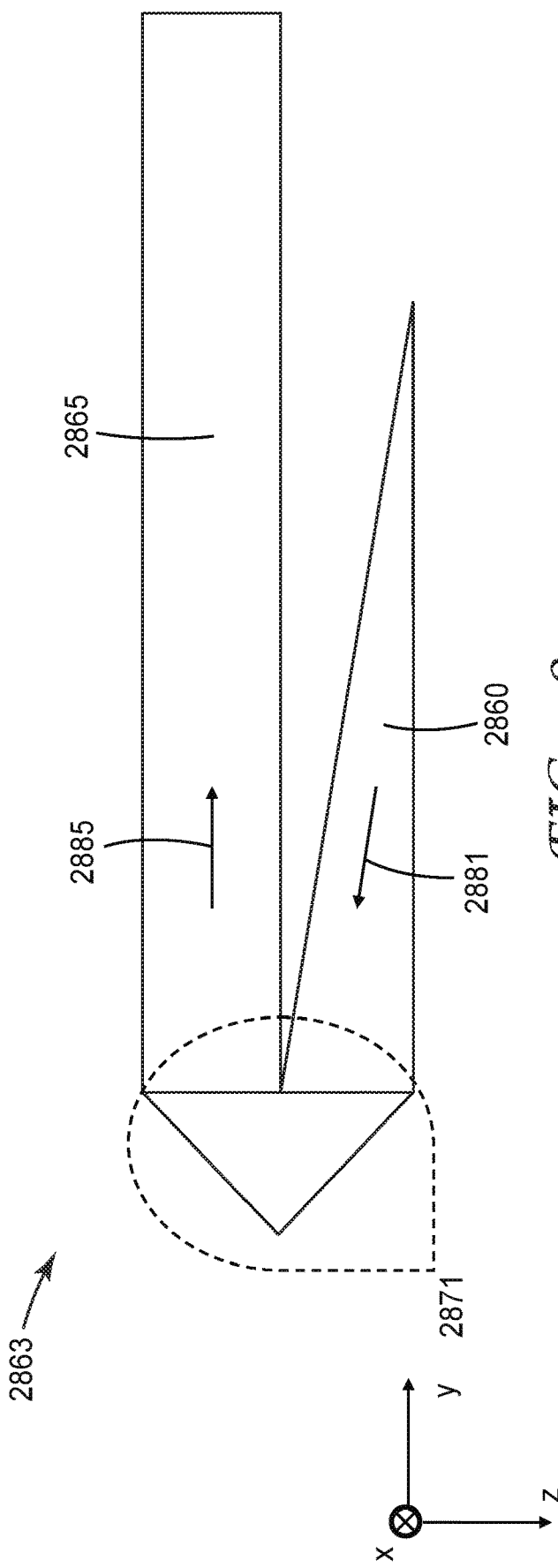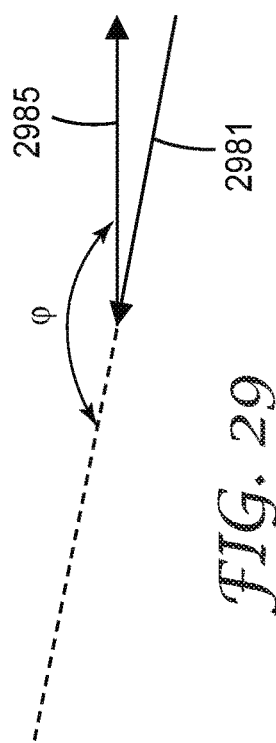

OPTICAL SYSTEM

BACKGROUND

An optical system may include a display panel and a lens system that receives light from the display panel and directs the light to a viewer's eye.

SUMMARY

In some aspects of the present description, a light emitting system including a pixelated light source and a plurality of light redirecting elements are provided. The pixelated light source includes a plurality of discrete spaced apart pixels. Each light redirecting element corresponding to a different pixel in the plurality of pixels and receives a first diverging light emitted by the pixel having a first cone angle and transmits the received light as a second diverging light having a second cone angle greater than about 15 degrees and less than the first cone angle.

In some aspects of the present description, a light emitting system including a pixelated light source and a concave light redirecting surface concave toward the light source is provided. The light source includes a plurality of groups of discrete spaced apart pixels. Each different portion of the light redirecting surface corresponds to a different group of pixels in the plurality of pixels and receives a first diverging light emitted by a pixel in the group of pixels having a first cone angle and transmits the received light as a second diverging light having a second cone angle less than the first cone angle. No two different groups of pixels contain a common pixel.

In some aspects of the present description, a display system including a pixelated display emitting a first image and comprising a plurality of discrete spaced apart pixels, and including a plurality of light redirecting elements disposed in front of the plurality of the pixels is provided. Each light redirecting element corresponds to a different group of pixels in the plurality of pixels, each group of pixels includes at least one pixel, and the plurality of light redirecting elements form a virtual second image of the first image behind the plurality of pixels.

In some aspects of the present description, a display system including a pixelated display comprising a plurality of discrete spaced apart pixels, and a plurality of light redirecting elements disposed in front of the plurality of pixels is provided. Each light redirecting element corresponds to a different group of pixels in the plurality of pixels and forms a virtual image of the pixel behind the pixel. Each group of pixels includes at least one pixel.

In some aspects of the present description, an imaging system including a pixelated light source comprising a plurality of discrete spaced apart pixels, and a plurality of lenses is provided. Each pixel emits a cone of light centered on a cone axis. Each lens is centered on a lens axis and corresponds to a different pixel in the plurality of pixels. The lens axis of each lens is parallel to the cone axis of the light emitted by the pixel corresponding to the lens. The lens axis of at least one lens is offset relative to the cone axis of the light emitted by the pixel corresponding to the at least one lens. At least two lenses in the plurality of lenses form images of the corresponding pixels at different distances from the at least two lenses.

In some aspects of the present description, an imaging system including a pixelated light source comprising a plurality of discrete spaced apart pixels, and a plurality of lenses is provided. Each pixel emits a cone of light centered on a cone axis and each lens corresponds to a different pixel in the plurality of pixels. At least two lenses in the plurality of lenses form images of the corresponding pixels at different distances from the at least two lenses.

In some aspects of the present description, an optical system including a pixelated surface comprising a plurality of discrete spaced apart pixels, and a plurality of lenses is provided. Each lens corresponds to a different pixel in the plurality of pixels. Each lens in the plurality of lenses forming an image of the corresponding pixel in an image surface not parallel to the pixelated surface.

In some aspects of the present description, an optical system including a pixelated display surface comprising a plurality of discrete spaced apart pixels, and an optical stack is provided. The optical stack includes a light redirecting layer adjacent the display surface and comprising at least one light redirecting element; a partial reflector having an average optical reflectance of at least 30% in a desired plurality of wavelengths; and a reflective polarizer substantially transmitting light having a first polarization state and substantially reflecting light having an orthogonal second polarization state. Each light redirecting element corresponds to a different group of pixels in the plurality of pixels and each group of pixels includes at least one pixel.

In some aspects of the present description, a display system including a pixelated system comprising a plurality of pixels, and an optical lens system is provided. The optical lens system includes a partial reflector having an average optical reflectance of at least 30% in a desired plurality of wavelengths. The optical lens system is adapted to receive light from the pixelated system and transmit light through an exit pupil. For each pixel in the plurality of pixels, the pixelated system is adapted to emit a cone of light centered on a cone axis, where the cone axis makes a cone axis angle to an axis normal to the pixel, and the cone axis angle for at least some pixels is different than the cone axis angle for at least some other pixels.

In some aspects of the present description, a display system including a pixelated display comprising a plurality of discrete spaced apart pixels; an optical lens system; and a light redirecting layer disposed between the pixelated display and the optical lens system is provided. The optical lens system has an acceptance angle and includes a partial reflector having an average optical reflectance of at least 30% in a desired plurality of wavelengths; and a reflective polarizer substantially transmitting light having a first polarization state and substantially reflecting light having an orthogonal second polarization state. A total luminous energy emitted by the pixelated display that is within the acceptance angle of the optical lens system is at least 30 percent higher than that of an otherwise equivalent display system not including the light redirecting layer.

In some aspects of the present description, a display system including a pixelated display comprising a plurality of discrete spaced apart pixels; an optical lens system; a light redirecting layer disposed between the pixelated display and the optical lens system; and an exit pupil is provided. The optical lens system includes a partial reflector having an average optical reflectance of at least 30% in a desired plurality of wavelengths; and a reflective polarizer substantially transmitting light having a first polarization state and substantially reflecting light having an orthogonal second polarization state. A brightness of the display system at the exit pupil is at least 30 percent higher than that of an otherwise equivalent display system not including the light redirecting layer.

In some aspects of the present description, an optical system including an optical lens system and a plurality of light redirecting elements is provided. The optical lens system has an optical axis and includes a partial reflector having an average optical reflectance of at least 30% in a desired plurality of wavelengths; and a reflective polarizer substantially transmitting light having a first polarization state and substantially reflecting light having an orthogonal second polarization state. Each light redirecting element is adapted to receive a first cone of light having a central ray and transmit the received light as a second cone of light towards the optical lens system. At least some of the light redirecting elements are adapted to bend the central ray toward or away from the optical axis.

In some aspects of the present description, a lens system including a partial reflector having an average optical reflectance of at least 30% in a desired plurality of wavelengths; a reflective polarizer adjacent to and spaced apart from the partial reflector, the reflective polarizer substantially transmitting light having a first polarization state and substantially reflecting light having an orthogonal second polarization state; and a first optical lens having an outer major surface, the outer major surface comprising a plurality of light redirecting elements. Each light redirecting element adapted to receive a first cone of light and transmit the received light as a second cone of light towards the partial reflector.

In some aspects of the present description, a display including a pixelated system comprising a plurality of groups of pixels, each group of pixels comprising at least one pixel; a plurality of light redirecting elements, each light redirecting element corresponding to a different group of pixels in the plurality of groups of pixels; and an exit pupil is provided. Each pixel emits a cone of light having a chief light ray passing through a center of the exit pupil and a central light ray. For at least one pixel, the light redirecting element corresponding to the pixel reduces an angle between the central light ray and the chief light ray emitted by the pixel.

In some aspects of the present description, a display system comprising a plurality of light emitting pixels is provided. Each light emitting pixel includes an optically transparent first light redirecting element having an average optical transmittance of at least 50% in a desired plurality of wavelengths; an optically reflecting concave second light redirecting element concave toward the first light redirecting element and having an average optical reflectance of at least 50% in the desired plurality of wavelengths; and a light emitting material disposed between the first and second light redirecting elements. A center of the second light redirecting element lies within the light emitting material.

In some aspects of the present description, a display system comprising a plurality of light emitting pixels is provided. Each light emitting pixel includes an optically transparent first light redirecting element having an average optical transmittance of at least 50% in a desired plurality of wavelengths; an optically reflecting concave second light redirecting element concave toward the first light redirecting element and having an average optical reflectance of at least 50% in the desired plurality of wavelengths; and a light emitting material disposed between the first and second light redirecting elements. Light emitted by the light emitting material is substantially collimated by the first and second light redirecting elements.

In some aspects of the present description, a display system including a plurality of light emitting pixels, and an optical lens system is provided. Each light emitting pixel includes a light emitting material; and an optically reflecting concave first light redirecting element concave toward the light emitting material and having an average optical reflectance of at least 50% in a desired plurality of wavelengths. The optical lens system is disposed to receive light reflected by each of the first light redirecting element, the received light being substantially collimated. The optical lens system includes a partial reflector having an average optical reflectance of at least 30% in the desired plurality of wavelengths, and a reflective polarizer disposed adjacent to and spaced apart from partial reflector.

In some aspects of the present description, an imaging system including a pixelated light source comprising a plurality of pixels, each pixel emitting a first cone of light centered on a first cone axis; and a plurality of lenses is provided. Each lens corresponds to and is aligned with a different pixel in the plurality of pixels. Each lens is adapted to receive the first cone of light from the corresponding pixel and transmit the received first cone of light as a second cone of light centered on a second cone axis. For at least one pixel, the first and second cone axes are not parallel.

BRIEF DESCRIPTION OF THE DRAWINGS

FIGS. 3-5 are cross-sectional views of optical systems;
FIG. 16A is a cross-sectional view of an optical system;
FIGS. 16B-16C are cross-sectional and perspective views, respectively, of a display system;
FIGS. 26-28 are schematic cross-sectional views of light guides;
and
FIG. 29 is a schematic representation of an included angle between two directions.

DETAILED DESCRIPTION

Figure 1A:
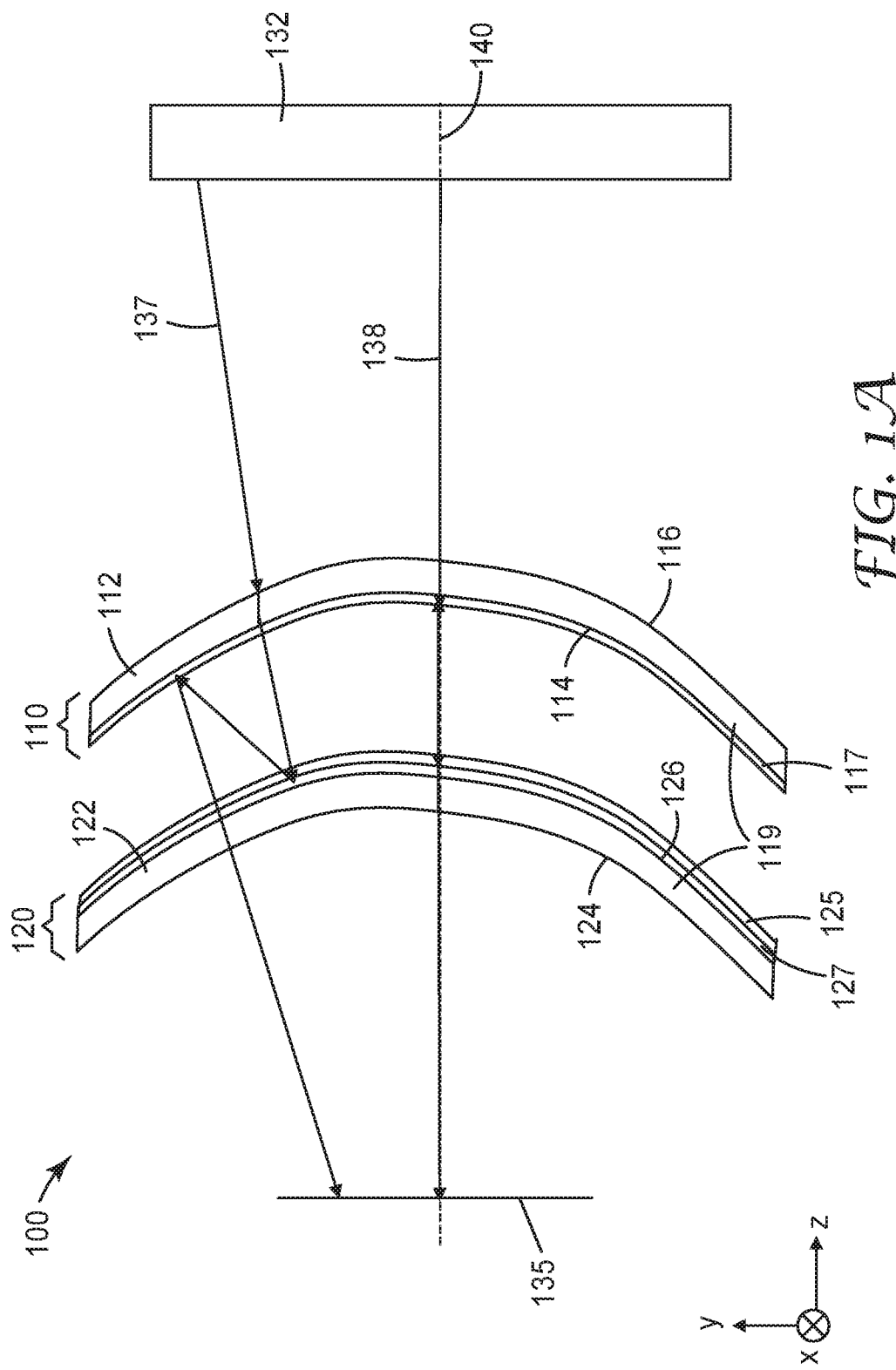
FIG. 1A is a cross-sectional view of an optical system.

Display systems can include a display panel and a lens system that receives light from the display panel and transmits at least a portion of the light through an exit pupil of the display system. The lens system may include a reflective polarizer, a partial reflector adjacent to and spaced apart from the reflective polarizer, and a quarter wave retarder disposed between the reflective polarizer and the partial reflector. The partial reflector transmits at least some of the light received from the display panel through the reflective polarizer and through the exit pupil. Such display systems can provide a wide field of view in a compact system that can be used in head-mounted displays such as virtual reality displays, for example. Useful display systems are described in U.S. Patent Application Publication No. 2017/0068100 (Ouderkirk et al.) which is hereby incorporated by reference herein to the extent that it does not contradict the present description.

According to the present description, it has been found that the fraction of light emitted by the display panel that is transmitted through the exit pupil can be substantially increased compared to conventional display systems by altering the light output of the display panel such that one or both of a direction of the light output or a degree of collimation of the light output is suitably altered. As described further elsewhere herein, this can be achieved by including a light redirecting layer between the display panel and the partial reflector (for example, by including a light redirecting layer directly on a surface of the display panel), or by modifying a backlight used to illuminate the display panel.

FIG. 1 is a schematic cross-sectional view of optical system 100 including light emitting system 132, lens system 119 and exit pupil 135. Light emitting system 132 is adapted to provide a light output that can be efficiently utilized by lens system 119. Light emitting system 132 may include a light redirecting layer and/or an at least partially collimating backlight. Suitable light emitting systems are described further elsewhere herein. Light emitting systems such as light emitting system 132 may be pixelated and may be referred to as a pixelated system or as a pixelated display. Optical system 100 may be a display system that can be utilized, for example, in a head-mounted display.

Lens system 119 includes a first optical stack 110 disposed between the light emitting system 132 and the exit pupil 135, a second optical stack 120 is disposed between the first optical stack 110 and the exit pupil 135. Each of the first and second optical stacks 110 and 120 may be substantially planar or may be curved about one or two axes. In some embodiments, each of the first and second optical stacks 110 and 120 are convex toward the light emitting system 132 along orthogonal first and second axes. An x-y-z coordinate system is provided in FIG. 1. The orthogonal first and second axes may be the x- and y-axes, respectively.

The first optical stack 110 includes a first optical lens 112 having opposing first and second major surfaces 114 and 116 respectively. The first optical stack 110 includes a partial reflector 117 disposed on the first major surface 114. The partial reflector 117 has an average optical reflectance of at least 30% in a desired or pre-determined plurality of wavelengths and may have an average optical transmission of at least 30% in the desired or pre-determined plurality of wavelengths, which may be any of the wavelength ranges described elsewhere herein. In some embodiments, the partial reflector 117 has an average optical reflectance of at least 40% in a desired or pre-determined plurality of wavelengths and an average optical transmission of at least 40% in the desired or pre-determined plurality of wavelengths.

The second optical stack includes a second optical lens 122 having first and second major surfaces 124 and 126. The second optical stack 120 includes a reflective polarizer 127 disposed on the second major surface 126 and includes a quarter wave retarder 125 disposed on the reflective polarizer 127. Quarter wave retarder 125 may be a film laminated on the reflective polarizer 127 or may be a coating applied to the reflective polarizer 127. The optical system 100 may include one or more additional retarders. For example, a second quarter wave retarder may be included in first optical stack 110 and may be disposed on the second major surface 116. The first quarter wave retarder 125 and any additional quarter wave retarders included in optical system 100 may be quarter wave retarders at at least one wavelength in the pre-determined or desired plurality of wavelengths. The second optical stack 120 may alternatively be described as including the second lens 122 and the reflective polarizer 127 disposed on the second lens 122 and the first quarter wave retarder 125 may be regarded as a separate layer or coating that is disposed on the second optical stack 120 rather than being included in the second optical stack 120. In this case, the first quarter wave retarder 125 may be described as being disposed between the first optical stack 110 and the second optical stack 120. In some embodiments, the first quarter wave retarder 125 may not be attached to the second optical stack 120, and in some embodiments, the first quarter wave retarder 125 is disposed between and spaced apart from the first and second optical stacks 110 and 120. In still other embodiments, the first quarter wave retarder 125 may be disposed on the partial reflector 117 and may be described as being included in the first optical stack 110 or may be described as being disposed between the first and second optical stacks 110 and 120.

One or both of the first and second lenses 112 and 122 may be refractive lenses. A refractive lens is an optical lens that provides a desired optical power under transmission. In some embodiments, one or both of the first and second lenses 112 and 122 may have low or substantially zero optical power under transmission and may provide optical power under reflection due to the shape of the lens(es). An optical system including a reflective polarizer and a partial reflector disposed adjacent to an spaced apart from one another may be referred to as a folded optical system since such system provided a folded light path as illustrated in FIG. 1A. An optical system which does not provide such a folded optical path but includes refractive lenses may be described as a refractive optical system.

Light rays 137 and 138 are each transmitted from the light emitting system 132 through the exit pupil 135. Light ray 138 may be a central light ray whose optical path defines a folded optical axis 140 for optical system 100, which may be centered on the folded optical axis 140.

Figure 1C:
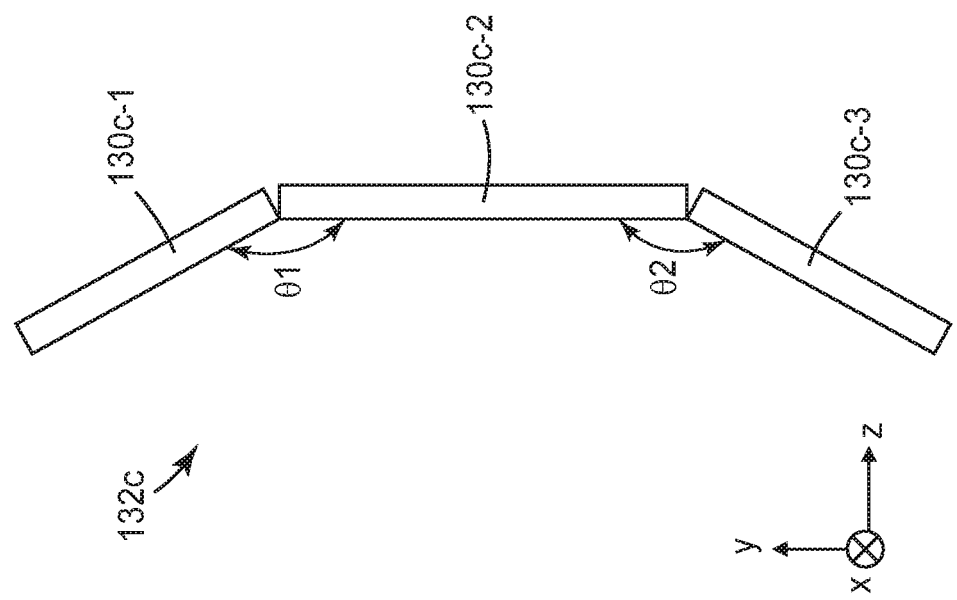
FIGS. 1B-1C are cross-sectional views of displays.
Figure 1B:
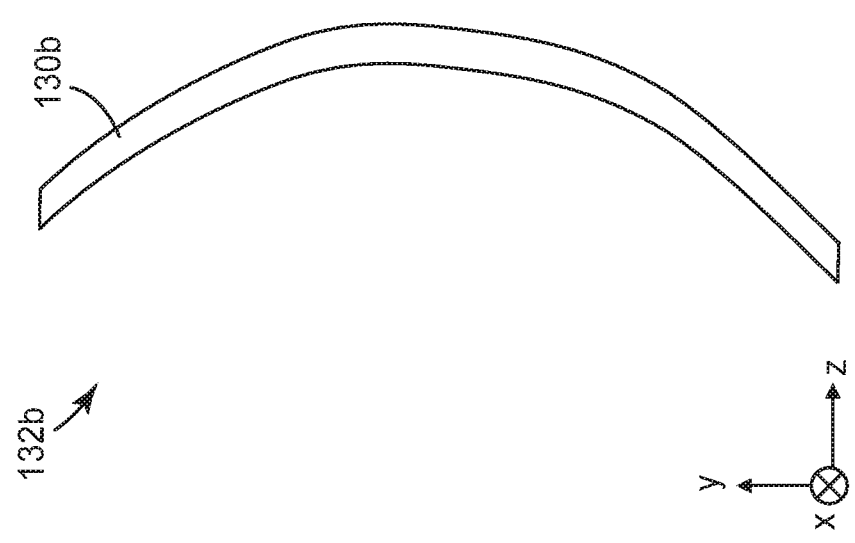

The light emitting system 132 may include any suitable type of display panel including, for example, liquid crystal display (LCD) panels and organic light emitting diode (OLED) display panels. The display panel may be substantially flat or planar as illustrated in FIG. 1A, or may be curved as illustrated in FIG. 1B, or may include a plurality of flat or planar panels disposed at obtuse angles relative to one another as shown in FIG. 1C, for example. FIG. 1B is a schematic cross-sectional view of light emitting system 132*b* which includes display panel 130*b* which may be curved about at least one axis and may be concave toward the lens(es) of the optical system (e.g., the display panel 130*b* may be curved toward the lenses 112 and 122). Display panel 130*b* may be curved in one dimension (a simple curve) or in two dimensions (a compound curve). For example, display panel 130*b* may be curved in one or both of the orthogonal x- and y-directions. A display panel curved in two dimensions may have two different radii of curvature (e.g., the curvature in the x- and y-directions may be different. Such displays may be referred to as toroidal). FIG. 1C is a schematic cross-sectional view of light emitting system 132*c* which includes substantially planar panels 130*c*-1, 130*c*-2 and 130*c*-3. The panels 130*c*-1 and 130*c*-2 are disposed at an obtuse angle θ1 relative to each other, and the panels 130c-2 and 130c-3 are disposed at an obtuse angle θ2 relative to each other. The panels 130c-1, 130c-2 and 130c-3 are disposed to face the lens(es) of the optical system (e.g., the panels 130c-1, 130c-2 and 130c-3 may face toward the lenses 112 and 122). Either of the displays panels 130b and 130c may be used in the light emitting system 132 of FIG. 1A and may be used in other optical systems described elsewhere herein.

Referring again to FIG. 1A, light ray 137 (and similarly for light ray 138) is, in sequence, emitted from light emitting system 132, transmitted through second major surface 116 (and any coatings or layers thereon), transmitted through first optical lens 112, transmitted through partial reflector 117, transmitted through the quarter wave retarder 125 disposed on the reflective polarizer 127, reflected from reflective polarizer 127, transmitted back through quarter wave retarder 125, reflected from partial reflector 117, transmitted through quarter wave retarder 125, transmitted through reflective polarizer 127, transmitted through second lens 122, and transmitted through exit pupil 135. Light ray 137 may be emitted from the light emitting system 132 with a polarization state which is rotated to a first polarization state upon passing through quarter wave retarder 125. The light emitting system 132 may include polarization conditioning elements in order to provide the desired polarization state. Light emitting systems which emit light in the desired polarization state can result in a high contrast image. The first polarization state may be a block state for the reflective polarizer 127. After light ray 137 passes through first quarter wave retarder 125, reflects from partial reflector 117 and passes back through quarter wave retarder 125, its polarization state is a second polarization state substantially orthogonal to the first polarization state. Light ray 137 can therefore reflect from the reflective polarizer 127 the first time that it is incident on the reflective polarizer 127 and can be transmitted through the reflective polarizer 127 the second time that it is incident on the reflective polarizer 127.

Other light rays (not illustrated) reflect from the partial reflector 117 when incident on the partial reflector 117 in the minus z-direction or are transmitted by the partial reflector 117 when incident on the partial reflector 117 in the plus z-direction. These rays may exit optical system 100.

In some embodiments, substantially any chief light ray that is emitted from the light emitting system 132 and transmitted through the exit pupil 135 is incident on each of the first optical stack 110 and the second optical stack 120 with an angle of incidence less than about 30 degrees, less than about 25 degrees, or less than about 20 degrees, the first time or each time that the chief light ray is incident on the first or second optical stacks 110 or 120. In any of the optical systems of the present description, substantially any chief light ray emitted by the light emitting system 132 and transmitted through the exit pupil 134 is incident on each of the reflective polarizer and the partial reflector with an angle of incidence less than about 30 degrees, less than about 25 degrees, or less than about 20 degrees, the first time or each time that the chief light ray is incident on the reflective polarizer or the partial reflector. If a large majority (e.g., about 90 percent or more, or about 95 percent or more, or about 98 percent or more) of all chief rays emitted by the light emitting system and transmitted through the exit pupil satisfy a condition, it may be said that substantially any chief ray satisfies that condition.

Various factors can cause light to be partially transmitted through the reflective polarizer 127 the first time that light emitted by the light emitting system 132 is incident on the reflective polarizer 127. This can cause unwanted ghosting or image blurriness at the exit pupil 135. These factors can include performance degradation of the various polarizing components during forming and unwanted birefringence in the optical system 100. The effects of these factors can combine to degrade the contrast ratio and efficiency of the optical system 100. The effects of these factors on the contrast ratio is described in more detail in US 2017/0068100 (Ouderkirk et al.) previously incorporated herein by reference. Such factors can be minimized by using relatively thin optical lenses, which can reduce unwanted birefringence in the lenses, for example, and using thin optical films, which can reduce optical artifacts arising from thermoforming optical films, for example. In some embodiments, the first and second optical lenses 112 and 122 each have a thickness less than 7 mm, less than 5 mm, or less than 3 mm, and may have a thickness in a range of 1 mm to 5 mm, or 1 mm to 7 mm, for example. In some embodiments, the reflective polarizer 127 may have a thickness of less than 75 micrometers, less than 50 micrometers, or less than 30 micrometers. In some embodiments, the contrast ratio at the exit pupil 135 is at least 40, or at least 50, or at least 60, or at least 80, or at least 100, or at least 150, or at least 200, or at least 300 over the field of view of the optical system 100.

A film can be shaped into a compound curve (curved about two orthogonal axes) by any forming process that deforms or stretches the film into the desired shape. Suitable forming processes may or may not include elevated temperatures (thermoforming). Suitable forming processes include thermoforming and/or pressurization processing (deforming or stretching the film into the desired shape via the application of pressure). It has been found that a convex reflective polarizer curved about two orthogonal axes that is made by forming a polymeric multilayer optical film that was uniaxially oriented prior to forming is particularly advantageous when used in the optical systems of the present description. For example, it has been found that the contrast ratio can be significantly higher when utilizing such film compared to using other reflective polarizers. However, other reflective polarizers, such as non-uniaxially oriented multilayer polymeric film reflective polarizers or wire grid polarizers, may also be used. In some embodiments, the uniaxially oriented multilayer reflective polarizers is APF (Advanced Polarizing Film, available from 3M Company, St. Paul, Minn.). In some embodiments, optical systems include a thermoformed APF or a pressure-formed APF and any or substantially any chief ray in the optical system that is incident on the thermoformed APF or the pressure-formed has a low angle of incidence (e.g., less than about 30 degrees, less than about 25 degrees, or less than about 20 degrees).

In some embodiments, a lens system may be utilized that includes a substantially flat reflective polarizer rather than a curved reflective polarizer. In some embodiments, the reflective polarizer is curved about one axis and in some embodiments, the reflective polarizer is curved about two orthogonal axes. The reflective polarizer may be a multilayer optical film that is substantially flat or that is substantially curved about an axis or about two orthogonal axes. The reflective polarizer may be a wire grid polarizer that is substantially flat or that is substantially curved about an axis or about two orthogonal axes.

It has been found that by suitably choosing the shapes of the various major surfaces (e.g., second major surface 126 and first major surface 114) that the optical system can provide distortion sufficiently low that the image does not need to be pre-distorted. In some embodiments, the light emitting system 132 is adapted to emit an undistorted image. The partial reflector 117 and the reflective polarizer 127 may have different shapes selected such that a distortion of the emitted undistorted image transmitted through the exit pupil 135 is less than about 10%, or less than about 5%, or less than about 3%, of a field of view at the exit pupil 135. The field of view at the exit pupil may be greater than 80 degrees, greater than 90 degrees, or greater than 100 degrees, for example.

Figure 2A:
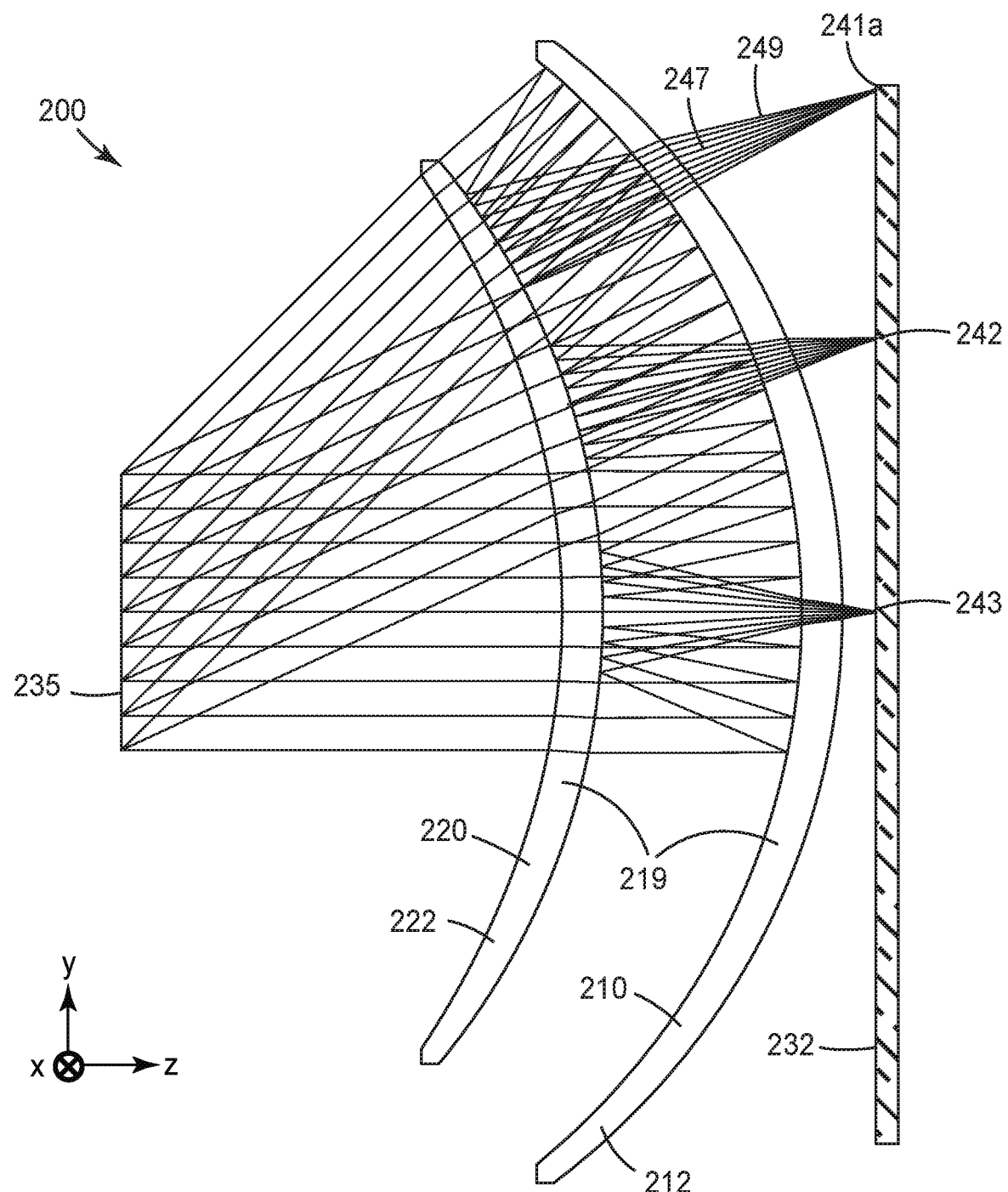
FIG. 2A is a cross-sectional view of an optical system.

FIG. 2A is a cross-sectional view of optical system 200 including lens system 219, a light emitting system 232 and an exit pupil 235. Lens system 219 includes a first optical stack 210 and a second optical stack 220. Light emitted from pixels 241, 242 and 243 is illustrated in FIG. 2A. Light 247 from pixel 241 includes a chief ray which is transmitted through a center of the exit pupil 235. First optical stack 210 includes a lens 212 and a partial reflector disposed on the major surface of lens 212 facing exit pupil 235. Second optical stack 220 includes a lens 222 and includes a reflective polarizer disposed on the major surface of lens 222 facing the light emitting system 232. A quarter wave retarder is included either disposed on the reflective polarizer facing the partial reflector or disposed on the partial reflector facing the reflective polarizer. Lens 212 and lens 222 are convex toward light emitting system 232 about orthogonal axes (e.g., x- and y-axes). In other embodiments, one or both of the first and second lenses may have one or more surfaces that are not convex. In some embodiments, one or both lenses are plano-convex and in some embodiments, one or both lenses are plano-concave. In some embodiments, one lens is plano-convex and the other is plano-conave. In some embodiments, the reflective polarizer is disposed on a surface that is convex towards the display and the quarter-wave retarder is disposed on a flat surface. The surface that is convex towards the display can be, for example, the curved surface of a plano-convex lens that is disposed with the curved surface of the lens facing the display or the curved surface of a plano-concave lens that is disposed with the flat surface of the lens facing the display.

Figure 2B:
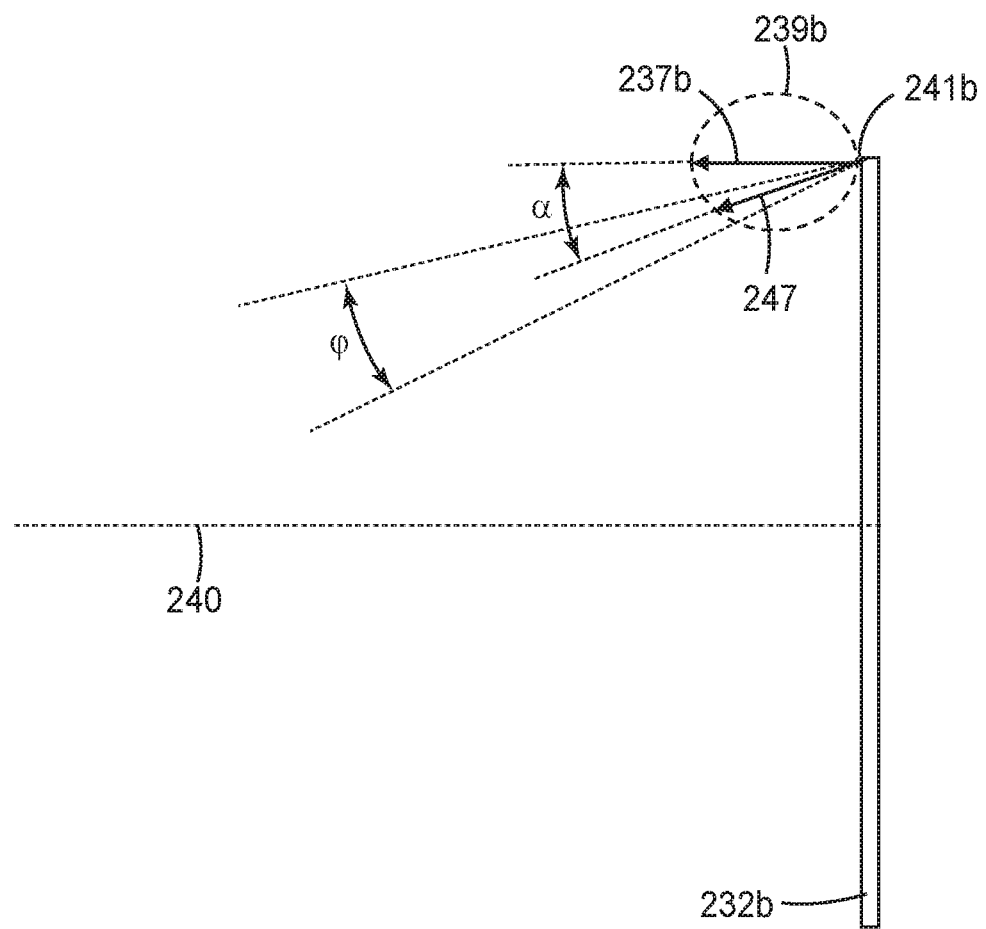
FIG. 2B is a cross-sectional view of light output from a pixel in a reference light emitting system.
Figure 2C:
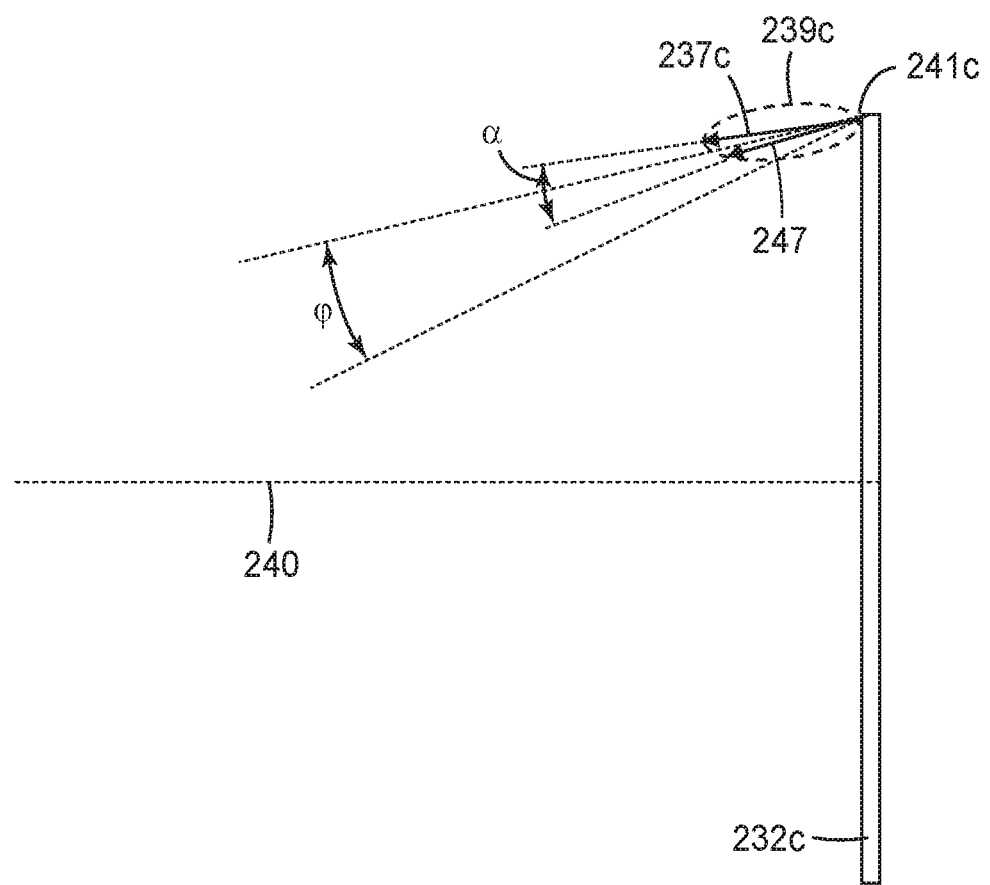
FIG. 2C is a cross-sectional view of light output from a pixel in a light emitting system.

FIGS. 2B-2C schematically illustrates light emitted from pixel 241b of light emitting system 232b and light emitted by pixel 241c of light emitting system 232c, both corresponding to pixel 241 of light emitting system 232 of FIG. 2A. Light from a conventional display panel would typically be emitted in a bundle of light 239b, which may have a Lambertian distribution having a central ray 237b along a normal to the display panel, for example. In some embodiments, light emitting system 232c includes a light redirecting layer that bends the direction of the central ray 237b towards the direction of the chief ray 247. In these cases, light emitting system 232b may be otherwise equivalent to light emitting system 232c but without the light redirecting layer. As described further elsewhere herein, the light redirecting layer may include a plurality of light redirecting elements with each light redirecting element corresponding to a different group of pixels in a display panel. An angle α is illustrated between the chief ray 247 and the central ray 237b in FIG. 2B. In some embodiments, for at least one pixel, the light redirecting element corresponding to the pixel reduces the angle α between the central light ray 247c and the chief light ray 247 emitted by the pixel. In some embodiments, light emitting system 232c includes an at least partially collimating backlight that may direct a light output such that the direction of the central ray 237c is bent towards the direction of the chief ray 247. As described further elsewhere herein, an at least partially collimating backlight produces a light output that is substantially more collimated than a Lambertian output. In these cases, light emitting system 232b may be otherwise equivalent to light emitting system 232c but with a backlight that produces a substantially Lambertian output with the central ray directed normal to a display surface.

A light redirecting layer that reduces a divergence angle of light received by the light redirecting layer may be said to at least partially collimate the light. In some embodiments the angle α is reduced for the light emitting system 232c relative to the otherwise equivalent light emitting system 232b by at least 5 degrees, or at least 10 degrees, for at least one pixel. In some embodiments the angle α is reduced for the light emitting system 232c relative to the otherwise equivalent light emitting system 232b by at least 5 degrees, or at least 10 degrees, for a majority (more than half) of the pixels or for substantially all of the pixels.

An acceptance angle φ for lens system 219 is illustrated in FIGS. 2B-2C. A greater proportion of light emitted from pixel 241c of light emitting system 232c is within the acceptance angle φ compared to the proportion of light emitted from pixel 241b of the otherwise equivalent light emitting system 232b that does not include a light redirecting layer or an at least partially collimating backlight. This may be due to one or both of redirecting the central light ray closer to the chief ray direction and at least partially collimating the light output. A light emitting system including a plurality of pixels may also be referred to as a pixelated system or a pixelated display and an optical system including the light emitting system and a lens system may be referred to as a display system or as an imaging system. An otherwise equivalent light emitting system not including a light redirecting component (e.g., a light redirecting layer or an at least partially collimating backlight) may be referred to as a reference pixelated system and the corresponding display system including the reference pixelated display system may be referred to as an otherwise equivalent display system or as a reference display system. In some embodiments, for each pixel in the plurality of pixels, the pixelated system is adapted to emit a cone of light having a central ray where the central ray has a direction that varies with location of the pixel in the pixelated system such that a total luminous energy emitted by the pixelated system that is within the acceptance angle of the optical lens system is at least 30 percent higher, or at least 50 percent higher, or at least 100 percent higher, or at least 200 percent higher, or at least 300 percent higher, or at least 400 percent higher than that of a reference pixelated system that is equivalent to the pixelated system except that directions of central rays of the reference pixelated system are normal to the pixels.

In some embodiments, a brightness of an optical system of the present description at the exit pupil of the optical system is at least 20 percent higher, or at least 30 percent higher, or at least 100 percent higher, or at least 200 percent higher, or at least 300 percent higher, or at least 400 percent higher than that of an otherwise equivalent optical system not including a light redirecting component. As described further elsewhere herein, the light redirecting component may be a light redirecting layer, a plurality of light redirecting elements (e.g., a microlens array or a plurality of prismatic elements), or an at least partially collimating backlight.

FIG. 3 is a schematic cross-sectional view of optical system 300 including light emitting system 332, exit pupil 335, integral optical stack 310 including optical lens 312 having first and second major surfaces 314 and 316. Light emitting system 332 may be any of the light emitting systems described elsewhere herein and may include a light redirecting layer and/or a partially collimating backlight, for example First quarter wave retarder 325 is disposed on first major surface 314 of optical lens 312 and reflective polarizer 327 is disposed on first quarter wave retarder 325 opposite optical lens 312. Partial reflector 317 is disposed on second major surface 316 of optical lens 312 and second quarter wave retarder 315 is disposed on partial reflector 317 opposite optical lens 312. Optical system 300 may be centered on folded optical axis 340 which may be defined by an optical path of a central light ray transmitted from the light emitting system 332 through the exit pupil 335. In some embodiments, optical lens 312 is a monolithic component.

Integral optical stack 310 can be made by first forming reflective polarizer 327 with first quarter wave retarder 325 coated or laminated to reflective polarizer 327 and then thermoforming the resulting film into a desired shape. As described further in US 2017/0068100 (Ouderkirk et al.) previously incorporated herein by reference, the thermoforming tool may have a shape different than the desired shape so that the film obtains the desired shape after cooling. Partial reflector 317 and second quarter wave retarder 315 may be prepared by coating a quarter wave retarder onto a partial reflector film, by coating a partial reflector coating onto a quarter wave retarder film, by laminating a partial reflector film and a quarter wave retarder film together, or by first forming lens 312 (which may be formed on a film that includes reflective polarizer 327 and first quarter wave retarder 325) in a film insert molding process and then coating the partial reflector 317 on the second major surface 316 and coating the quarter wave retarder 315 on the partial reflector 317. In some embodiments, a first film including reflective polarizer 327 and first quarter wave retarder 325 is provided an a second film including partial reflector 317 and second quarter wave retarder 315 is provided and then integral optical stack 310 is formed by injection molding lens 312 between the first and second thermoformed films in a film insert molding process. The first and second films may be thermoformed prior to the injection molding step. Other optical stacks of the present description may be made similarly by thermoforming an optical film, which may be a coated film or a laminate, and using a film insert molding process to make the optical stack. A second film may be included in the film insert molding process so that the lens formed in the molding process is disposed between the films.

In alternate embodiments, the first quarter wave retarder 325 may be disposed on second major surface 316 rather than on first major surface 314. The integral optical stack may be formed by thermoforming the reflective polarizer 327 into the desired shape and injection molding lens 312 onto the reflective polarizer 327. The first quarter wave retarder 325 may then be coated (e.g., spin coated) onto the second major surface 316 and then the partial reflector 317 can be vapor coated onto the first quarter wave retarder 325. A second quarter wave retarder can be coated onto the partial reflector, or disposed on the display panel 332 or positioned between the partial reflector 317 and the display panel 332.

The partial reflector 317 has an average optical reflectance of at least 30% in a desired or pre-determined plurality of wavelengths and may have an average optical transmission of at least 30% in the desired or pre-determined plurality of wavelengths, which may be any of the wavelength ranges described elsewhere herein. The first quarter wave retarder 325 and any additional quarter wave retarders included in optical system 300 may be quarter wave retarders at at least one wavelength in the pre-determined or desired plurality of wavelengths. The multilayer reflective polarizer 327 substantially transmits light having a first polarization state (e.g., linearly polarized in a first direction) and substantially reflects light having an orthogonal second polarization state (e.g., linear polarized in a second direction orthogonal to the first direction). As described further elsewhere herein, the multilayer reflective polarizer 327 may be a polymeric multilayer reflective polarizer (e.g., APF) or may be a wire grid polarizer, for example.

Light ray 337 is emitted from the light emitting system 332 and transmitted through the exit pupil 335. Light ray 337 is transmitted through second quarter wave retarder 315 and partial reflector 317 into and through lens 312. Other light rays (not illustrated) reflect from partial reflector 317 after passing through second quarter wave retarder 315 and are lost from the optical system 300. After making a first pass through lens 312, the light ray passes through first quarter wave retarder 325 and reflects from reflective polarizer 327. Light emitting system 332 may be adapted to emit light having a polarization along the pass axis for reflective polarizer 327 so that after passing through both second quarter wave retarder 315 and first quarter wave retarder 325 it is polarized along the block axis for the reflective polarizer 327 and therefore reflects from the reflective polarizer 327 when it is first incident on it. In some embodiments, a linear polarizer is included between the light emitting system 332 and the second quarter wave retarder 317 so that light incident on second quarter wave retarder 315 has the desired polarization. After light ray 337 reflects from reflective polarizer 327, it passes back through first quarter wave retarder 325 and lens 312 and is then reflected from partial reflector 317 (other light rays not illustrated are transmitted through partial reflector 317) back through lens 312 and is then again incident on the reflective polarizer 327. After passing through first quarter wave retarder 325, reflecting from partial reflector 317 and passing back through first quarter wave retarder 325, light ray 337 has a polarization along the pass axis for reflective polarizer 327. Light ray 337 is therefore transmitted through reflective polarizer 327 and is then transmitted through exit pupil 335.

Figure 4:
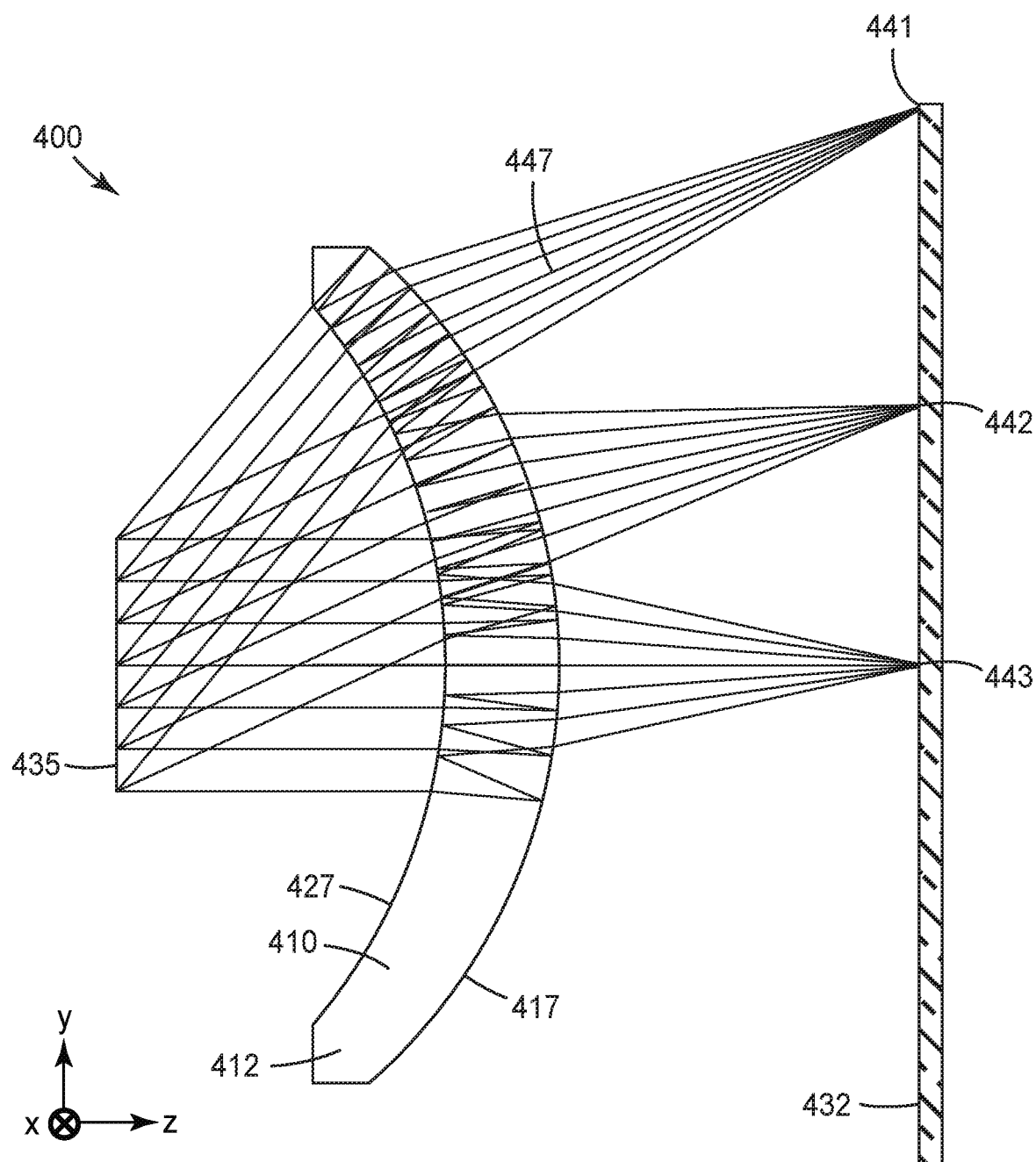

FIG. 4 is a cross-sectional view of optical system 400 including an optical stack 410, a light emitting system 432 and an exit pupil 435. Light emitting system 432 may be any of the light emitting systems described elsewhere herein. Light emitted from pixels 441, 442 and 443 is illustrated in FIG. 4. Light from pixel 441 includes a chief ray 447 which is transmitted through a center of the exit pupil 435. The light emitting system may include a plurality of light redirecting elements that steer and/or partially collimate the light output of a display panel so that a greater proportion of the light output it directed into the acceptance angle of the optical stack 410. Optical stack 410 includes a lens 412, a reflective polarizer 427 disposed on the major surface of lens 412 facing exit pupil 435, and a partial reflector 417 disposed on the major surface of lens 412 facing the image surface 430. A quarter wave retarder is included in optical stack 410 between the reflective polarizer and the lens 412 or between the partial reflector and the lens 412. Lens 412 is convex toward image surface 430 about orthogonal axes (e.g., x- and y-axes).

Figure 5:
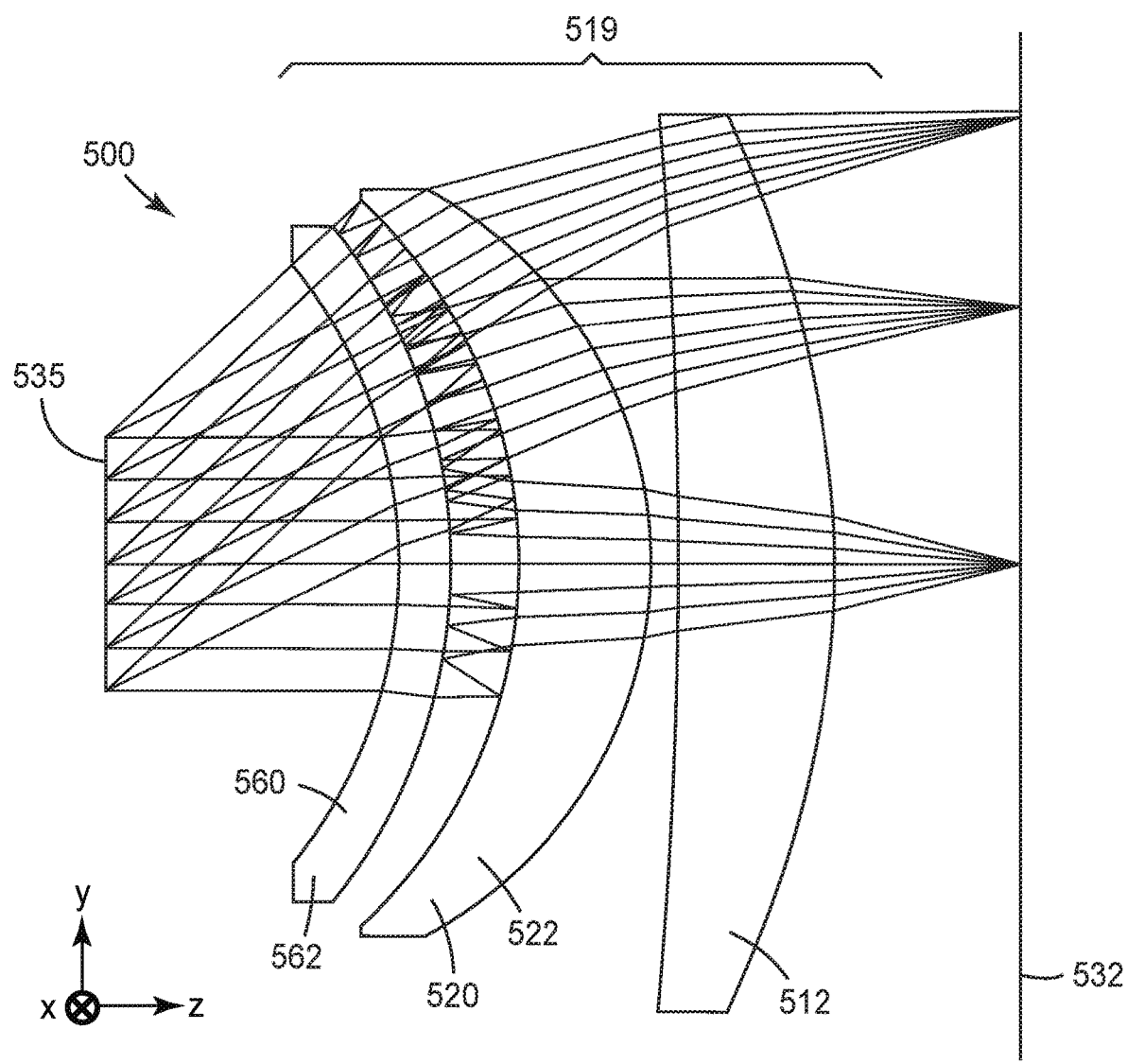

FIG. 5 is a cross-sectional view of optical system 500 including a light emitting system 532, a lens system 519 and an exit pupil 535. Light emitting system 532 may be any of the light emitting systems described elsewhere herein and may include a display panel and one or more optical components (e.g., a light redirecting layer and/or a partially collimating backlight) adapted to steer and/or partially collimate a light output of the display panel so that a larger proportion of the light output is within an acceptance angle of the lens system 519.

Lens system 519 includes a first lens 512, an optical stack 520 including a second lens 522, and an optical stack 560 including a third lens 562. Optical stack 520 includes a partial reflector disposed on the major surface of second lens 522 facing exit pupil 535 and includes a reflective polarizer disposed on the major surface of third lens 562 facing the image surface 530. A quarter wave retarder is included either in optical system 500 disposed on the reflective polarizer facing the partial reflector, or disposed on the partial reflector facing the reflective polarizer. The reflective polarizer and the partial reflector are each convex toward image surface 530 about orthogonal axes (e.g., x- and y-axes). Three bundles of light rays at three locations on the light emitting system 532 are illustrated. The light rays in each bundle are substantially parallel at the exit pupil 535.

Figure 6:
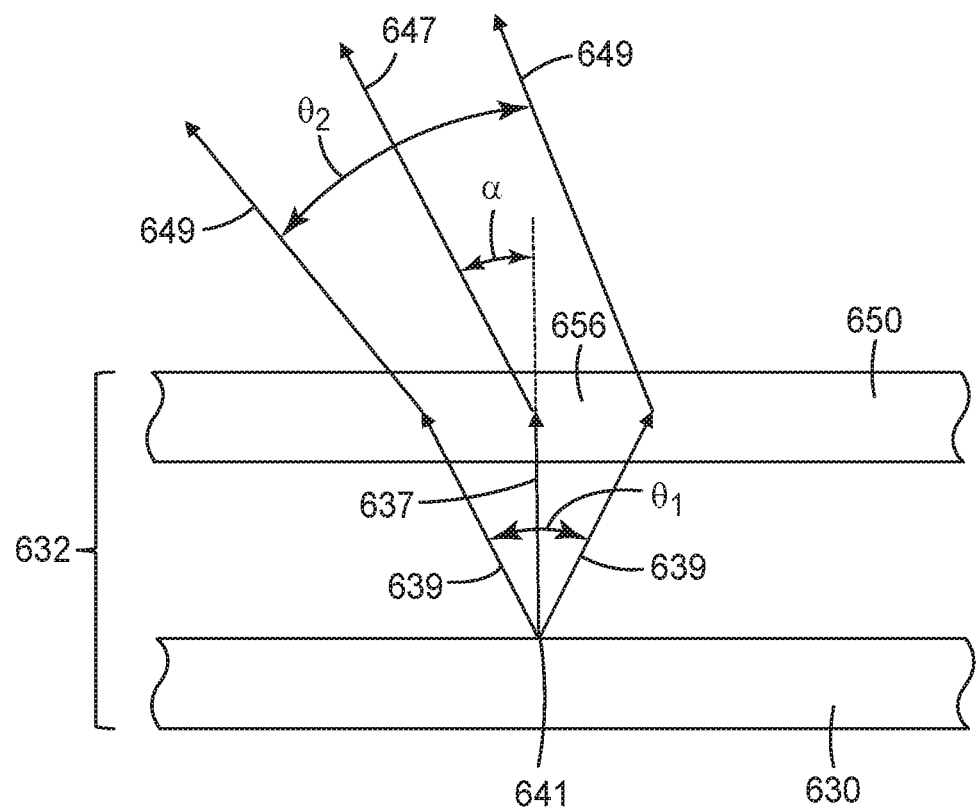
FIGS. 6-8 are schematic cross-sectional views of light emitting systems.

FIG. 6 is a schematic side view of light emitting system 632 including pixelated light source 630 and light redirecting layer 650. Light emitting system 632 may be used for any of light emitting systems 132, 232, 332, 432, and 532, in optical system 100, 200, 300, 400 and 500, respectively, for example. Light redirecting layer 650 may be separated from pixelated light source 630 or may be attached to or integrated with the pixelated light source 630. Pixelated light source 630 includes a plurality of discrete spaced apart pixels. For example, pixelated light source 630 may comprise a high definition display panel having an array of 1080 by 1920 pixels. Light from a single pixel is illustrated in FIG. 6. Pixel 641 emits a cone of light 639 including central light ray 637. Cone of light 639 is a diverging light having a cone angle of $\theta_1$. Each portion of light redirecting layer 650 or each light redirecting element of light redirecting layer 650 receives a cone of light emitted by a pixel corresponding to the portion or to the light redirecting element and transmits received light as a cone of light having one or both of the direction of the central ray and the cone angle of the transmitted light different from that of the received cone of light. In the illustrated embodiment, portion 656 receives cone of light 639 and transmits the received light as cone of light 649 having central ray 647. Cone of light 649 may be a diverging light and has a cone angle of $\theta_2$. Central ray 647 has a different direction than central ray 637. Is some embodiments, an angle $\alpha$ between the direction of central ray 647 and the direction of central ray 639 may be, for example, at least 5 degrees or at least 10 degrees, and may be less than 80 degrees, or less than 60 degrees, or less than 50 degrees. The cone angle $\theta 2$ may be at least 2 degrees, or at least 5 degrees, or at least 10 degrees, or at least 15 degrees lower than the cone angle $\theta 1$. In some embodiments, one or both of the cone angles $\theta_1$ and $\theta 2$ may be greater than 10 degrees, or greater than 15 degrees, or greater than 20 degrees, or greater than 30 degrees. In some embodiments, the angle $\alpha$ between may be approximately zero and the cone angle $\theta 2$ may be substantially less than the cone angle $\theta 1$. In some embodiments, the cone angles $\theta 1$ and $\theta_2$ may be approximately equal and the angle $\alpha$ between may be substantially greater than zero. In some embodiments, the angle $\alpha$ may be substantially greater than zero and the cone angle $\theta 2$ may be substantially less than the cone angle $\theta_1$.

As described further elsewhere herein, light redirecting layer 650 may include a plurality of light redirecting elements with each light redirecting element corresponding to a group of pixels in the pixelated light source 630. The group of pixels includes at least one pixel and may include a single pixel or a plurality of pixels. In some cases, the different groups of pixels may share one or more common pixels. In other cases, no two different groups of pixels contain a common pixel. A light redirecting layer may be said to comprise a plurality of light redirecting elements if the elements are discrete elements or if the light redirecting layer includes abruptly varying structures such as microlenses or Fresnel lenses. In some embodiments, light redirecting layer 650 may include a plurality of portions with each different portion corresponding to a different group of pixels in the pixelated light source 630. In some embodiments, the portions may be discrete light redirecting elements or a plurality of discrete light redirecting elements. In other embodiments, a light redirecting layer may include a plurality of substantially continuously varying portions without abruptly varying structures.

Figure 7:
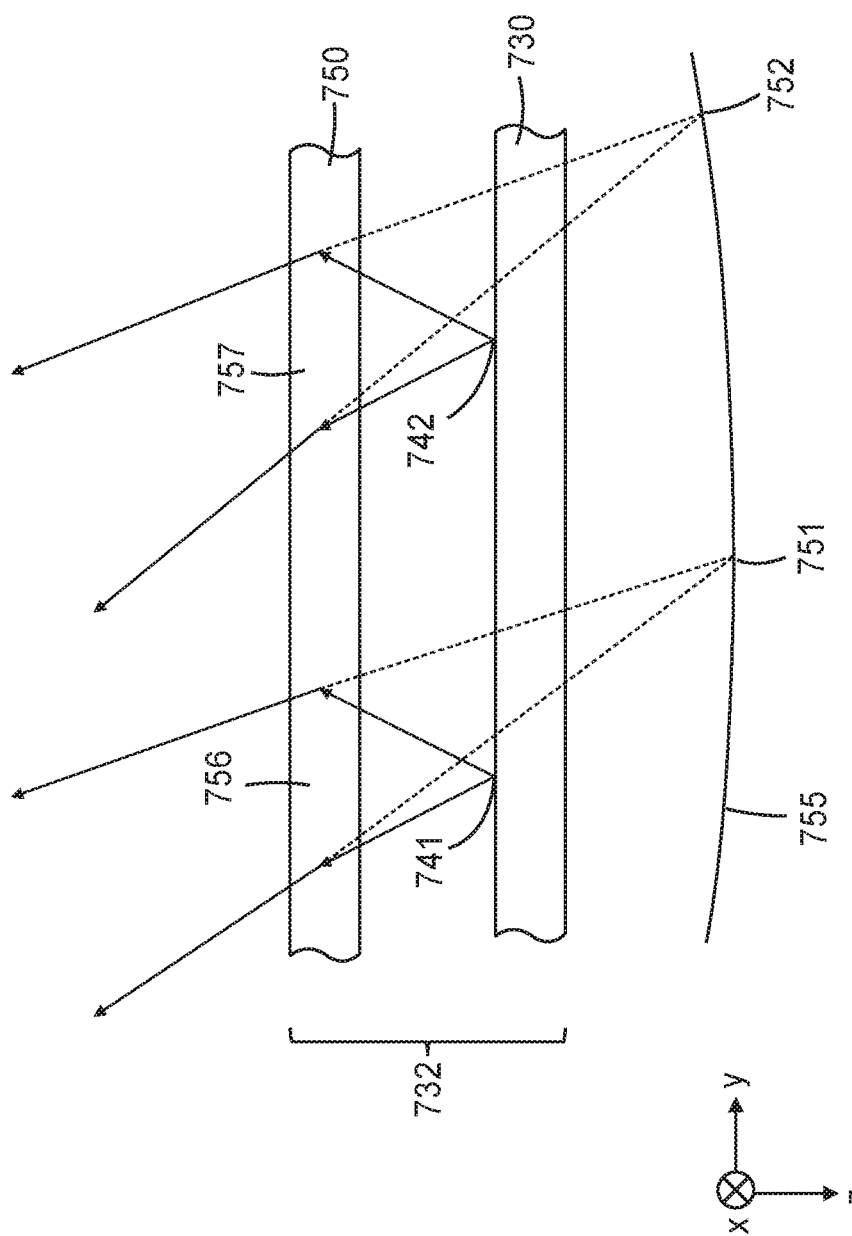

FIG. 7 is a schematic side view of light emitting system 732 including pixelated light source 730 and light redirecting layer 750. Light emitting system 732 may be used for any of light emitting systems 132, 232, 332, 432, and 532, in optical system 100, 200, 300, 400 and 500, respectively, for example Pixelated light source 730 includes a plurality of pixels which includes at least first and second pixels 751 and 752. Image 751 of pixel 741 is a virtual image located behind the pixel 741 (in the z-direction from the pixelated light source 730) Similarly, image 752 of pixel 742 is a virtual image located behind the pixel 742. Images 751 and 752 are disposed on image surface 755 which may be substantially planar or substantially non-planar. Light redirecting layer 750 includes a plurality of portions, each different portion corresponding to a different group of pixels in the pixelated light source 730. In the illustrated embodiment, each group of pixels is a single pixel. Portion 756 of light redirecting layer 750 corresponds to pixel 741 and portion 757 of light redirecting layer 750 corresponds to pixel 742. Images 751 and 752 may be located at different distances from portions 756 and 757. In some embodiments, light redirecting layer 750 includes a plurality of lenses (or other light redirecting elements as described elsewhere herein) and portions 756 and 757 each include a lens. Images 751 and 752 may be located at different distances from the respective lenses in portions 756 and 757. Pixelated light source 730 includes a plurality of pixels and may emit a first image. The light redirecting layer 750 may form a virtual second image of the first image behind the plurality of pixels. In other embodiments, the light redirecting layer may produce a real image instead of a virtual image. This is illustrated in FIG. 8.

Figure 8:
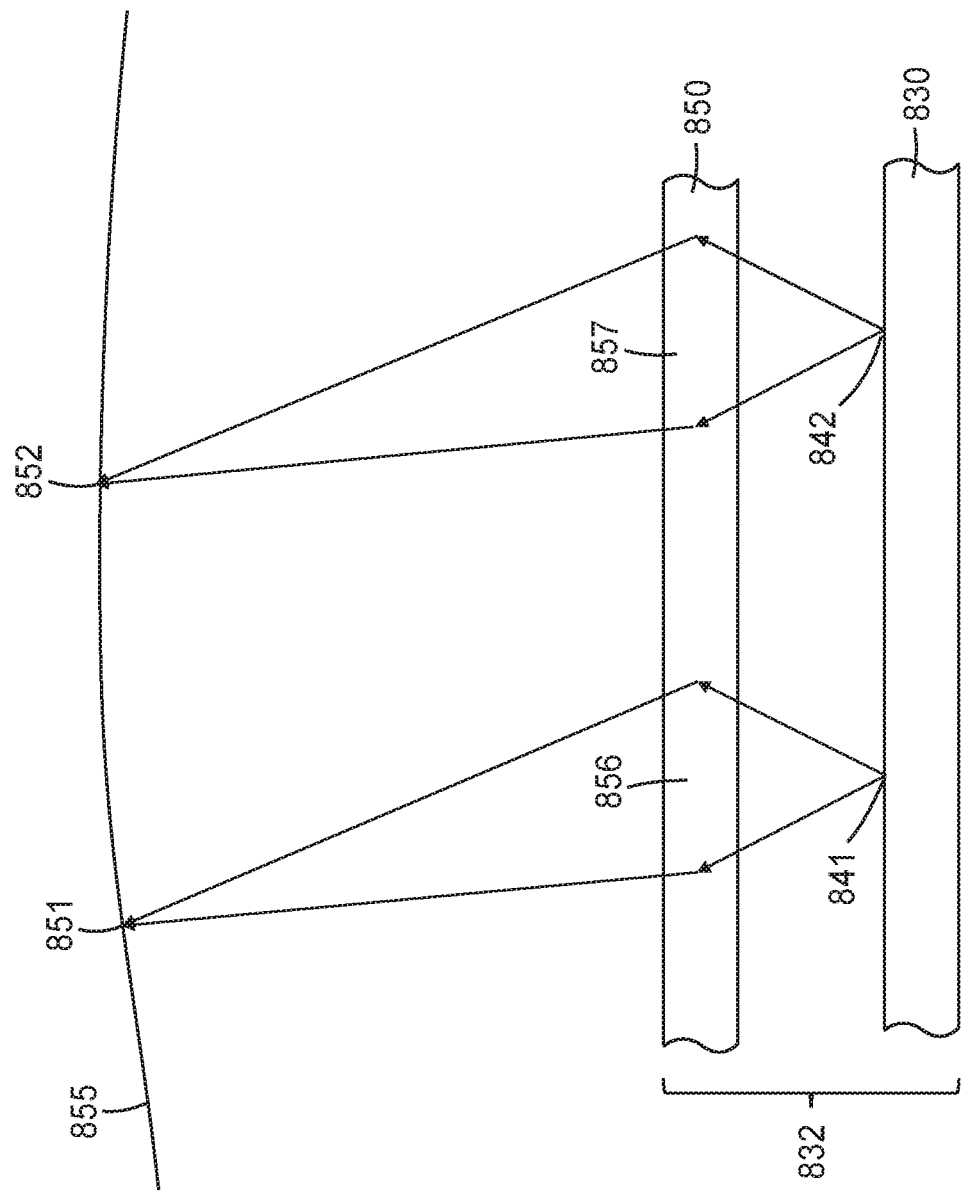

FIG. 8 is a schematic side view of light emitting system 832 including pixelated light source 830 and light redirecting layer 850. Light emitting system 832 may be used for any of light emitting systems 132, 232, 332, 432, and 532, in optical system 100, 200, 300, 400 and 500, respectively, for example Pixelated light source 830 includes a plurality of pixels which includes at least first and second pixels 851 and 852. Image 851 of pixel 841 is a real image located in front of pixel 841 (in the minus z-direction from the pixelated light source 830). Similarly, image 852 of pixel 842 is a real image located in front of pixel 842. Images 851 and 852 are disposed on image surface 855 which may be substantially planar or substantially non-planar. Light redirecting layer 850 includes a plurality of portions, each different portion corresponding to a different group of pixels in the pixelated light source 830. In the illustrated embodiment, each group of pixels is a single pixel. Portion 856 of light redirecting layer 850 corresponds to pixel 841 and portion 857 of light redirecting layer 850 corresponds to pixel 842. Pixelated light source 830 includes a plurality of pixels and may emit a first image. The light redirecting layer 850 may form a real second image of the first image in front of the plurality of pixels. Images 851 and 852 may be located at different distances from portions 856 and 857. In some embodiments, light redirecting layer 850 includes a plurality of lenses (or other light redirecting elements as described elsewhere herein) and portions 856 and 857 each include a lens. Images 851 and 852 may be located at different distances from the respective lenses in portions 856 and 857.

Figure 9:
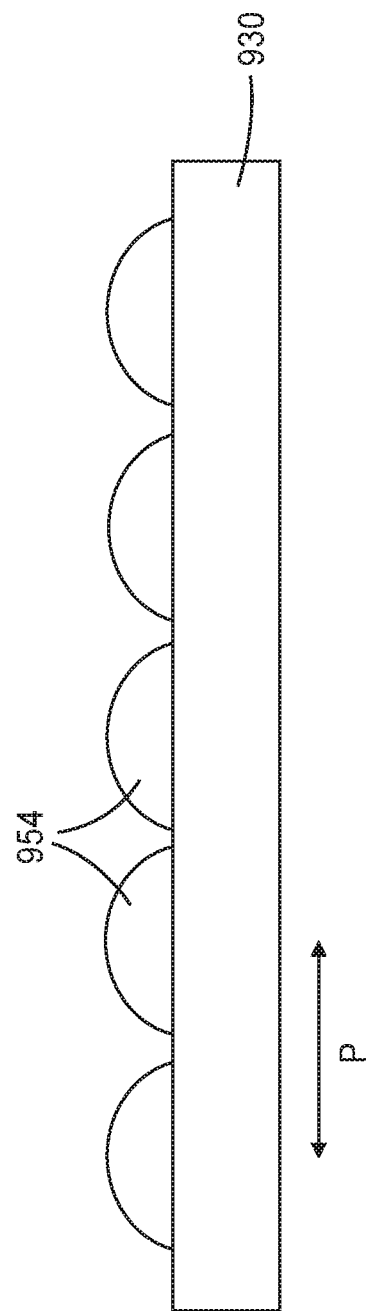
FIG. 9 is a cross-sectional view of a light redirecting layer.

An example of a light redirecting layer is illustrated in FIG. 9 which is a cross-sectional view of light redirecting layer 950 including a plurality of lenses 954 on a layer 930. Layer 930 may be a display panel or an outer layer in a display panel, for example, and the plurality of lenses 954 may be formed directly on the display panel. Alternatively, layer 930 may be a polymer substrate, for example, and light redirecting layer 950 may be attached or laminated to a display panel. The plurality of lenses 954, which may be a plurality of microlenses, may be arranged periodically with a pitch P. The pitch P may be similar to but larger than a pitch between pixels in a display panel. The pitch P may be selected such that lenses positioned near the center of the display panel have an optical axis that is approximately aligned with a corresponding pixel, while lenses away from the center of the display panel have an optical axis that is laterally offset (e.g., offset in a plane of the display panel which may be parallel to the x-y plane of FIG. 9) from the corresponding pixel. In some embodiments, the offset increases monotonically from a center of the display panel to an edge of the display panel. The monotonic increase in the offset may be a linear increase or a non-linear increase.

Light redirecting layers, such as those including microlens arrays, can be made by a variety of different techniques. Such techniques includes include photopolymer reflow, gray scale lithography, laser ablation, dip coating of curable monomers on patterned hydrophobic/hydrophilic substrates, ink jet printing of curable monomers, diamond turning, ion beam or wet etching, and electrodeposition. Other suitable processes include two-photon processes such as those described in U.S. Pat. No. 7,583,444 (DeVoe et al.).

Figure 10:
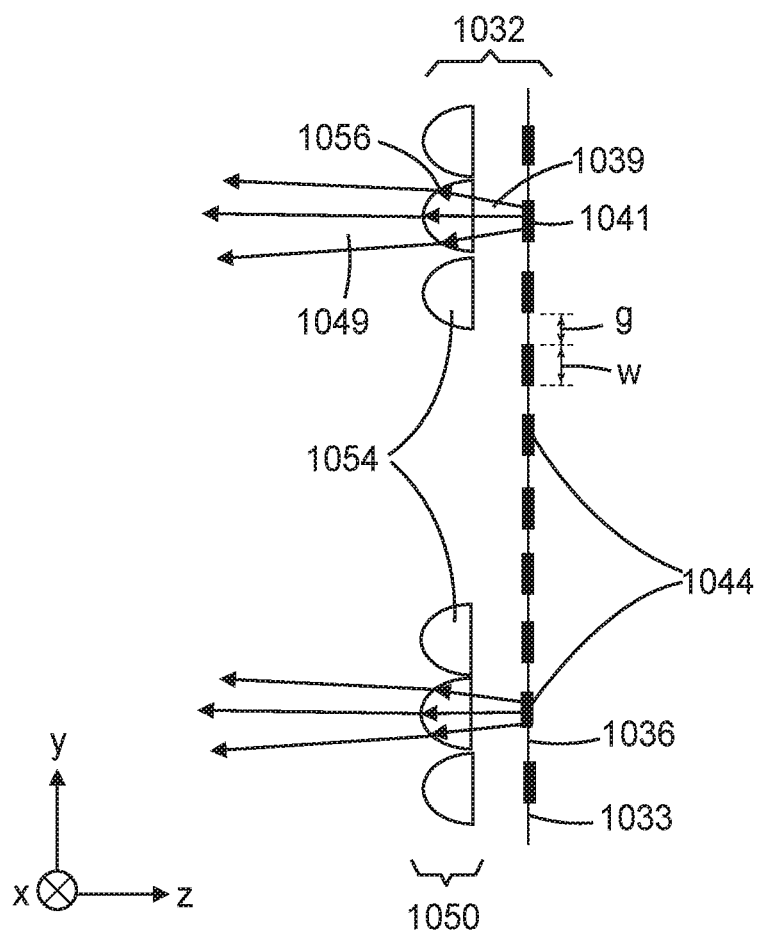
FIG. 10 is a cross-sectional view of a light emitting system.

FIG. 10 is a schematic side view of light emitting system 1032 which includes a plurality of discrete spaced apart pixels 1044 and a light redirecting layer 1050 which includes a plurality of light redirecting elements 1054. Light redirecting elements 1054 may correspond to lenses 954. A lens may be included for all pixels in a display panel or for only some of the pixels. For example, pixels a region near an optical axis of an optical system including the light emitting system 1032 may optionally not include light redirecting elements. Light emitting system 1032 may be used for any of light emitting systems 132, 232, 332, 432, and 532, in optical system 100, 200, 300, 400 and 500, respectively, for example Light redirecting element 1056 receives a cone of light 1039 from pixel 1041 and transmits the received light as a cone of light 1049. As described further elsewhere herein, the cone of light 1049 may have one or both of the cone angle and central ray direction changed from that of the cone of light 1039. The plurality of pixels 1044 are disposed along a surface 1033, which in the illustrated embodiment is a substantially planar surface. In other embodiments, the surface 1033 may be curved. For example, a curved display panel (e.g., LCD or OLED panel) may comprise the plurality of pixels. A surface, such as surface 1033, along which pixels are disposed may be referred to as a pixelated surface.

The plurality of pixels in FIG. 10 are represented by discrete spaced apart dark lines. In other figures, pixels may be represented by open spaces between dark lines. In FIG. 10, the spaces between the dark lines represent gaps between adjacent pixels. Pixels 1044 have a pixel width w, which may be a width across the pixel along a repeat direction (e.g., the y-direction in FIG. 10) of the pixels, and a gap g, which may be a width of the space between adjacent pixels along the repeat direction. In some embodiments, adjacent pixels are spaced apart by about 10 percent to about 100 percent of the pixel width (e.g., g/w is in a range of about 0.1 to about 1). In some embodiments, the gap between adjacent pixels includes a light absorbing material 1036, which may be, for example, black chrome. In OLED displays, for example, a light absorbing black matrix may be included between adjacent pixels as is known in the art. Including a light absorbing material between adjacent pixels can improve contrast in an optical system including a light emitting system and a lens system having a partial reflector since light incident on the lens system that is reflected back to the light emitting system can be at least partially absorbed by the light absorbing material. In other embodiments, the gap between adjacent pixels is substantially light transmissive. This may be the case in an at least partially transparent display panel, such as an at least partially transparent OLED display panel, for example. In this case, contrast can be improved since light incident on the lens system that is reflected back to the light emitting system can be at least partially transmitted through the light emitting system without reflecting back through the lens system which could cause a reduction in contrast. In some embodiments, the spacing between adjacent pixels may be small. For example, in some embodiments, the gap between adjacent pixels is less than 10 percent of the pixel width, or less than 5 percent of the pixel width (e.g., g/w is less than 0.1, or less than 0.05). In some embodiments, the gap, g, between adjacent pixels is less than 2 micrometers, or less than 1 micrometer, or less than 0.5 micrometers.

Figure 11A:
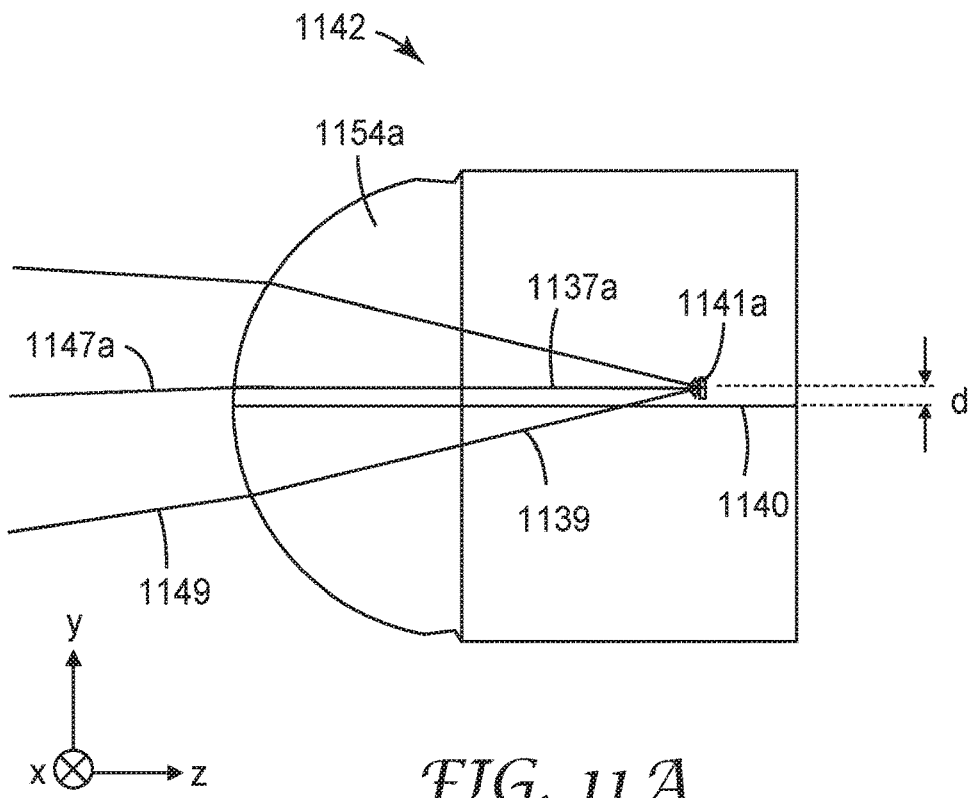
FIGS. 11A-11B are cross-sectional views of pixels including light redirecting elements.

FIG. 11A illustrates a pixel 1142 including a light emitter 1141 and a lens 1154a. The light emitter 1141 emits cone of light 1139 having central ray 1137, and lens 1154a receives the cone of light 1139 and transmits the received light as cone of light 1149 having central light ray 1147. Lens 1154a is centered on optical axis 1140 which is laterally offset from light emitter 1141 by a distance d. Pixel 1142 may correspond to the combination of pixel 1041 and light redirecting element 1056, for example. A light emitting system including a plurality of the pixels 1142 may be used for any of light emitting systems 132, 232, 332, 432, and 532, in optical system 100, 200, 300, 400 and 500, respectively, for example. As described further elsewhere herein, the lateral offset distance d may increase monotonically from a center of a display panel to an edge of the display panel.

Figure 11B:
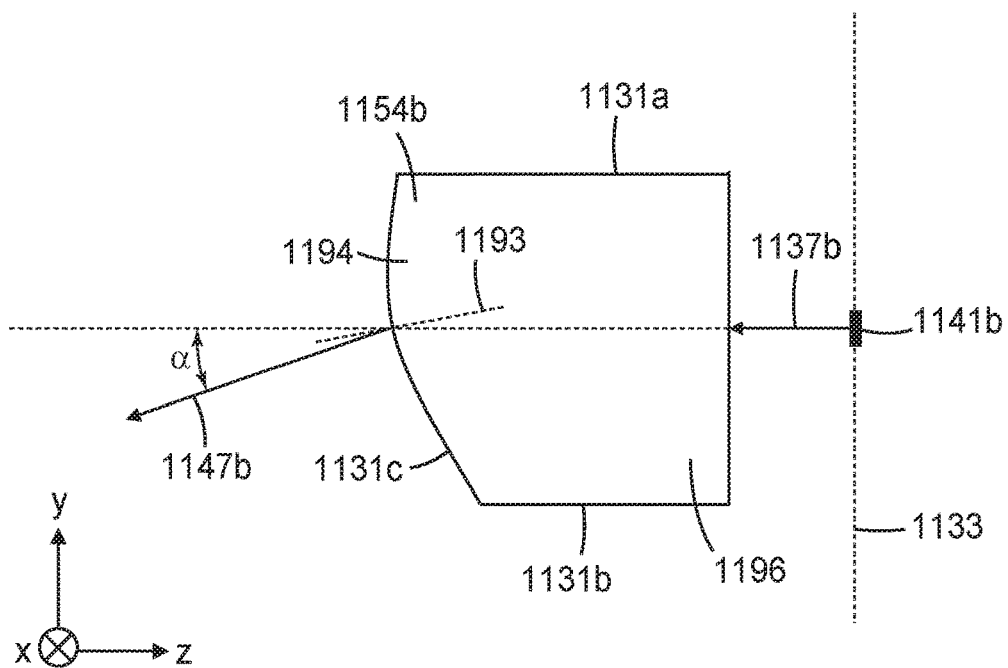

A light redirecting element may be a lens which may include a spherical or aspherical portion rotationally symmetric about an optical axis of the lens, or may be a prismatic element which may have one or more curved surfaces. FIG. 11B shows a lens or light redirecting element 1154b which may be used in place of lens 1154a. In some embodiments, a plurality of light redirecting element 1154b may be arranged periodically with a pitch selected to match a corresponding pixel pitch in a pixelated light source. The pixels in the pixelated light source may be disposed along a pixelated surface 1133 which may be a substantially planar surface or a substantially curved surface. Light redirecting element 1154b includes opposing first and second sides 1131a and 1131b and a curved surface 1131c connecting the first and second sides 1131*a* and 1131*b*. Light redirecting element 1154*b* can be described as having a lens portion 1194 which includes the curved surface 1131*c* and a prismatic base portion 1196. The base portion 1196 may have a square or rectangular cross-section, for example, in a plane parallel to surface 1133 containing the light emitter 1141*b* (a plane parallel to the x-y plane of FIG. 11B). First and second sides 1131*a* and 1131*b* may be planar faces, for example. The base portion 1196 may have a circular cross-section, for example, in a plane parallel to the surface 1133. First and second sides 1131*a* and 1131*b* may then be opposite sides of a cylindrical base 1196. In some embodiments, the first side 1131*a* extends further from the surface 1133 along a normal to the surface 1133 (normal along the minus z-direction) than the second side 1131*b*. A prismatic element may be understood to include a prism component (e.g., base portion 1196) and a lens component (e.g., curved surface 1131*c*) where the lens component has at least one convex surface.

Light emitter 1141*b* emits a first cone of light having a central light ray 1137*b*. The first cone of light is received by light redirecting element 1154*b* and transmitted as a second cone of light having central light ray 1147*b*. Central light ray 1137*a* may be along a first cone axis and central light ray 1137*b* may be along a second cone axis. An angle α between the first and second cone axes may be at least 5 degrees or at least 10 degrees, or may be in a range of 5 degrees to 50 degrees or to 60 degrees, for example. The light redirecting element 1154*b* may be asymmetric about the first cone axis. The curved surface 1131*c* may be rotationally asymmetric about the first cone axis and substantially rotationally symmetric about axis 1193 which is not parallel to the first cone axis and may not be parallel to the second cone axis.

In some embodiments, an imaging system includes a plurality of light emitters 1141*b* and a plurality of light redirecting elements 1154*b*. The light emitter 1141*b* together with the corresponding light redirecting element 1154*b* may be referred to as a pixel and an imaging system may include a plurality of such pixels. In some embodiments, for a first pixel in the plurality of pixels, a first angle between the first and second cone axes is greater than 5 degrees, or greater than 10 degrees, and for a different second pixel in the plurality of pixels, a second angle between the first and second cone axes is greater than 5 degrees, or greater than 10 degrees, and is different from the first angle. In some embodiments, for a majority of pixels in the plurality of pixels, the first and second cone axes are not parallel and in some embodiments, for a majority of pixels in the plurality of pixels, an angle between the first and second cone axes is at least 5 degrees, or at least 10 degrees, or in a range of 5 degrees to 50 degrees or to 60 degrees.

Figure 12:
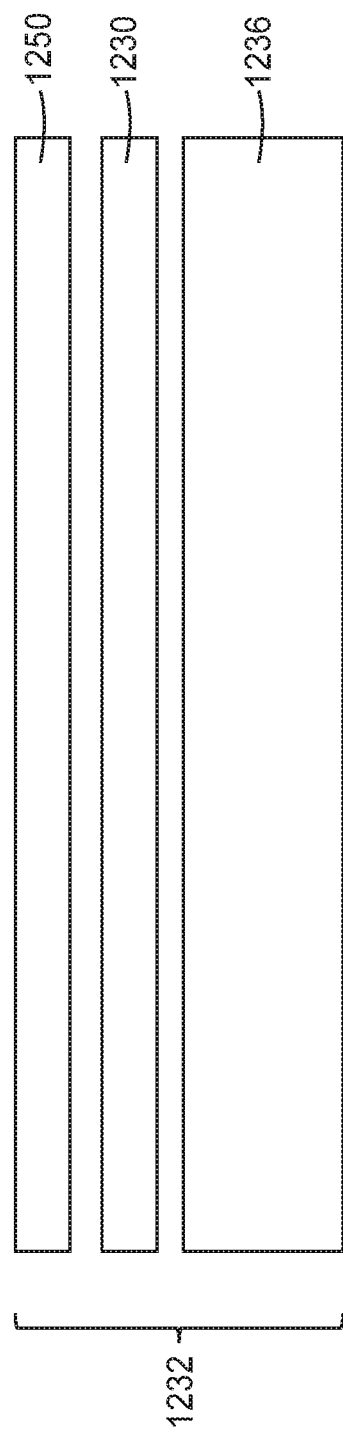
FIGS. 12-15 are schematic cross-sectional views of light emitting systems.

FIG. 12 is a schematic side view of light emitting system 1232 including a display panel 1230 comprising a plurality of discrete spaced apart pixels and disposed to receive light from backlight 1236 and transmit patterned light through light redirecting layer 1250. Display panel 1230 may be any suitable spatial light modulator such as a liquid crystal display (LCD) panel, or a grating based modulator, or an interference based modulator, or an electrochromic modulator, or an electrophoretic modulator. In other embodiments, an organic light emitting display (OLED) comprises the plurality of discrete spaced apart pixels and the backlight 1236 may be omitted. Light emitting system 1232 may be used for any of light emitting systems 132, 232, 332, 432, and 532, in optical system 100, 200, 300, 400 and 500, respectively, for example.

In some embodiments, backlight 1236 may be an at least partially collimating backlight. A backlight may be said to be an at least partially collimating backlight if the light output from the backlight is substantially more collimated than a Lambertian light output. In some embodiments, at least 50 percent of a lumen output of the at least partially collimating backlight is in a 60 degree, or a 50 degree, or a 40 degree, or a 30 degree, or a 25 degree, or a 20 degree full width cone. In some embodiments, at least 60 percent of a lumen output of the at least partially collimating backlight is in a 70 degree, or a 60 degree, or a 50 degree, or a 40 degree, or a 30 degree, or a 25 degree full width cone.

Figure 13:
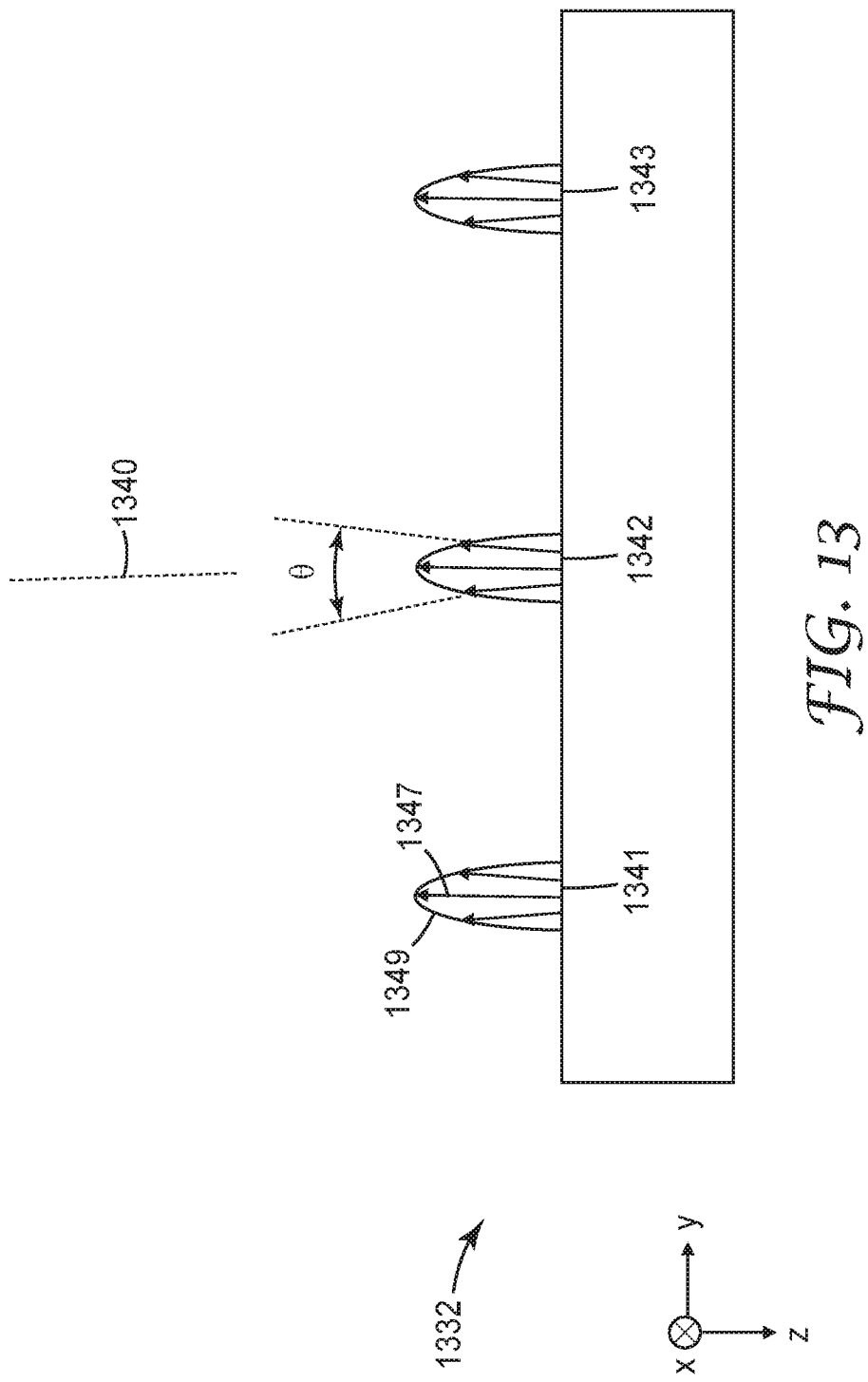

FIG. 13 is a schematic side view of light emitting system 1332 including pixels 1341, 1342, and 1343. Light emitting system 1332 may be used for any of light emitting systems 132, 232, 332, 432, and 532, in optical system 100, 200, 300, 400 and 500, respectively, for example Each pixel is adapted to emit a cone of light having a central ray and a cone angle. Pixel 1341 emits cone of light 1349 having central light ray 1347 which in the illustrated embodiment is parallel to optical axis 1340, which may be an optical axis of a lens system disposed to receive light from light emitting system 1332. Pixel 1342 emits a cone of light having a full width cone angle θ. Light emitting system 1332 may include a display panel with a light redirecting layer adapted to reduce the cone angle of light emitted by the display panel, which may be an LCD or an OLED display panel, for example. In other embodiments, an at least partially collimating backlight may be used with a display panel to produce an output with a lowered cone angle compared to that produced with a conventional backlight. For example, an at least partially collimating backlight may produce a light output such that at least 50 percent of the lumen output is in a 50 degree full width cone or in any of the ranges described elsewhere herein for a partially collimating backlight. A light redirecting layer may be included to further reduce the cone angle or the light redirecting layer may be optionally omitted. In the illustrated embodiment, the light output direction of each of the pixels 1341, 1342 and 1343 is substantially parallel to the optical axis 1340. In other embodiments, the light redirecting layer and/or the at least partially collimating backlight may alter the direction of light emitted from the light emitting system. This is illustrated in FIGS. 14-15.

Figure 14:
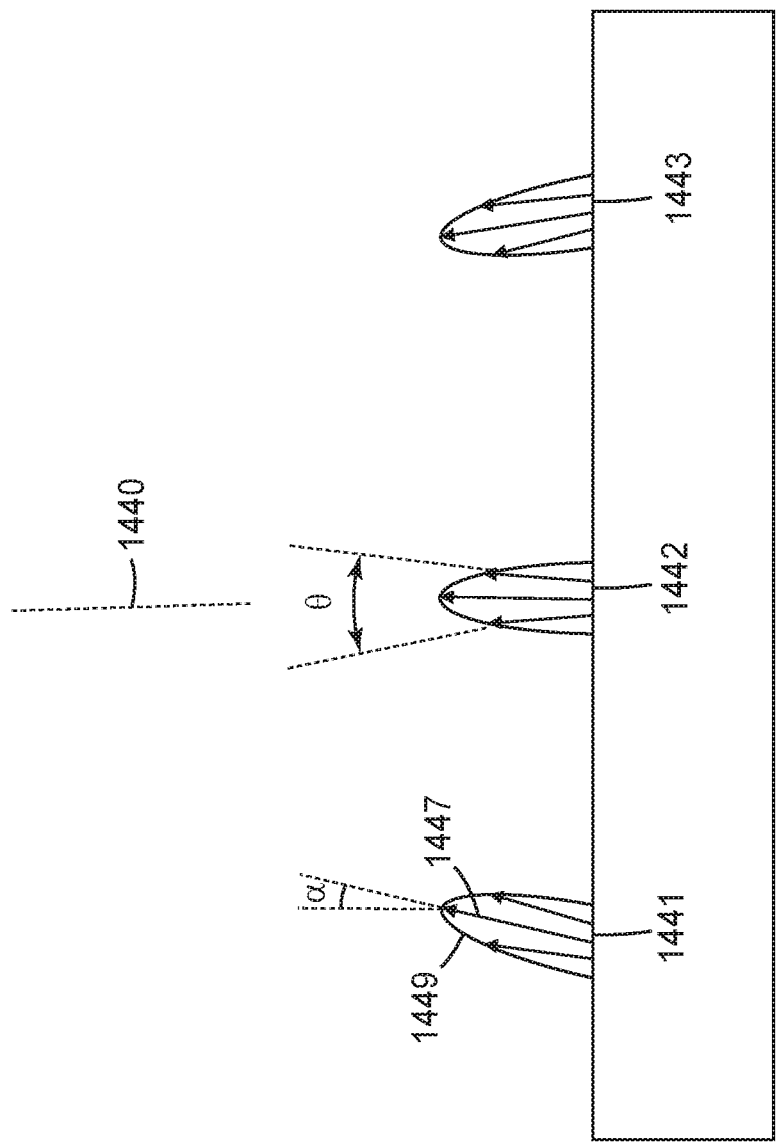

FIG. 14 is a schematic side view of light emitting system 1432 including pixels 1441, 1442, and 1443. Light emitting system 1432 may be used for any of light emitting systems 132, 232, 332, 432, and 532, in optical system 100, 200, 300, 400 and 500, respectively, for example. Each pixel emits a cone of light having a cone angle and a central ray. Pixel 1441 emits cone of light 1449 having a central ray 1447 emitted along a direction making an angle α to the optical axis 1440 of the light emitting system 1432 or of a lens system disposed to receive light from light emitting system 1432. Pixel 1442 emits a cone of light having a cone angle θ. Light from each of pixels 1441 and 1443 is bent toward optical axis 1440, while light from pixel 1442 is emitted substantially along optical axis 1440. In some embodiments, light from each of pixels 1441, 1442, and 1443 are at least partially collimated. In other embodiments, light from the pixels may have a direction altered without being at least partially collimated. In some embodiments, an at least partially collimated backlight is used to produce at least partially collimated light output from light emitting system 1432. In some embodiments, a first portion of the backlight is configured to emit light at least partially collimated in a first direction and a different second portion of the backlight is configured to emit light at least partially collimated in a second different direction. For example, light from the backlight at a location corresponding to pixel 1441 may be at least partially collimated along the direction of central ray 1447 and light from the backlight at a location corresponding to pixel 1442 may be at least partially collimated along a direction parallel to the optical axis 1440. In some embodiments, light from the at least partially collimated backlight may be partially collimated along a direction which varies smoothly across the emitting surface of the backlight.

Figure 15:
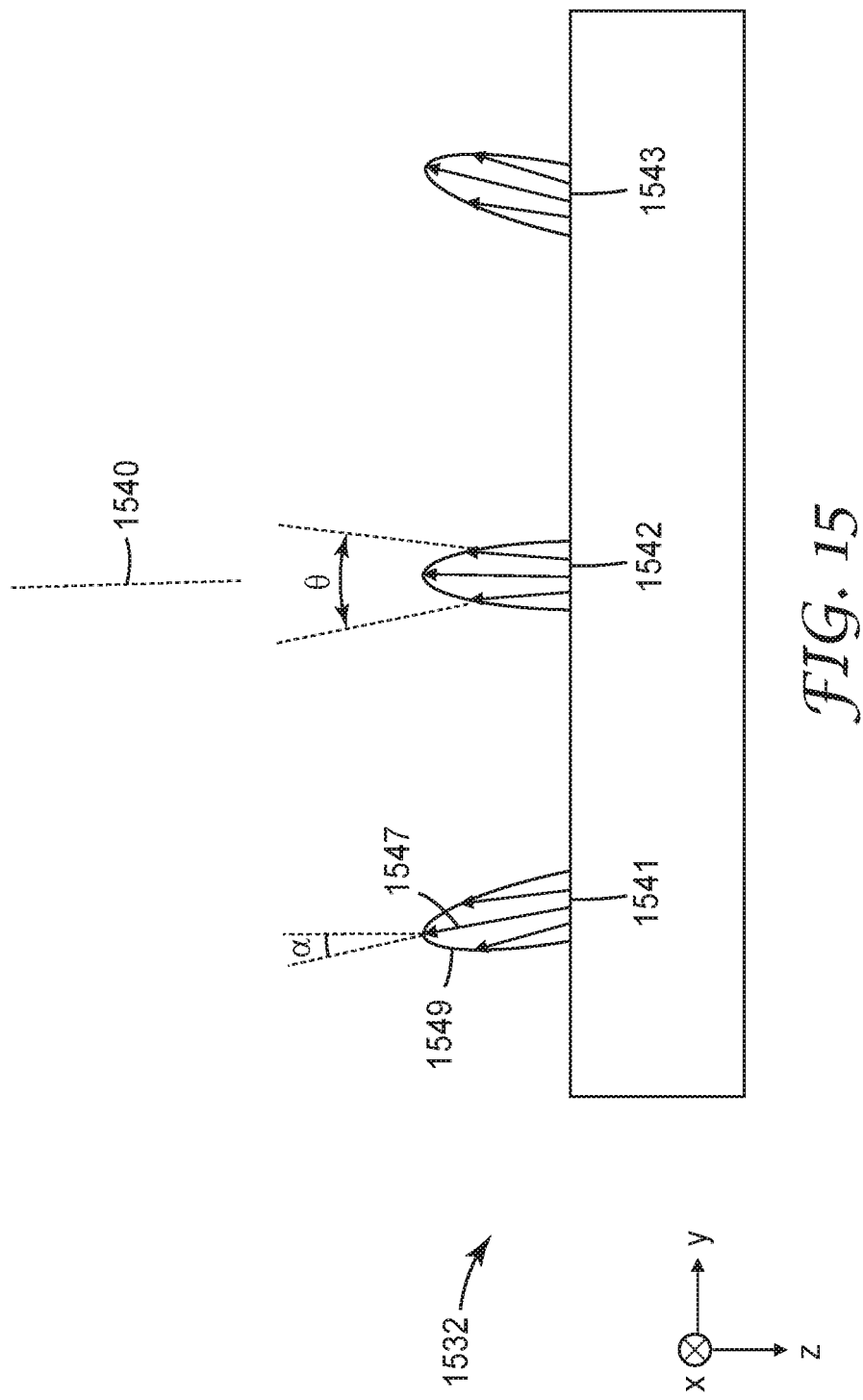

FIG. 15 is a schematic side view of light emitting system 1532 including pixels 1541, 1542, and 1543. Each pixel emits a cone of light having a cone angle and a central ray. Pixel 1541 emits cone of light 1549 having a central ray 1547 emitted along a direction making an angle α to the optical axis 1540 of the light emitting system 1532 or of a lens system disposed to receive light from light emitting system 1532. Pixel 1542 emits a cone of light having a cone angle θ. Light from each of pixels 1541 and 1543 is bent away optical axis 1540, while light from pixel 1542 is emitted substantially along optical axis 1540. In some embodiments, light from each of pixels 1541, 1542, and 1543 are at least partially collimated. In other embodiments, light from the pixels may have a direction altered without being at least partially collimated. In some embodiments, an at least partially collimated backlight is used to produce at least partially collimated light output from light emitting system 1532 as further described in connection to FIG. 14.

FIG. 16A is a cross-sectional view of optical system 1600 including lens system 1619, and light emitting system 1632 which includes liquid crystal display panel 1630 and backlight 1636 which is an at least partially collimating backlight and may be adapted to provide an output direction that varies with location. Backlight 1636 includes light guide 1663 which includes collimating optical element 1660 and light extraction element 1665 having a surface 1667 structured such that light is extracted from the light guide 1663 as an at least partially collimated light. Backlight 1636 further includes light source 1661 which is configured to inject light into collimating optical element 1660, and back reflector 1668 disposed adjacent light extraction element 1665. Light source 1661 may be any suitable light source such as a light emitting diode (LED) or a plurality of LEDs. Light from the light source 1661 may be at least partially collimated as it passes through collimating optical element 1660 by virtue of the tapered geometry of the collimating optical element 1660. Light is extracted from light extraction portion 1665 towards back reflector 1668 and the light is then reflected from the back reflector 1668 and is transmitted through the light extraction portion 1665 as an at least partially collimated light along desired output directions towards lens system 1619.

In some embodiments, an at least partially collimating backlight that is adapted to provide an output direction that varies with location is combined with a light redirecting layer. In such embodiments, backlight provides an output that is partially turned towards a desired direction to be utilized by the lens system and the light redirecting layer receives this partially turned light and transmits light in a direction more closely matched to the desired direction for the lens system.

Collimating element 1660 is a light insertion portion of the light guide 1663. Light guide 1663 further a light transport portion 1664 disposed to receive light from the collimating optical element 1660 through first fold 1671 and to transport light to the light extraction element 1665 through second fold 1674. Structured surface 1667 of light extraction element 1665 may include light extractors oriented to produce light output along desired output directions. The surface can be suitably structured by using a structured stamping tool, such as a structured nickel stamping tool, for example. Suitable stamping tools can be prepared by machining, such as by single point diamond machining Exemplary diamond turning systems and methods can include and utilize a fast tool servo (FTS) as described in, for example, PCT Published Application No. WO 00/48037 (Campbell et al.), and U.S. Pat. No. 7,350,442 (Ehnes et al.) and U.S. Pat. No. 7,328,638 (Gardiner et al.). An at least partially collimated backlight may include gratings adapted to produce light output along desired output directions. Such backlights are described by Fattal et al., "A multi-directional backlight for a wide-angle, grasses-free three dimensional display", Nature, Vol. 495, pp. 348-351, Mar. 21, 2013. In some embodiments, structured surface 1667 may include a series of steps 1666 with sloped portions 1669 between the steps as described, for example, in U.S. 2013/0321913 (Harold et al.) which is hereby incorporated herein by reference to the extent that it does not contradict the present description. Steps 1666 and sloped portions 1669 in structured surface 1667 can be formed by machining, for example. The sloped portions 1669 cause light to be extracted from the light extraction element 1665. The distribution of output directions of such backlights can be adjusted by adjusting the distribution of slopes of the sloped portions 1669 between the steps 1666. In some embodiments, the steps have a curved shape as described further elsewhere herein (see, e.g., FIG. 16C).

Optical system 1600 has an exit pupil 1635 and further includes optical polarizer 1670 which may be a reflective polarizer, an absorptive polarizer, a combination of an absorptive and reflective polarizer, or may optionally be omitted.

Lens system 1619 includes first and second optical lenses 1610 and 1620. First lens 1610 includes a major surface 1614 upon which is disposed a partial reflector having an average optical reflectance of at least 30% in a desired plurality of wavelengths as described elsewhere herein. Second lens 1620 includes a major surface 1626 upon which is disposed a reflective polarizer, which may be a thermo-formed or pressure-formed reflective polarizer and may be a polymeric multilayer reflective polarizer or a wire grid polarizer, for example. A quarter-wave retarder may be disposed on the reflective polarizer.

Any of optical systems 100, 200, 300, 400, 500 or 1600 for example, may be referred to as a display system or as an imaging system. Any of these optical systems may be used in a head-mounted display such as a virtual reality display.

Figure 16C:
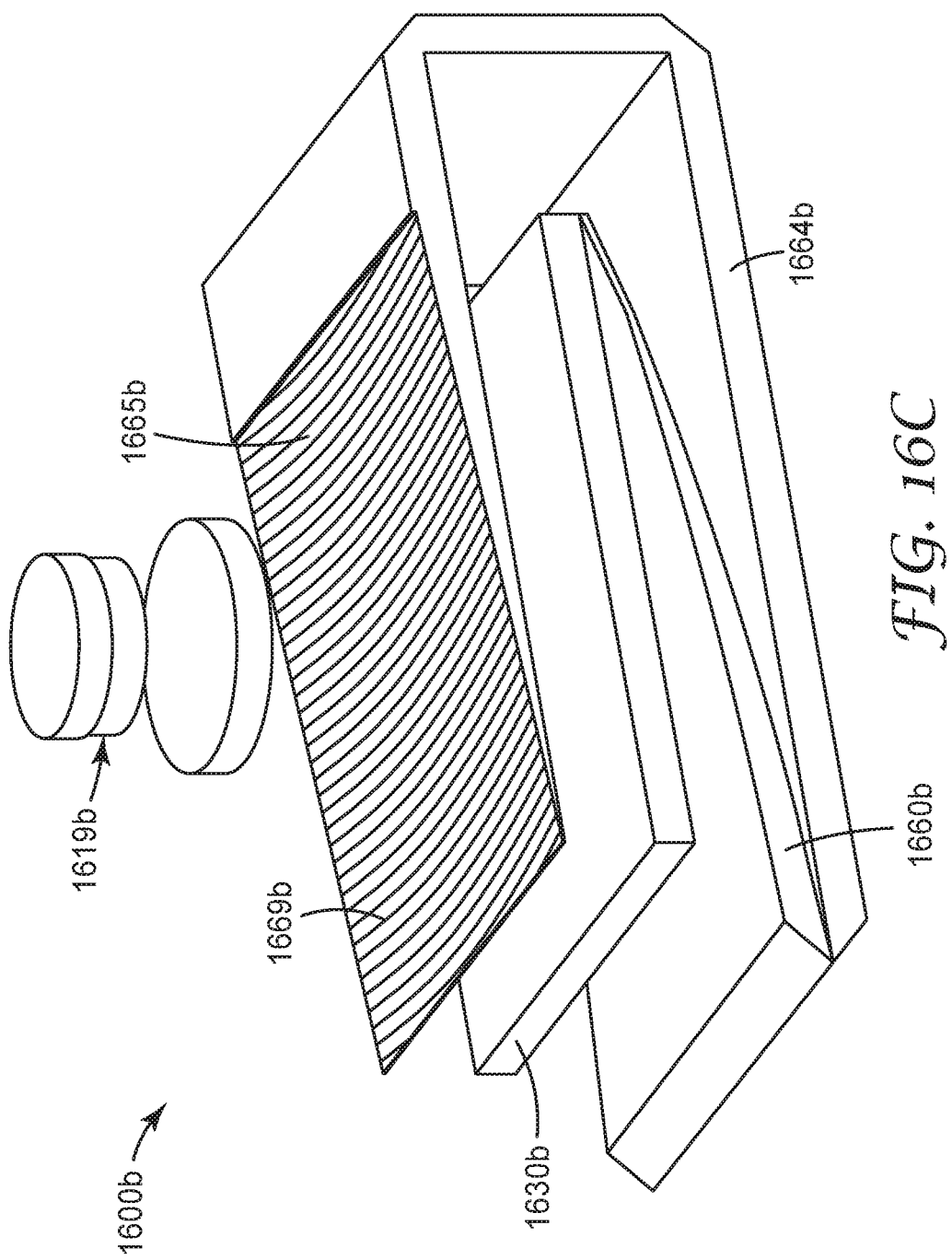

FIGS. 16B and 16C are cross-sectional and perspective views, respectively, of display system 1600b including an imager 1630b for forming an image and a projection lens system 1619b for projecting the image formed by the imager 1630b. The imager 1630b includes a plurality of pixels. For each pixel in the plurality of pixels, the imager is configured to emit a cone of light having a central ray. The central ray has a direction that varies with location of the pixel in the imager 1630b by virtue of the geometry of the light extraction element 1665. In some embodiments, the variation of the central ray direction increases a brightness of an image projected through the projection lens system by at least 30 percent, or at least 50 percent or at least 100 percent, or at least 200 percent. The image projected through the projection lens is a patterned light that may or may not be in focus throughout the image. For example, the image projected through the projection lens may have a central portion forming an in-focus image and a peripheral portion which may not be in focus. The projection lens system 1619b may be a refractive lens system as illustrated in FIG. 16B or may be a folded optical system including first and second partial reflectors adjacent to and spaced apart from each other. For example, in some embodiments, the projection lens system 1619b corresponds to the lens system 119 and the first partial reflector corresponds to partial reflector 117 while the second partial reflector corresponds to reflective polarizer 127. In some embodiments, the projection lens system 1619b has an acceptance angle and the variation in the central ray direction increases light emitted by the imager 1630b that is within the acceptance angle by at least 30 percent, or at least 50 percent or at least 100 percent, or at least 200 percent.

In some embodiments, the projection lens system 1619b has a largest lateral optically active dimension D1 that is less than about 80 percent (or less than about 60%, or less than about 50%, less than about 40%) of a largest lateral optically active dimension D2 of the imager 1630b. The largest lateral optically active dimension of a component refers to the largest lateral dimension, which is the largest dimension in the x-y plane of FIG. 16B, of the portion of the component which is optically utilized in forming the output of the display system 1600b. For example, a pixelated display panel typically has a rectangular area of pixels that is optically active with some border region around the rectangular area of pixels that is not optically active. The largest lateral optically active dimension is the diagonal of the rectangular area of pixels in this case. As another example, a lens may have a circular area that receives and transmits light and the diameter of this circular area is the largest lateral optically active dimension in this case.

The display system 1600b includes a light guide 1663 having a light insertion portion 1660b and a light extraction portion 1665b in optical communication with the light insertion portion 1660b and with the imager 1630b. The light guide 1663b is folded such that such that the light extraction portion 1665b faces the faces the light insertion portion 1660b. The light guide 1663b includes a light transport portion 1664b configured to receive light from the light insertion portion 1660b from first fold 1671b and transport the light to the light extraction portion 1665b through second fold 1673b. The imager 1630b may be a reflective spatial light modulator (e.g., a liquid crystal on silicon (LCoS) panel) disposed between the light extraction portion 1665b and the light insertion portion 1660b. Alternatively, the imager may be a transmissive spatial light modulator disposed proximate the light extraction portion opposite the light insertion portion as illustrated in FIG. 16A. In the embodiment of FIG. 16B, light is extracted from light extraction portion 1665b as an at least partially collimated light towards imager 1630b which reflects an imaged light back through light extraction portion 1665b towards lens system 1619b.

Lens system 1619b has an optical axis 1640b (parallel to z-axis). The light insertion portion 1660b and the light extraction portion 1665b are spaced apart along an optical axis 1640b of the lens system 1619b. The optical axis 1640b intersects the light insertion portion 1660b and the light extraction portion 1665b.

In some embodiments, structured surface 1667b includes a series of steps 1666b with sloped portions 1669b between the steps 1666b as described for structured surface 1667, steps 1666 and slope portions 1669 of FIG. 16A. Steps 1666 or 1666b may be described as discrete spaced apart light extraction features. Other discrete spaced apart light extraction features suitable for extracting light from the light extraction portion can be used in place of the steps. In some embodiments, the shape of the light extraction features concentrates light toward the imager by a combination of curvature around the z-axis, which concentrates light along the x-axis, and changes in angle of the extraction features along the y-axis, which concentrates light along the y-axis. The extraction features may be uncoated material, relying on total internal reflection (TIR) to extract light, or may be coated with a metallic or dielectric reflector. Alternatively, the entire extracting surface 1667 or 1667b may be coated with a reflective polarizer. This can be created through a MacNeille polarizer, a wire grid polarizer, or a polymeric multilayer optical film reflective polarizer such as APF or Dual Brightness Enhancement Film (DBEF) available from 3M Company, St Paul, Minn. The reflective polarizer can be shaped to conform to the extracting elements. This can be done by, for example, applying a thin layer of an adhesive to the structured surface 1667 or 1667b, and applying a reflective polarizer film (such as APF) to the surface with heat and/or pressure to conform the film to the structured surface. One or more surfaces of the light guide 1663 or 1663b may have a low index coating with the refractive index of the coating being able to maintain TIR conditions within the light guide. In some embodiments, the low index coating has a refractive index about 0.05 to 0.2 lower than the refractive index of the light guide (unless specified differently, refractive index refers to the refractive index as measured at 532 nm). The low index coating may be optically thick and may have a physical thickness of at least 0.5 micrometers or at least 1 micrometer, for example.

Figure 26:
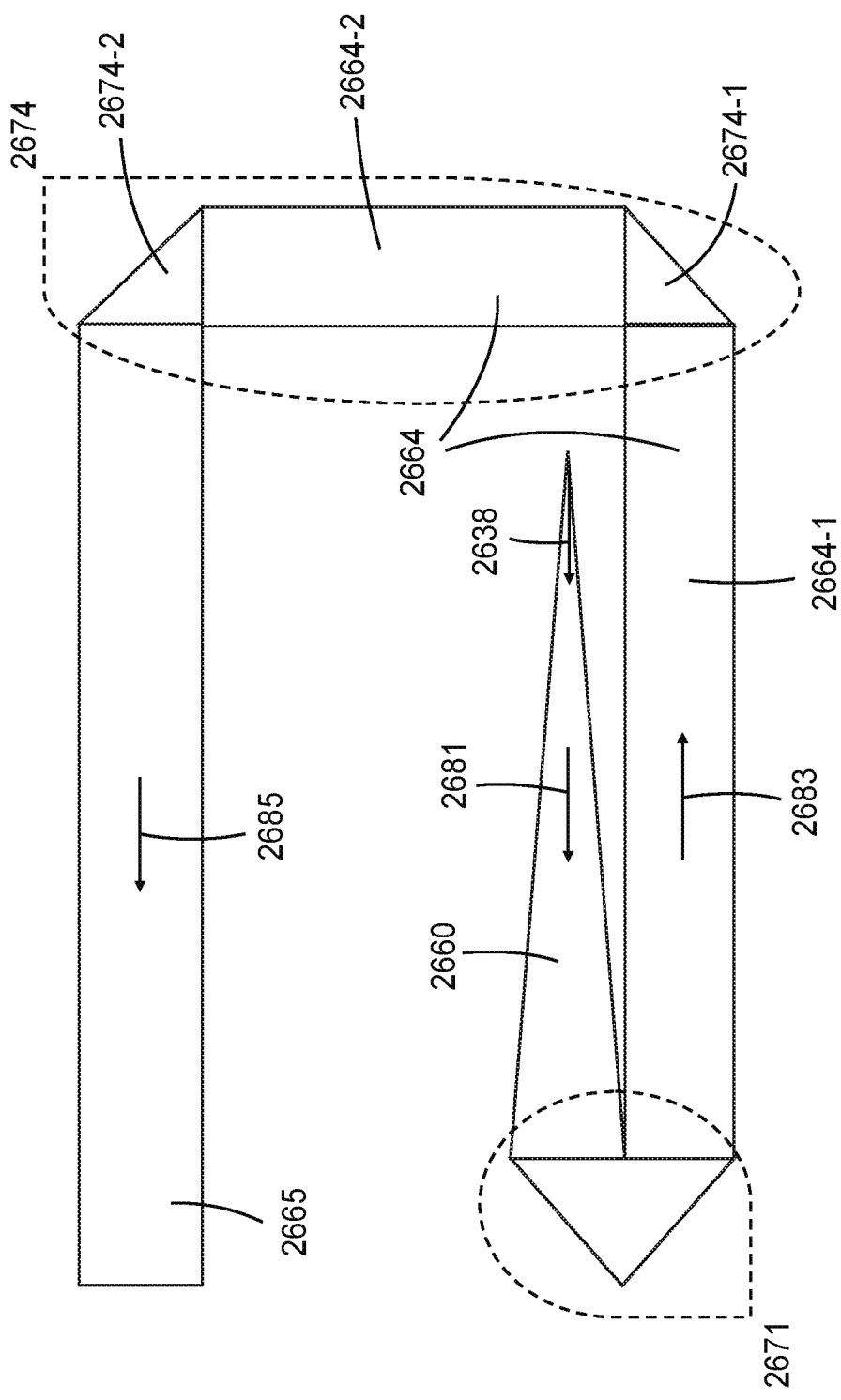
Figure 27:
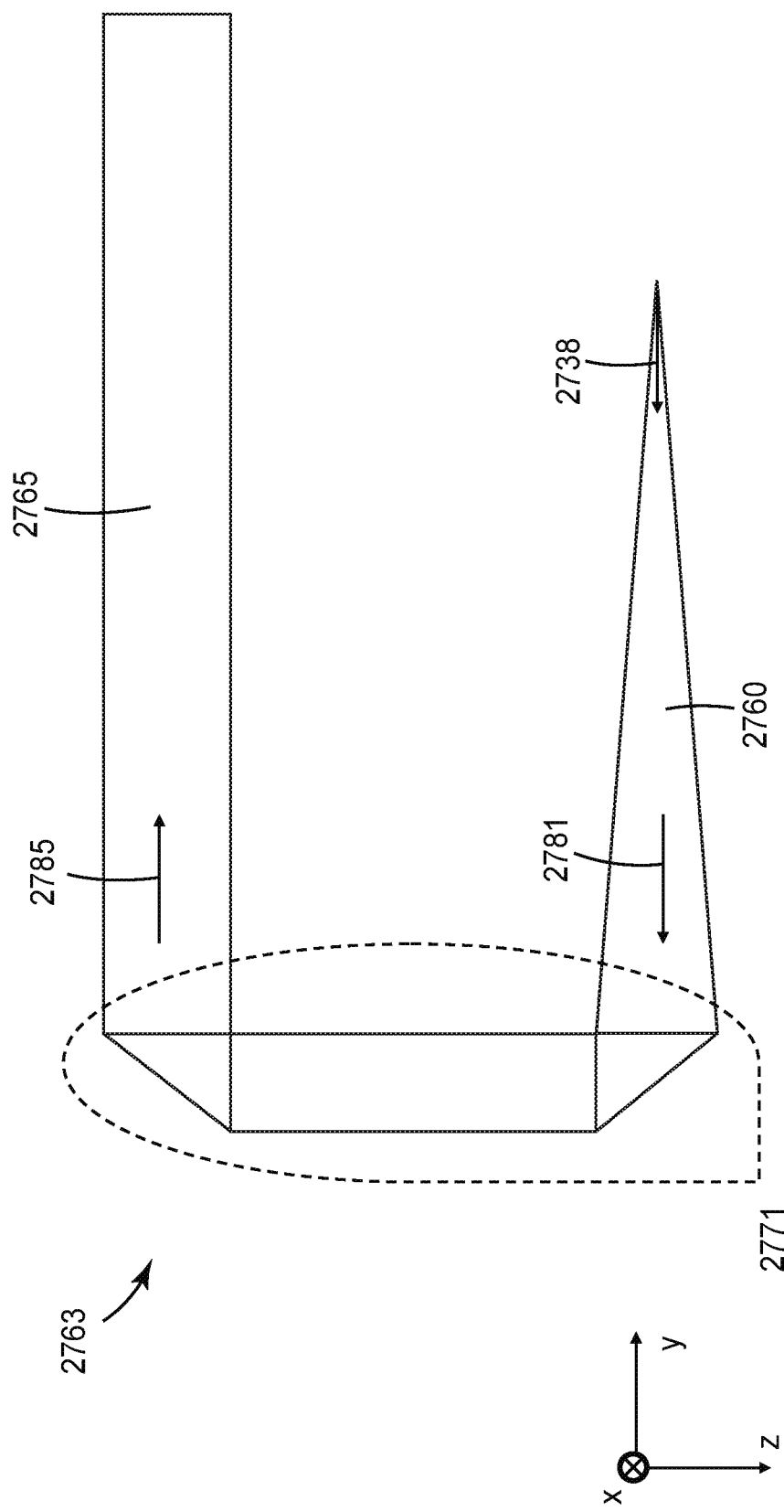

Other suitable light guides suitable for use in optical system 1600 or display system 1600b are illustrated in FIGS. 26-28.

FIG. 26 is a schematic cross-sectional view of light guide 2663 including a light insertion portion 2660 adapted to receive light 2638; a light transport portion 2664 disposed to receive light from the light insertion portion 2660, the light transport portion 2664 having a first segment 2664-1 and a second segment 2664-2; and a light extraction portion 2665 disposed to receive light from the light transport portion 2664. The light 2638 received by the light insertion portion 2660 propagates predominately along a first direction 2681, the light received by the light transport portion 2683 propagates predominately along a second direction 2683 in the first segment 2664-1, and the light received by the light extraction portion propagates predominately along a third direction 2685. A first included angle between the first and second directions 2681 and 2683 is at least 140, or at least 150 degrees, or at least 160 degrees, or is about 180 degrees, and a second included angle between the first and third directions is less than 40 degrees, or less than 30 degrees, or less than 20 degrees. In the illustrated embodiment, the first included angle is about 180 degrees and the second included angle is about zero degrees. The first and second included angles can be changed by changing the orientation of the light insertion portion 2660 and/or the orientation of the light extraction portion 2685 such that one of both of the portions is tilted from the x-y plane. The included angle between two directions refers to the principle value of the inverse cosine (which is, by definition, in a range of zero to 180 degrees) of the dot product of the unit vectors along the two directions. For example, referring to FIG. 29, which is a schematic representation of an included angle between two directions, the inverse cosine of the dot product of unit vectors 2981 and 2985 gives the angle φ which is the included angle between a first direction along unit vector 2981 and a second direction along unit vector 2985. Since an included angle must be between zero and 180 degrees, specifying an included angle as greater than 140 degrees is equivalent to specifying the included angle as between 140 degrees and 180 degrees, for example.

The light transport portion 2664 is disposed to receive light from the light insertion portion 2660 through a first fold 2671 and to transport the light to the light extraction portion 2665 though a second fold 2674. The second fold 2674 includes a first sub-fold 2674-1 and a second sub-fold 2674-2.

FIG. 27 is a schematic cross-sectional view of light guide 2763 which includes a light insertion portion 2760 adapted to receive light 2738, and a light extraction portion 2765 disposed to receive light from the light insertion portion 2760. The light extraction portion 2765 receives light from the light insertion portion 2760 through fold 2771. The light received by the light insertion portion 2760 propagates predominately along a first direction 2781, and the light received by the light extraction portion 2765 propagates predominately along a second direction 2765. An included angle between the first direction 2781 and the second direction 2785 is at least 120 degrees, or at least 140 degrees, or at least 160 degrees. For example, the included angle may be in a range of 160 to 180 degrees, or may be about 180 degrees as illustrated. The light extraction portion 2765 may include a plurality of light extraction features adapted to extract light from the light extraction portion towards a projection lens system as illustrated in FIGS. 16A-16C, for example. An angle within 5 degrees of zero degrees may be described as about zero degrees and an angle within 5 degrees of 180 degrees may be described as about 180 degrees.

The light guides 2663 and 2763 each include a light insertion portion adapted to receive light; a light transport portion disposed to receive light from the light insertion portion through a first fold; and a light extraction portion disposed to receive light from the light transport portion through a second fold. In each case, the light extraction portion is spaced apart from and faces the light insertion portion. In some embodiments, the light extraction portion and the light insertion portion may contact each other or may be separated by only a small gap. FIG. 28 is a schematic cross-sectional view of light guide 2863 which includes a light insertion portion 2860 and a light extraction portion 2865 optically connected to each other through a fold 2871. The light extraction portion 2865 may include a plurality of light extraction features adapted to extract light from the light extraction portion 2865 towards a projection lens system as illustrated in FIGS. 16A-16C, for example. Light propagates in light insertion portion 2860 primarily along first direction 2881 and light propagates in light extraction portion 2865 primarily along second direction 2885. The included angle between the first and second directions 2881 and 2885 may be in at least 140 degrees, for example.

Figure 17:
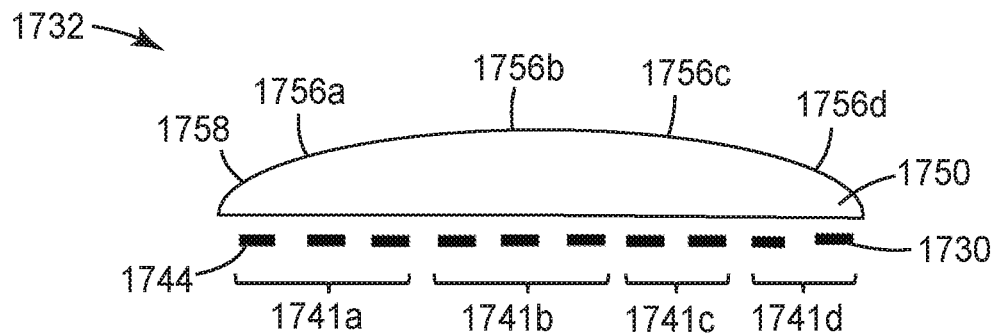
FIGS. 17-22 are cross-sectional views of light emitting systems.

In some embodiments, a light redirecting layer includes a concave surface that is concave toward the pixelated light source with each different portion of the concave surface corresponding to a different group of pixels in the pixelated light source. The portions of the concave surface may be in one to one correspondence with the groups of pixels. This is illustrated in FIG. 17 which is a schematic side view of light emitting system 1732 including light redirecting layer 1750 and pixelated light source 1730. Light emitting system 1732 may be used for any of light emitting systems 132, 232, 332, 432, and 532, in optical system 100, 200, 300, 400 and 500, respectively, for example. In the illustrated embodiment, light redirecting layer 1750 includes a single optical element having a concave surface 1758 which is concave towards light redirecting layer 1730. Pixelated light source 1730 includes a plurality of pixels 1744 which includes a plurality of groups of pixels including groups 1741a, 1741b, 1741c, and 1741d. Concave surface 1758 includes a plurality of portions 1756a, 1756b, 1756c, and 1756d. Each different portion corresponding to a different group of pixels. For example, light from group of pixels 1741a may pass through portion 1756a of concave surface 1758 and may substantially not pass through other portions of the concave surface 1758. This can be achieved placing the pixels in close proximity to the concave surface 1758. In embodiments where an LCD panel comprises the plurality of pixels, a thin outer glass layer may be used as described elsewhere herein in order to position the light redirecting layer 1750 closer to the plurality of pixels. In embodiments where an LCD panel comprises the plurality of pixels, the light redirecting layer 1750 may be formed from an outer glass layer of the LCD panel as described elsewhere herein in order to position the surface 1758 close to the plurality of pixels 1744. In some embodiments, when pixelated light source 1732 is used in an optical system including a lens system, such as those including a partial reflector and a reflective polarizer as described elsewhere herein, any light from a group of pixels that passes through any portion of concave surface 1758 other than the portion corresponding to the group of pixels may be outside an acceptance angle of the lens system and therefore not utilized by the optical system.

Figure 18:
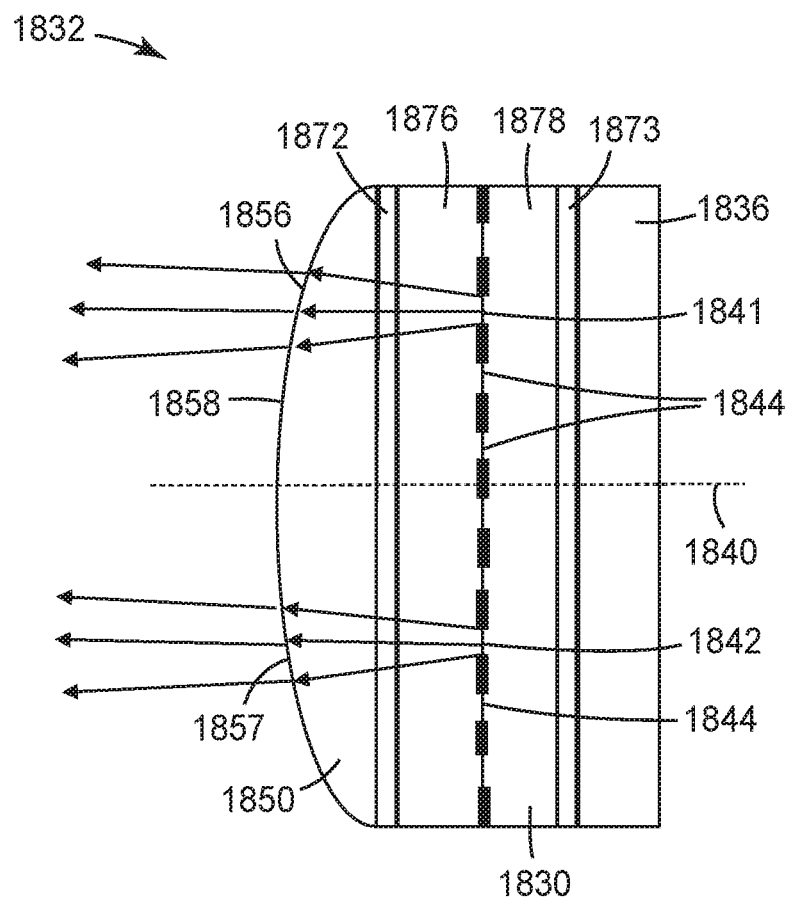

FIG. 18 is a schematic cross-sectional view of light emitting system 1832 including a liquid crystal display panel 1830, a backlight 1836, and a light redirecting layer 1850 having a concave light redirecting surface 1858. Although a liquid crystal display panel is illustrated in FIG. 18, light redirecting layer 1850 may be used with other types of pixelated displays, such as an OLED display, for example Light emitting system 1832 may be used for any of light emitting systems 132, 232, 332, 432, 532, in optical system 100, 200, 300, 400 and 500, respectively, for example. Liquid crystal display panel 1830 includes a plurality of pixels 1844 disposed between first and second glass layers 1876 and 1878. The plurality of pixels 1844 includes first pixel 1841 and second pixel 1842. A first polarizer 1872 is disposed between the light redirecting layer 1850 and the liquid crystal display panel 1830 and a second polarizer 1873 is disposed between the liquid crystal display panel 1830 and the backlight 1836. The backlight 1836 may be an at least partially collimating backlight as described elsewhere herein. Light emitting system 1832 is centered on an optical axis 1840. Light redirecting layer 1850 is a single light redirecting element in the illustrated embodiment. Light redirecting layer 1850 includes a concave light redirecting surface 1858 which is concave toward liquid crystal panel 1830. Concave light redirecting surface 1858 includes first portion 1856 adapted to receive light from first pixel 1841 and includes second portion 1857 adapted to receive light from second pixel 1842. In some embodiments, concave light redirecting surface 1858 includes a plurality of different portions with each different portion being in one to one correspondence with a different pixel, or with a different group of pixels, in the plurality of pixels 1844.

Figure 19:
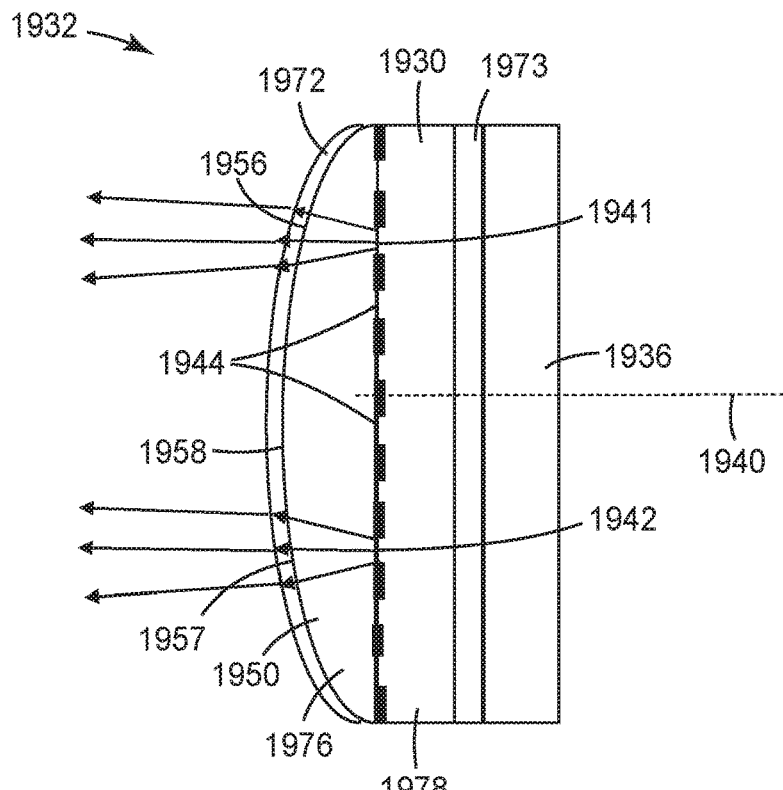

FIG. 19 is a schematic cross-sectional view of light emitting system 1932 including a liquid crystal display panel 1930, a backlight 1936, and a light redirecting layer 1950 having a concave light redirecting surface 1958. Liquid crystal display panel 1930 includes a plurality of pixels 1944 disposed between first and second glass layers 1976 and 1978. The light redirecting layer 1950 is formed from first glass layer 1976 by, for example, etching the outer surface of the first glass layer 1976 to form concave light redirecting surface 1958. Suitable glass etching methods that can be used to form concave light redirecting surface 1958 are known in the art and are described, for example, in U.S. Pat. Pub. No. 2002/0079289 (Doh). Suitable glass etchants include hexafluorosilicic acid and hydrogen fluoride.

The plurality of pixels 1944 includes first pixel 1941 and second pixel 1942. A first polarizer 1972 is disposed on concave light redirecting surface 1958, and a second polarizer 1973 is disposed between the liquid crystal display panel 1930 and the backlight 1936. The backlight 1936 may be an at least partially collimating backlight as described elsewhere herein. Light emitting system 1932 is centered on an optical axis 1940. Concave light redirecting surface 1958 includes first portion 1956 adapted to receive light from first pixel 1941 and includes second portion 1957 adapted to receive light from second pixel 1842. As described further elsewhere herein, in some embodiments, concave light redirecting surface 1958 includes a plurality of different portions with each different portion being in one to one correspondence with a different pixel, or with a different group of pixels, in the plurality of pixels 1944. Light emitting system 1932 may be used for any of light emitting systems 132, 232, 332, 432, 532, in optical system 100, 200, 300, 400 and 500, respectively, for example.

In some embodiments of light emitting system 1832 or 1932, each different portion of the concave light redirecting surface corresponds to a different group of pixels in the plurality of pixels and receives a first diverging light emitted by a pixel in the group of pixels having a first cone angle and transmits the received light as a second diverging light having a second cone angle less than the first cone angle. In some embodiments, light from a pixel in a group of pixels is either substantially not transmitted through any portion of the light redirecting layer not corresponding to the group of pixels or is at most partially transmitted through a portion of the light redirecting layer not corresponding to the group of pixels in a direction that is not within an acceptance angle of a lens system adapted to receive light from the light emitting system.

Figure 20:
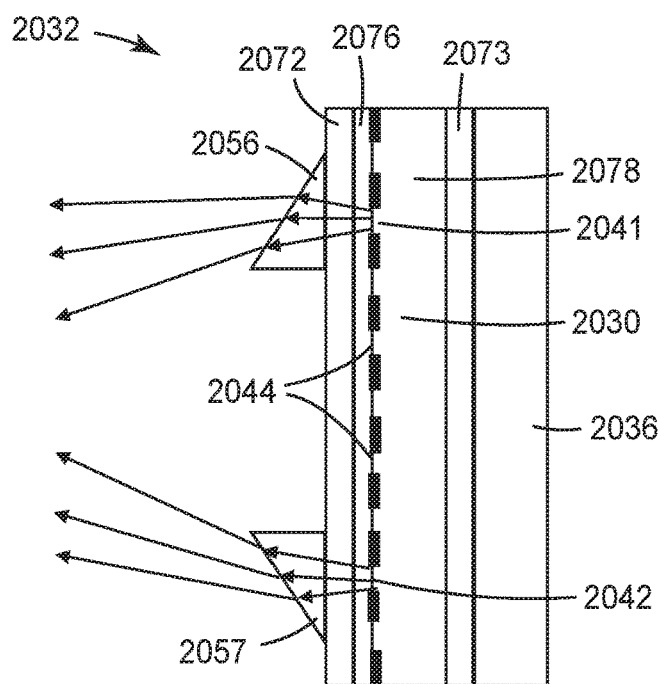

FIG. 20 is a schematic cross-sectional view of light emitting system 2032 including a plurality of light redirecting elements which includes light redirecting element 2056 and 2057, a liquid crystal display panel 2030 having a plurality of discrete spaced apart pixels 2044 provided by a liquid crystal layer between first and second glass layers 2076 and 2078. The first glass layer 2076 may have a reduced thickness compared to conventional LCD displays or compared to the second glass layer 2078 in order to position the light redirecting elements 2056 and 2057 closer to the apertures defining the plurality of pixels 2044. Although a liquid crystal display panel is illustrated in FIG. 20, light redirecting elements 2056 and 2057 may be used with other types of pixelated displays, such as an OLED display, for example. The liquid crystal display panel 2030 is disposed between first and second polarizers 2072 and 2073 and is illuminated by backlight 2036 which may be an at least partially collimating backlight as described elsewhere herein. Each light redirecting element may correspond to a group of pixels in the plurality of pixels, where the group may be a single pixel or a plurality of pixels. Light redirecting elements may be included for some, for most, or for all of the pixels. For example, light redirecting elements may be included for all pixels except for pixels located near an optical axis of the light emitting system 2032 or of an optical system including a lens system and the light emitting system 2032. Light emitting system 2032 may be used for any of light emitting systems 132, 232, 332, 432, 532, in optical system 100, 200, 300, 400 and 500, respectively, for example Each of the light redirecting elements may be prismatic elements and may optionally include one or more curved surfaces. In alternate embodiments, a plurality of microlenses may be used in place of some or all of the prismatic elements. In still other embodiments, a light redirecting layer comprising a Fresnel lens may be used in place of individual light redirecting elements. This is illustrated in FIG. 21.

Figure 21:
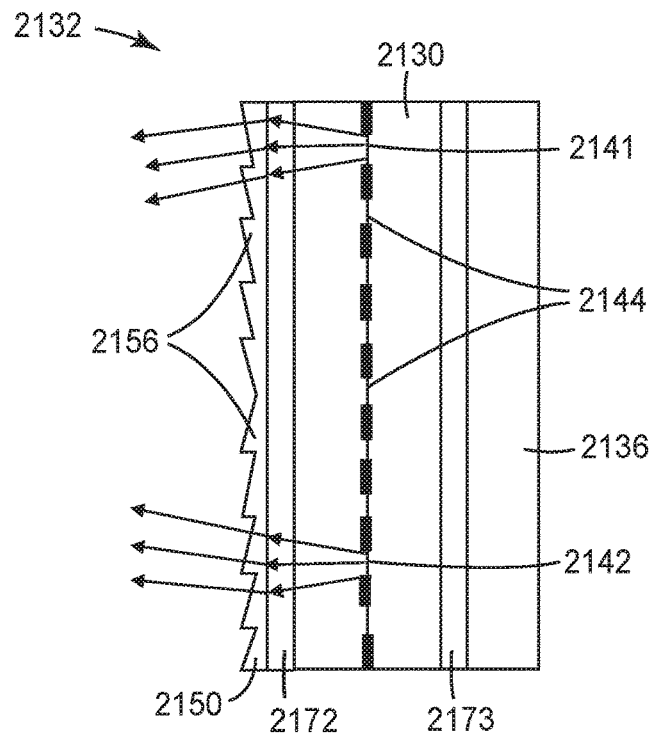

FIG. 21 is a cross-sectional view of light emitting system 2132 including light redirecting layer 2150 and liquid crystal display panel 2130 which includes a plurality of discrete spaced apart pixels 2144. Although a liquid crystal display panel is illustrated in FIG. 21, light redirecting layer 2150 may be used with other types of pixelated displays, such as an OLED display, for example. Liquid crystal panel 2130 is disposed between first and second polarizers 2172 and 2173 and illuminated by backlight 2136, which may be an at least partially collimating backlight as described elsewhere herein. Light redirecting layer 2150 includes light redirecting elements 2156 and may be a Fresnel lens or may be a blazed diffraction grating. In some embodiments, at least some of the light redirecting element 2156 are concentric rings. Each light different redirecting element 2156 may correspond to a different group of pixels in the plurality of discrete spaced apart pixels 2144. For example, if a light redirecting element is a concentric ring shaped element, the group of pixels corresponding the light redirecting element may be the plurality of pixels disposed under the concentric ring. In still other embodiments, light redirecting layer 2150 may be replaced by other types of light redirecting elements. For example, light redirecting layer 2150 may be a holographic optical element.

Light emitting system 2132 may be used for any of light emitting systems 132, 232, 332, 432, 532, in optical system 100, 200, 300, 400 and 500, respectively, for example.

Figure 22:
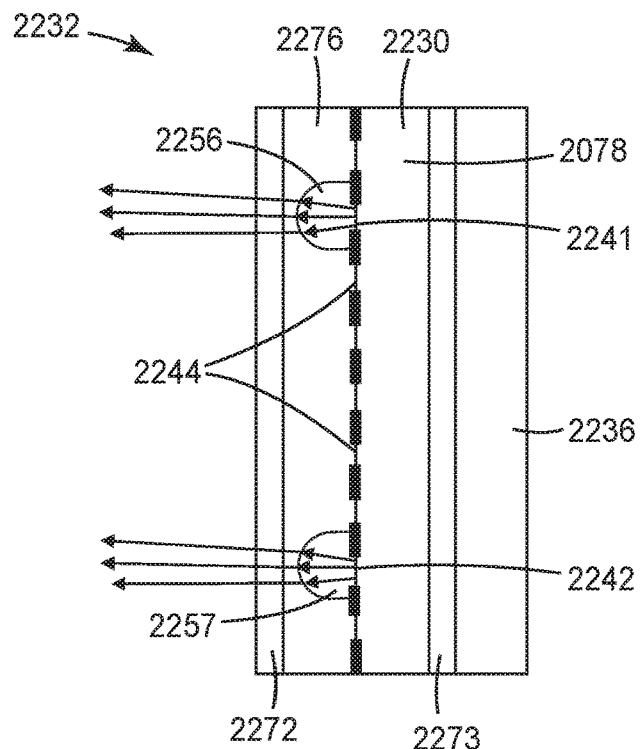

FIG. 22 is a schematic cross-sectional view of light emitting system 2232 including liquid crystal display panel 2230 which includes a plurality of pixels 2244 and first and second glass layers 2276 and 2278. A plurality of lenses including lenses 2256 and 2257 are formed in first glass layer 2276. The lenses may be formed by etching the first glass layer 2276 and filling the etched out regions with a material having a refractive index different than that of the first glass layer 2276. For example, a higher refractive index material may be used in order to reduce a divergence angle of light emitted by a corresponding pixel. Suitable high index materials include polymeric materials filled with high refractive index nanoparticles such as those described in U.S. Pat. No. 8,343,622 (Liu et al.) which is hereby incorporated herein to the extent that it does not contradict the present description. Each different lens in the plurality of lenses may correspond to a different group of pixels in the plurality of pixels. Each group of pixels may be a single pixel or may include a plurality of pixels. Light emitting system 2232 may be used for any of light emitting systems 132, 232, 332, 432, 532, in optical system 100, 200, 300, 400 and 500, respectively, for example.

The light redirecting layer or light redirecting elements of any of the light emitting systems 1732, 1832, 1932, 2032, 2132 and 2232, may be adapted to bend light output from at least one pixel, or of a majority of the pixels, toward or away from an optical axis of the light redirecting layer or light redirecting elements or toward or away from an optical axis of a display system incorporating a lens system and the light redirecting layer or elements.

Figure 23:
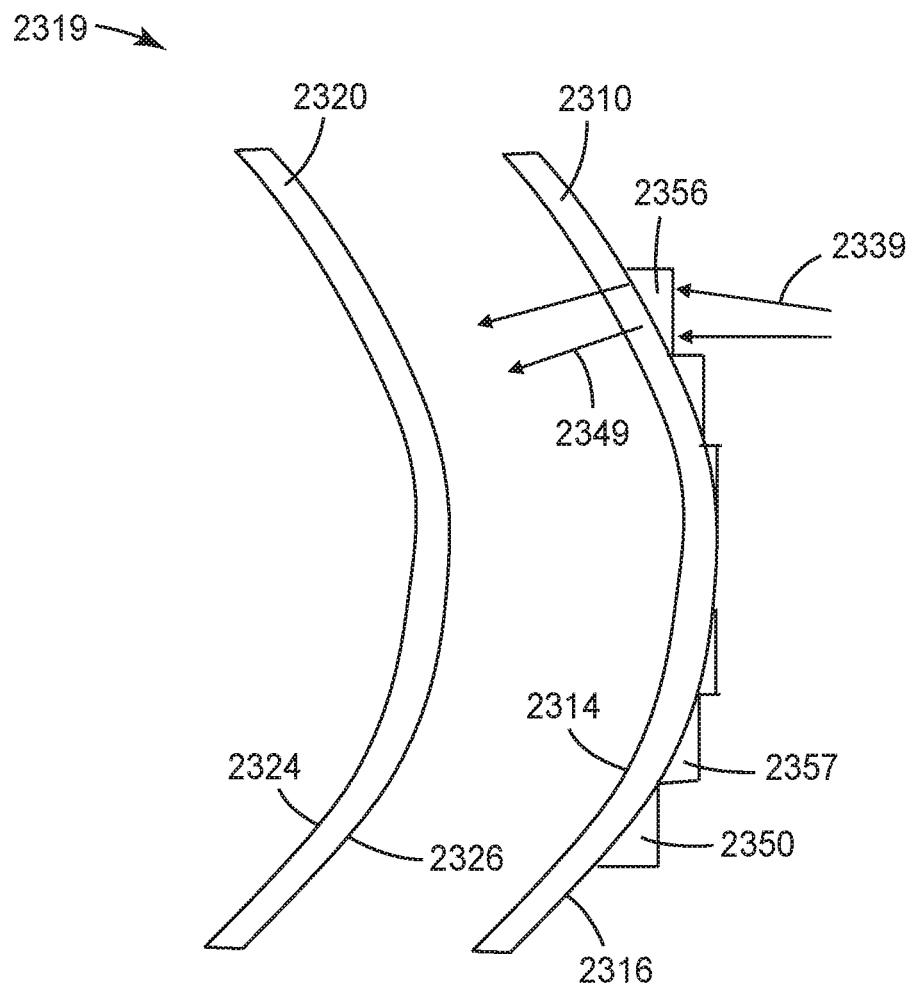
FIG. 23 is a cross-sectional view of a lens system.

An alternative to including a light redirecting layer on a display panel is to include a light redirecting layer on a lens disposed to receive light from a display panel. FIG. 23 is a schematic cross-sectional view of lens system 2319 including first and second optical lenses 2310 and 2320. First optical lens 2310 includes opposing first and second major surfaces 2314 and 2316, the first major surface 2314 being an inner major surface and the second major surface 2316 being an outer major surface. Second optical lens 2320 includes opposing first and second major surfaces 2324 and 2326. Lens system 2319 includes a partial reflector which may be disposed on first major surface 2314 of first lens 2310. Lens system 2319 also includes a reflective polarizer configured to substantially transmit light having a first polarization state and substantially reflect light having an orthogonal second polarization state. The reflective polarizer is disposed adjacent to and spaced apart from the partial reflector and may be disposed on the second lens 2320. In some embodiments, the reflective polarizer is disposed on second major surface 2326. In some embodiments, a quarter-wave retarder is disposed on the reflective polarizer. The partial reflector may have an average optical reflectance of at least 30% in a desired plurality of wavelengths as described elsewhere herein.

The second major surface 2316 of the first optical lens 2310 includes a plurality of light redirecting elements 2350 including light redirecting elements 2356 and 2357. Each light redirecting element is adapted to receive a first cone of light and transmit the received light as a second cone of light towards the partial reflector. For example light redirecting element 2356 is adapted to receive first cone of light 2339 and transmit the received light as second cone of light 2349. As described further elsewhere herein, each light redirecting element may be adapted to change one or both of a divergence angle and a central ray direction of the received cone of light. Lens system 2319 may be used in place of lens systems 119 or 219 in the optical systems 100 or 200, respectively, for example.

The reflective polarizer included in lens system 2319 may be curved about one or two orthogonal axes. In some embodiments, the reflective polarizer is a multilayer polymeric film and in some embodiments the reflective polarizer is a thermoformed or pressure-formed multilayer reflective polarizer such as APF as described elsewhere herein.

In some embodiments, a brightness of a display system including a pixelated light emitting system and lens system 2319 disposed to receive light emitted by the pixelated system at an exit pupil of the display system is at least 30 percent higher than that of an otherwise equivalent display system not including the plurality of light redirecting elements 2350. In some embodiments, the brightness of the display system at the exit pupil is at least 100 percent higher, or at least 200 percent higher, or at least 300 percent higher than that of the otherwise equivalent display system.

Figure 24:
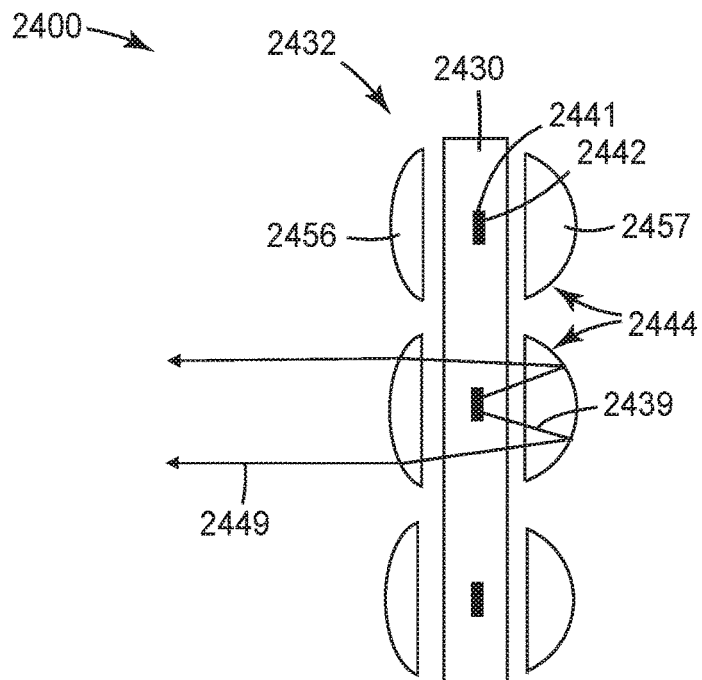
FIG. 24 is a cross-sectional view of a light emitting system.

FIG. 24 is a schematic cross-sectional view of a portion of a display system 2400 including a light emitting system 2432 which includes a plurality of light emitting pixels 2444. Each light emitting pixel includes an optional optically transparent first light redirecting element 2456 having an average optical transmittance of at least 50% in a desired plurality of wavelengths, an optically reflecting second light redirecting element 2457 concave toward the first light redirecting element 2456 and having an average optical reflectance of at least 50% in the desired plurality of wavelengths, and a light emitting material 2441 disposed between the first and second light redirecting elements 2456 and 2457. The light emitting material 2441 may be included in a display panel 2430 which may be an at least partially transmissive OLED display panel, for example. The display panel 2430 is shown as a substantially planar panel in FIG. 24, but in other embodiments the display panel may be curved (see, e.g., FIG. 1B) or may include a plurality of planar portions not all in a same plane (see, e.g., FIG. 1C). In some embodiments, a center 2442 of the second light redirecting element 2457 lies within the light emitting material 2441. For example, the second light redirecting element 2457 may have a concave reflective surface having a center of curvature or a focal point that lies within the light emitting material 2441. In some embodiments, light emitted by the light emitting material 2441 is substantially collimated by the first and second light redirecting elements 2456 and 2457. In some embodiments, the optional first light redirecting element 2456 is omitted and light emitted by the light emitting material 2441 is substantially collimated by the second light redirecting element 2457. For example, light emitting material in the panel 2430 may emit a diverging first cone of light 2439 which is reflected from a concave second light redirecting element and transmitted through a first light redirecting element as substantially collimated light 2449.

Display system 2400 may further include a lens system, such as lens systems 119 or 219, for example, disposed to receive light from the light emitting system 2432 and transmit at least a portion of the received light to an exit pupil of the display system 2400.

Optical transmittance or reflectance of various components (e.g., partial reflector, quarter-wave retarder, transmissive optical elements, and reflective optical elements) may be specified by an average in a desired or predetermined plurality of wavelengths. The desired or pre-determined plurality of wavelengths may, for example, be any wavelength range in which the optical system is designed to operate. The pre-determined or desired plurality of wavelengths may be a visible range, and may for example, be the range of wavelengths from 400 nm to 700 nm. In some embodiments, the desired or pre-determined plurality of wavelengths may be an infrared range or may include one or more of infrared, visible and ultraviolet wavelengths. In some embodiments, the desired or pre-determined plurality of wavelengths may be a narrow wavelength band, or a plurality of narrow wavelength bands, and the partial reflector, for example, may be a notch reflector. In some embodiments, the desired or pre-determined plurality of wavelengths include at least one continuous wavelength range that has a full width at half maximum of no more than 100 nm, or no more than 50 nm.

Figure 25:
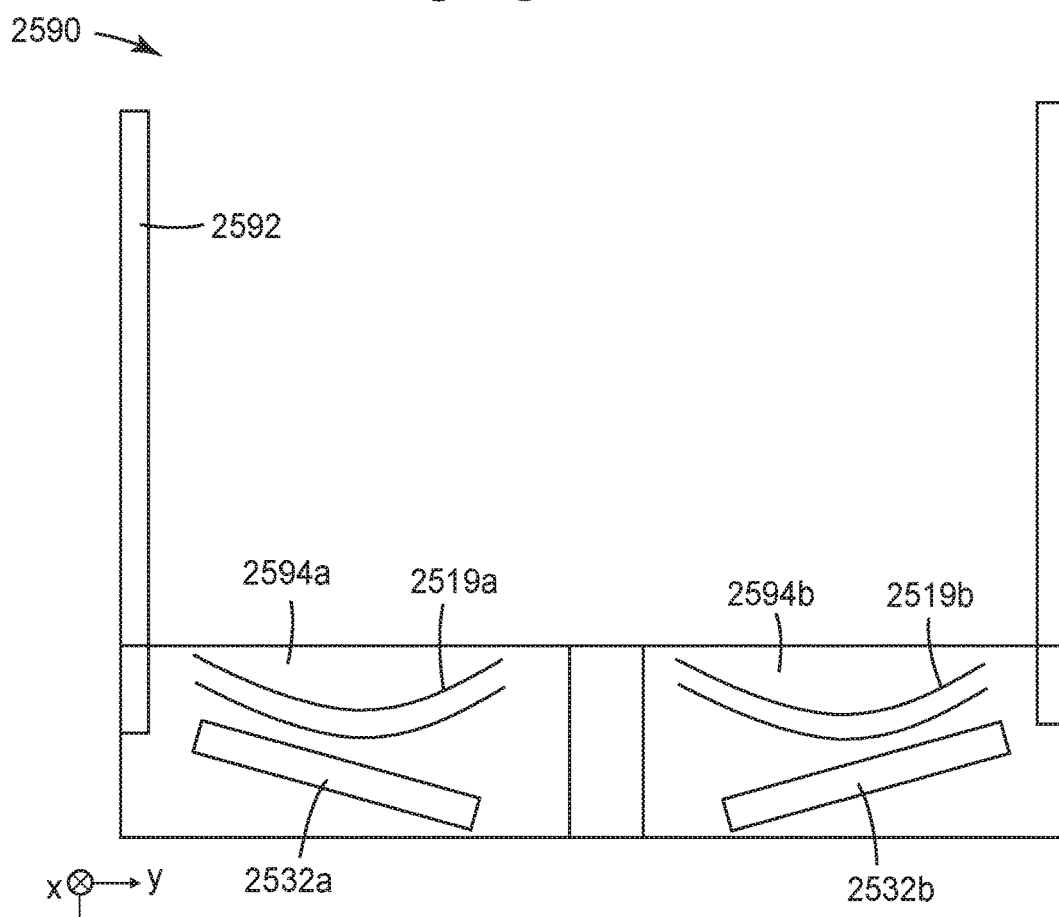
FIG. 25 is a schematic top view of a head-mounted display.

Any of the optical systems of the present description may be used in a device such as a head-mounted display (e.g., a virtual reality display). FIG. 25 is a schematic top view of head-mounted display 2590 including a frame 2592, first and second display portions 2594a and 2594b which may include any of the optical systems of the present description. In the illustrated embodiment, first display portion 2594a includes lens system 2519a and light emitting system 2532a and display portion 2594b includes lens system 2519b and light emitting system 2532b. Each of lens systems 2519a and 2519b may include a reflective polarizer and a partial reflector as described elsewhere herein. Each of light emitting systems 2532a and 2532b may include a plurality of pixels and a light redirecting layer and/or an at least partially collimating backlight as described elsewhere herein. In some embodiments, lens systems 2519a and 2519b are centered on an optical axis (e.g., an axis parallel to the z-axis in FIG. 25) and light emitting systems 2532a and 2532b are disposed at an obtuse angle relative to the corresponding optical axis. In other embodiments, the light emitting systems 2532a and 2532b are disposed at right angles to the corresponding optical axis and may be centered on the corresponding optical axis. Light redirecting layers of the light emitting systems 2532a and 2532b may redirect light output by the corresponding pixels so that it is within the acceptance angle of the corresponding lens system. In embodiments where the light emitting system is disposed at an obtuse angle to the optical axis of a lens system, the light redirecting elements of the light emitting system may include a curved surface, such as curved surface 1131c, which is asymmetric about the optical axis.

EXAMPLES

Example 1

A folded optic lens system with elements described in the following table was modeled using Zemax 15 lens design software.

| Surface Type | Radius (mm) | Thickness (mm) | Material | Semi-Diameter (mm) | Conic |
|---|---|---|---|---|---|
| OB Standard | Infinity | Infinity | NA | Infinity | 0.000 |
| ST Standard | Infinity | 10.000 | NA | 3.542 | 0.000 |
| 2 Even Asphere | 36.671 | 5.000 | Polycarbonate | 15.000 | −20.921 |
| 3 Even Asphere | −66.536 | 2.261 | NA | 15.391 | 13.841 |
| 4 Even Asphere | −37.346 | −2.261 | Mirror | 15.589 | 2.644 |
| 5 Even Asphere | −66.536 | 2.261 | Mirror | 14.989 | 13.841 |
| 6 Even Asphere | −37.346 | 6.000 | E48R | 14.931 | 2.644 |
| 7 Even Asphere | −7.233 | 6.001 | NA | 15.167 | −3.173 |
| IM Standard | Infinity | NA | NA | 12.205 | 0.000 |

In the above table, OB refers to the object and the surfaces are listed order from the stop surface (ST) to the image surface (IM). The aspheric polynomial coefficients were taken to be zero except for surface 7 which had second, fourth, sixth, eight, and tenth order coefficients of 0.000, $-2.805 \times 10$, $1.232 \times 10^{-7}$, $-1.936 \times 10^{-10}$, and $-3.088 \times 10^{-13}$, respectively.

The lens was imported into LightTools, where a display plane was created with a central and peripheral emissive element. Each element was immersed in an NBK7 lens with a 0.1 mm diameter and a 0.05 mm radius. The emissive elements were designed to have a 0.004 mm square emissive area. Placement of the lens relative to the emissive element was optimized so as to provide the best combination of uniformity and brightness at the pupil. The near eye display with the microlens array was 8.1 times brighter than without the lens array (710 percent increase in brightness).

Example 2

An optical system similar to optical system 200 was modeled using ray tracing as follows. Optical stack 210 included a quarter wave retarder on the outer surface (surface facing panel 232) of lens 212 and partial reflector on the inner surface (surface facing exit pupil 235) of lens 212. Optical stack 220 included a linear polarizer on the outer surface (surface facing lens 212) of lens 222 and included a quarter wave retarder disposed on the linear polarizer. The quarter wave retarders were modeled as ideal retarders, the partial reflector was modeled as having a transmissivity of 50 percent and a reflectivity of 50 percent, and the linear polarizer was modeled as having a 1 percent transmissivity and a 99 percent reflectivity for light polarized along a linear block axis, and a 99 percent transmissivity and a 1 percent reflectivity for light polarized along an orthogonal linear pass axis. The lenses were as specified in the following table:

| Surface Type | Radius (mm) | Thickness (mm) | Material | Semi-Diameter (mm) | Conic |
|---|---|---|---|---|---|
| OB Standard | Infinity | Infinity | NA | Infinity | 0.0000000 |
| ST Standard | Infinity | 15.000 | NA | 3.424 | 0.0000000 |
| 2 Even Asphere | −23.172 | 2.500 | Polycarbonate | 12.500 | 0.0000000 |
| 3 Even Asphere | −18.852 | 4.691 | NA | 13.316 | 0.5582269 |
| 4 Standard | Infinity | 0.000 | NA | 21.709 | 0.0000000 |
| 5 Even Asphere | −19.441 | −4.691 | Mirror | 15.345 | −9.5827826 |
| 6 Even Asphere | −18.852 | 4.691 | Mirror | 12.193 | 0.5582269 |
| 7 Even Asphere | −19.441 | 2.000 | E48R | 15.500 | −9.5827826 |
| 8 Even Asphere | −19.441 | 1.820 | NA | 15.500 | −9.5827826 |
| 9 Standard | Infinity | 0.281 | PMMA | 14.520 | 0.0000000 |
| 10 Standard | Infinity | 0.010 | NA | 14.547 | 0.0000000 |
| 11 Standard | Infinity | 0.700 | N-BK7 | 14.548 | 0.0000000 |
| 12 Standard | Infinity | 0.000 | NA | 14.620 | 0.0000000 |
| IM Standard | Infinity | NA | NA | 14.000 | 0.0000000 |

The second through eight order aspheric polynomial coefficients used for the lens surfaces are given in the following table:

|  | 2nd Order | 4th Order | 6th Order | 8th Order |
|---|---|---|---|---|
| OB | NA | NA | NA | NA |
| ST | NA | NA | NA | NA |
| 2 | 0.0000E+00 | 0.0000E+00 | 0.0000E+00 | 0.0000E+00 |
| 3 | 0.0000E+00 | 1.2455E−05 | 1.3936E−07 | 1.8601E−09 |
| 4 | NA | NA | NA | NA |
| 5 | 0.0000E+00 | −1.4624E−04 | 9.5699E−07 | −6.0196E−09 |
| 6 | 0.0000E+00 | 1.2455E−05 | 1.3936E−07 | 1.8601E−09 |
| 7 | 0.0000E+00 | −1.4624E−04 | 9.5699E−07 | −6.0196E−09 |
| 8 | 0.0000E+00 | −1.4624E−04 | 9.5699E−07 | −6.0196E−09 |
| 9 | NA | NA | NA | NA |
| 10 | NA | NA | NA | NA |
| 11 | NA | NA | NA | NA |
| 12 | NA | NA | NA | NA |
| IM | NA | NA | NA | NA |

The tenth and higher order aspheric polynomial coefficients used for the lens surfaces are given in the following table:

|  | 10th Order (mm$^{-9}$) | 12th Order (mm$^{-11}$) | 14th Order (mm$^{-13}$) |
|---|---|---|---|
| OB | NA | NA | NA |
| ST | NA | NA | NA |
| 2 | 0.0000E+00 | 0.0000E+00 | 0.0000E+00 |
| 3 | 2.4079E−11 | −1.2664E−13 | 2.8533E−16 |
| 4 | NA | NA | NA |
| 5 | 2.3733E−11 | −5.3312E−14 | 4.9018E−17 |
| 6 | 2.4079E−11 | −1.2664E−13 | 2.8533E−16 |
| 7 | 2.3733E−11 | −5.3312E−14 | 4.9018E−17 |
| 8 | 2.3733E−11 | −5.3312E−14 | 4.9018E−17 |
| 9 | NA | NA | NA |
| 10 | NA | NA | NA |

|  | 10th Order (mm⁻⁹) | 12th Order (mm⁻¹¹) | 14th Order (mm⁻¹³) |
|---|---|---|---|
| 11 | NA | NA | NA |
| 12 | NA | NA | NA |
| IM | NA | NA | NA |

The display panel 235 was modeled as producing a checker-board pattern of bright and dark squares, each squares having a dimension of 6 mm×6 mm. The display panel had dimensions of 2.4 cm×2.4 cm. The light output was modeled as having a central ray normal to the surface of the display panel and having a cone angle of 5 degrees half width at half maximum (HWHM). This was chosen to simulate a display panel with a partially collimating backlight or with a light redirecting layer that partially collimates the light output. For comparison, a conventional display panel having a cone angle of 35 degrees HWHM was also modeled. Receivers were position an exit pupil 235. The contrast ratio was calculated as the average power of received at a bright square to the average power received at a dark square. For the partially collimated (5 degree HWHM) case, the contrast ratio was determined to be 747, while for the conventional case (35 degree HWHM), the contrast ratio was determined to be 100.

Example 3

The relative efficiency of optical system 1600 (depicted in FIG. 16A) and similar optical systems with backlight 1636 replaced with different backlight units were calculated. The relative efficiency of the optical system utilizing a backlight unit with a Lambertian output was defined to be unity. The relative efficiency of other optical systems was then defined as the ratio of the brightness at the exit pupil 1635 of the optical system to the brightness at the exit pupil 1635 of the optical system with the backlight unit having a Lambertian output. When the backlight unit included one Brightness Enhancement Film (BEF available from 3M Company, St. Paul, Minn.), the output from the backlight unit had a Full-Width and Half Maximum (FWHM) in a horizontal direction (width direction of the display) of 44 degrees and in a vertical direction (height direction of the display) of 80 degrees and the optical system had a relative efficiency of 1.4 (40 percent increase in brightness). When the backlight unit included two crossed BEFs, the output from the backlight unit had a FWHM of 44 degrees in both the horizontal and vertical directions and the optical system had a relative efficiency of 1.6 (60 percent increase in brightness). When the backlight unit included a structured surface 1667 adapted to provide a high degree of collimation in a direction normal to the display (in the minus z-direction), the output from the backlight unit had a FWHM of 16 degrees in the horizontal direction and 12 degrees in the vertical direction and the optical system had a relative efficiency of 2.4 (140 percent increase in brightness). When the backlight unit included a structured surface 1667 adapted to provide a high degree of collimation in directions turned towards the lens system 1619, the output from the backlight unit had a FWHM of 12 degrees in the horizontal direction and 11 degrees in the vertical direction and the optical system had a relative efficiency of 3 (200 percent increase in brightness). The results are summarized in the following table.

| Backlight Unit | FWHM-Horizontal (degrees) | FWHM-Vertical (degrees) | Relative Efficiency |
|---|---|---|---|
| Lambertian | 90 | 90 | 1 |
| BEF | 44 | 80 | 1.4 |
| Crossed BEF | 44 | 44 | 1.6 |
| Collimated | 16 | 12 | 2.4 |
| Collimated and angle optimized | 12 | 11 | 3 |

The following is a list of exemplary embodiments of the present description.

Embodiment 1 is a light emitting system comprising:
a pixelated light source comprising a plurality of discrete spaced apart pixels; and
a plurality of light redirecting elements, each light redirecting element corresponding to a different pixel in the plurality of pixels and receiving a first diverging light emitted by the pixel having a first cone angle and transmitting the received light as a second diverging light having a second cone angle greater than 15 degrees and less than the first cone angle.

Embodiment 2 is the light emitting system of Embodiment 1, wherein at least some of the light redirecting elements in the plurality of light redirecting elements are prismatic.

Embodiment 3 is the light emitting system of Embodiment 1, wherein a gap between adjacent pixels is less than 10 percent of a pixel width.

Embodiment 4 is the light emitting system of Embodiment 1, wherein a gap between adjacent pixels is less than 5 percent of a pixel width.

Embodiment 5 is the light emitting system of Embodiment 1, wherein a gap between adjacent pixels is less than 1 micrometer.

Embodiment 6 is the light emitting system of Embodiment 1, wherein a gap between adjacent pixels is in a range of 10 percent to 100 percent of a pixel width.

Embodiment 7 is the light emitting system of Embodiment 1, wherein a gap between adjacent pixels includes a light absorbing material.

Embodiment 8 is the light emitting system of Embodiment 1, wherein a gap between adjacent pixels is substantially light transmissive.

Embodiment 9 is the light emitting system of Embodiment 1, wherein the first cone angle is greater than 20 degrees.

Embodiment 10 is the light emitting system of Embodiment 1, wherein the first cone angle is greater than 30 degrees.

Embodiment 11 is the light emitting system of Embodiment 1, wherein a difference between the first cone angle and the second cone angle is at least 5 degrees.

Embodiment 12 is the light emitting system of Embodiment 1, wherein a difference between the first cone angle and the second cone angle is at least 10 degrees.

Embodiment 13 is the light emitting system of Embodiment 1, wherein at least some of the light redirecting elements in the plurality of light redirecting elements are lenses.

Embodiment 14 is the light emitting system of Embodiment 13, wherein each lens is centered on a lens axis, the lens axis of at least one lens being offset laterally relative to a center of a pixel corresponding to the lens.

Embodiment 15 is the light emitting system of Embodiment 1, wherein for at least one light redirecting element, the first diverging light has a first central light ray having a direction different from that of a second central light ray of the second diverging light.

Embodiment 16 is the light emitting system of Embodiment 1, wherein the pixelated light source is a liquid crystal display.

Embodiment 17 is the light emitting system of Embodiment 16, wherein the liquid crystal display comprises an at least partially collimating backlight.

Embodiment 18 is the light emitting system of Embodiment 17, wherein at least 50 percent of a lumen output of the at least partially collimating backlight is in a 50 degree full width cone.

Embodiment 19 is the light emitting system of Embodiment 17, wherein at least 50 percent of a lumen output of the at least partially collimating backlight is in a 40 degree full width cone.

Embodiment 20 is the light emitting system of Embodiment 17, wherein at least 50 percent of a lumen output of the at least partially collimating backlight is in a 30 degree full width cone.

Embodiment 21 is the light emitting system of Embodiment 17, wherein at least 50 percent of a lumen output of the at least partially collimating backlight is in a 25 degree full width cone.

Embodiment 22 is the light emitting system of Embodiment 1, wherein the pixelated light source is an organic light emitting diode display.

Embodiment 23 is the light emitting system of Embodiment 1, wherein the pixelated light source is substantially flat.

Embodiment 24 is the light emitting system of Embodiment 1, wherein the pixelated light source is curved.

Embodiment 25 is an optical system comprising the light emitting system of Embodiment 1 and an optical lens system adapted to receive light from the light emitting system and transmit at least a portion of the received light through an exit pupil.

Embodiment 26 is the optical system of Embodiment 25, wherein the optical lens system comprises a partial reflector facing the light emitting system and a reflective polarizer facing the exit pupil, the reflective polarizer adjacent to and spaced apart from the partial reflector, the partial reflector having an average optical reflectance of at least 30% in a desired plurality of wavelengths.

Embodiment 27 is the optical system of Embodiment 26, wherein the desired plurality of wavelengths comprises at least one continuous wavelength range.

Embodiment 28 is the optical system of Embodiment 27, wherein the at least one continuous wavelength range includes at least some infrared, visible or ultraviolet wavelengths.

Embodiment 29 is the optical system of Embodiment 27, wherein the at least one continuous wavelength range includes at least a portion of a wavelength range from 400 nm to 700 nm.

Embodiment 30 is the optical system of Embodiment 27, wherein the partial reflector is a notch reflector.

Embodiment 31 is the optical system of Embodiment 30, wherein the desired plurality of wavelengths comprises one or more continuous wavelength ranges, at least one of the continuous wavelength ranges having a full width at half maximum of no more than 100 nm.

Embodiment 32 is the optical system of Embodiment 26, further comprising a quarter-wave retarder disposed between the partial reflector and the reflective polarizer.

Embodiment 33 is the optical system of Embodiment 26, wherein at least one of the partial reflector and the reflective polarizer is curved about two orthogonal axes.

Embodiment 34 is the optical system of Embodiment 26, wherein the reflective polarizer is substantially flat.

Embodiment 35 is the optical system of Embodiment 26, wherein the reflective polarizer is curved about an axis.

Embodiment 36 is the optical system of Embodiment 26, wherein the reflective polarizer is curved about two orthogonal axes.

Embodiment 37 is the optical system of Embodiment 26, wherein the reflective polarizer is a thermoformed multilayer polymeric film curved about two orthogonal axes.

Embodiment 38 is the optical system of Embodiment 26, wherein the reflective polarizer is a pressure-formed multilayer polymeric film curved about two orthogonal axes.

Embodiment 39 is the optical system of Embodiment 26, wherein the reflective polarizer comprises a wire grid polarizer.

Embodiment 40 is the optical system of Embodiment 39, wherein the wire grid polarizer is curved about an axis.

Embodiment 41 is the optical system of Embodiment 39, wherein the wire grid polarizer is curved about two orthogonal axes.

Embodiment 42 is the optical system of Embodiment 25, wherein the optical lens system comprises one or more refractive lenses.

Embodiment 43 is the optical system of Embodiment 25, wherein a brightness of the optical system at the exit pupil is at least 30 percent higher than that of an otherwise equivalent optical system not including the plurality of light redirecting elements.

Embodiment 44 is the optical system of Embodiment 25, wherein a brightness of the optical system at the exit pupil is at least 100 percent higher than that of an otherwise equivalent optical system not including the plurality of light redirecting elements.

Embodiment 45 is the optical system of Embodiment 25, wherein a brightness of the optical system at the exit pupil is at least 200 percent higher than that of an otherwise equivalent optical system not including the plurality of light redirecting elements.

Embodiment 46 is a light emitting system comprising:
a pixelated light source comprising a plurality of groups of discrete spaced apart pixels; and
a concave light redirecting surface concave toward the light source, each different portion of the light redirecting surface corresponding to a different group of pixels in the plurality of pixels and receiving a first diverging light emitted by a pixel in the group of pixels having a first cone angle and transmitting the received light as a second diverging light having a second cone angle less than the first cone angle wherein no two different groups of pixels contain a common pixel.

Embodiment 47 is the light emitting system is Embodiment 46, wherein the concave light redirecting surface is concave about an axis.

Embodiment 48 is the light emitting system is Embodiment 46, wherein the concave light redirecting surface is concave about two orthogonal axes.

Embodiment 49 is the light emitting system of Embodiment 46, wherein each group of pixels is a single pixel.

Embodiment 50 is the light emitting system of Embodiment 46, wherein each group of pixels comprises a plurality of pixels.

Embodiment 51 is the light emitting system of Embodiment 46, wherein a difference between the first cone angle and the second cone angle is at least 5 degrees.

Embodiment 52 is the light emitting system of Embodiment 46, wherein a difference between the first cone angle and the second cone angle is at least 10 degrees.

Embodiment 53 is the light emitting system of Embodiment 46, wherein for at least one portion of the light redirecting surface, the first diverging light has a first central light ray having a direction different from that of a second central light ray of the second diverging light.

Embodiment 54 is the light emitting system of Embodiment 46, wherein the pixelated light source is a liquid crystal display.

Embodiment 55 is the light emitting system of Embodiment 54, wherein the liquid crystal display comprises an at least partially collimating backlight.

Embodiment 56 is the light emitting system of Embodiment 55, wherein at least 50 percent of a lumen output of the at least partially collimating backlight is in a 50 degree full width cone.

Embodiment 57 is the light emitting system of Embodiment 55, wherein at least 50 percent of a lumen output of the at least partially collimating backlight is in a 40 degree full width cone.

Embodiment 58 is the light emitting system of Embodiment 55, wherein at least 50 percent of a lumen output of the at least partially collimating backlight is in a 30 degree full width cone.

Embodiment 59 is the light emitting system of Embodiment 55, wherein at least 50 percent of a lumen output of the at least partially collimating backlight is in a 25 degree full width cone.

Embodiment 60 is the light emitting system of Embodiment 46, wherein the pixelated light source comprises a liquid crystal display panel, a backlight, a first polarizer disposed between the concave light redirecting surface and the liquid crystal display panel, and a second polarizer disposed between the liquid crystal display panel and the backlight.

Embodiment 61 is the light emitting system of Embodiment 46, wherein the pixelated light source comprises a liquid crystal display panel, a backlight, a first polarizer disposed on the concave light redirecting surface, and a second polarizer disposed between the liquid crystal display panel and the backlight.

Embodiment 62 is the light emitting system of Embodiment 46, wherein the pixelated light source is an organic light emitting diode display.

Embodiment 63 is an optical system comprising the light emitting system of Embodiment 46 and an optical lens system adapted to receive light from the light emitting system and transmit at least a portion of the received light through an exit pupil.

Embodiment 64 is the optical system of Embodiment 63, wherein the optical lens system comprises a partial reflector facing the light emitting system and a reflective polarizer facing the exit pupil, the reflective polarizer adjacent to and spaced apart from the partial reflector, the partial reflector having an average optical reflectance of at least 30% in a desired plurality of wavelengths.

Embodiment 65 is the optical system of Embodiment 64, wherein the reflective polarizer is curved about two orthogonal axes.

Embodiment 66 is the optical system of Embodiment 64, wherein the reflective polarizer is a polymeric multilayer reflective polarizer.

Embodiment 67 is the optical system of Embodiment 64, wherein the reflective polarizer is a wire-grid polarizer.

Embodiment 68 is the optical system of Embodiment 63, wherein the optical lens system comprises one or more refractive lenses.

Embodiment 69 is a display system comprising:
a pixelated display emitting a first image and comprising a plurality of discrete spaced apart pixels; and
a plurality of light redirecting elements disposed in front of the plurality of the pixels, each light redirecting element corresponding to a different group of pixels in the plurality of pixels, each group of pixels comprising at least one pixel, the plurality of light redirecting elements forming a virtual second image of the first image behind the plurality of pixels.

Embodiment 70 is a display system comprising:
a pixelated display comprising a plurality of discrete spaced apart pixels; and
a plurality of light redirecting elements disposed in front of the plurality of pixels, each light redirecting element corresponding to a different group of pixels in the plurality of pixels and forming a virtual image of the pixel behind the pixel, each group of pixels comprising at least one pixel.

Embodiment 71 is the display system of Embodiment 70, wherein the pixelated display emits a first image and the plurality of light redirecting elements form a virtual second image of the first image behind the plurality of pixels.

Embodiment 72 is the display system of any of Embodiments 69 to 71, wherein the pixelated display is a liquid crystal display.

Embodiment 73 is the display system of Embodiment 72, wherein the liquid crystal display comprises an at least partially collimating backlight.

Embodiment 74 is the display system of any of Embodiments 69 to 71, wherein the pixelated display is substantially planar.

Embodiment 75 is the display system of any of Embodiments 69 to 71, wherein the pixelated display comprises a plurality of substantially planar portions not all disposed in a same plane.

Embodiment 76 is the display system of any of Embodiments 69 to 71, wherein the pixelated display is curved.

Embodiment 77 is the display system of any of Embodiments 69 to 71, wherein the pixelated light source is an organic light emitting diode display.

Embodiment 78 is the display system of any of Embodiments 69 to 71, wherein each light redirecting element is configured to receive a first cone of light emitted by a pixel corresponding to the light redirecting element, the first cone of light having a first central ray directed along a first direction, the light redirecting element transmitting the received light as a second cone of light having a second central ray along a second direction, wherein for at least some of the light redirecting elements, the second direction is different than the first direction.

Embodiment 79 is the display system of Embodiment 78, wherein for a majority of the light redirecting elements, the second direction is different than the first direction.

Embodiment 80 is the display system of any of Embodiments 69 to 71, wherein each group of pixels is a single pixel.

Embodiment 81 is the display system of any of Embodiments 69 to 71, wherein each group of pixels comprises a plurality of pixels.

Embodiment 82 is the display system of any of Embodiments 69 to 71, wherein no two different groups of pixels contain a common pixel.

Embodiment 83 is the display system of any of Embodiments 69 to 71, further comprising an optical lens system adapted to receive light from the pixelated display and transmit at least a portion of the received light through an exit pupil.

Embodiment 84 is the display system of Embodiment 83, wherein the optical lens system comprises a partial reflector facing the light emitting system and a reflective polarizer facing the exit pupil, the reflective polarizer adjacent to and spaced apart from the partial reflector, the partial reflector having an average optical reflectance of at least 30% in a desired plurality of wavelengths.

Embodiment 85 is the display system of Embodiment 84, further comprising a quarter-wave retarder disposed between the partial reflector and the reflective polarizer.

Embodiment 86 is the display system of Embodiment 84, wherein at least one of the partial reflector and the reflective polarizer is curved about two orthogonal axes.

Embodiment 87 is the display system of Embodiment 84, wherein the reflective polarizer is a thermoformed multi-layer polymeric film curved about two orthogonal axes.

Embodiment 88 is the display system of Embodiment 84, wherein the reflective polarizer is a pressure-formed multi-layer polymeric film curved about two orthogonal axes.

Embodiment 89 is the display system of Embodiment 83, wherein the optical lens system comprises one or more refractive lenses.

Embodiment 90 is the display system of Embodiment 83, wherein a brightness of the display system at the exit pupil is at least 30 percent higher than that of an otherwise equivalent display system not including the plurality of light redirecting elements.

Embodiment 91 is the display system of Embodiment 83, wherein a brightness of the display system at the exit pupil is at least 100 percent higher than that of an otherwise equivalent display system not including the plurality of light redirecting elements.

Embodiment 92 is the display system of Embodiment 83, wherein a brightness of the display system at the exit pupil is at least 200 percent higher than that of an otherwise equivalent display system not including the plurality of light redirecting elements.

Embodiment 93 is an imaging system comprising:
a pixelated light source comprising a plurality of discrete spaced apart pixels, each pixel emitting a cone of light centered on a cone axis;
a plurality of lenses, each lens centered on a lens axis and corresponding to a different pixel in the plurality of pixels, the lens axis of each lens being parallel to the cone axis of the light emitted by the pixel corresponding to the lens, the lens axis of at least one lens being offset relative to the cone axis of the light emitted by the pixel corresponding to the at least one lens, at least two lenses in the plurality of lenses forming images of the corresponding pixels at different distances from the at least two lenses.

Embodiment 94 is an imaging system comprising:
a pixelated light source comprising a plurality of discrete spaced apart pixels, each pixel emitting a cone of light centered on a cone axis;
a plurality of lenses, each lens corresponding to a different pixel in the plurality of pixels, at least two lenses in the plurality of lenses forming images of the corresponding pixels at different distances from the at least two lenses.

Embodiment 95 is the imaging system of Embodiment 94, wherein each lens is centered on a lens axis, the lens axis of each lens being parallel to the cone axis of the light emitted by the pixel corresponding to the lens, the lens axis of at least one lens being laterally offset relative to the cone axis of the light emitted by the pixel corresponding to the at least one lens.

Embodiment 96 is the imaging system of any of Embodiments 93 to 95, wherein the images of the corresponding pixels are virtual images.

Embodiment 97 is the imaging system of any of Embodiments 93 to 95, wherein the images of the corresponding pixels are real images.

Embodiment 98 is the imaging system of any of Embodiments 93 to 95, wherein each lens in the plurality of lenses form an image of the corresponding pixel in an image surface.

Embodiment 99 is the imaging system of Embodiment 98, wherein an exit pupil of the imaging system defines an aperture having a first size, and wherein the image surface has a second size different from the first size.

Embodiment 100 is the imaging system of Embodiment 98, wherein the image surface is not parallel to a surface comprising the plurality of pixels.

Embodiment 101 is the imaging system of Embodiment 98, wherein the image surface is substantially parallel to a surface comprising the plurality of pixels.

Embodiment 102 is the imaging system of Embodiment 98, wherein a surface comprising the plurality of pixels is substantially planar and the image surface is substantially non-planar.

Embodiment 103 is the imaging system of any of Embodiments 93 to 95, wherein each lens is configured to receive a first diverging light emitted by the pixel corresponding to the lens, the first diverging light having a first cone angle, the lens transmitting the received light as a second diverging light having a second cone angle greater than 15 degrees and less than the first cone angle.

Embodiment 104 is the imaging system of any of Embodiments 93 to 95, wherein each lens is configured to receive a first cone of light emitted by the pixel corresponding to the lens, the first cone of light having a first central ray directed along a first direction, the lens transmitting the received light as a second cone of light having a second central ray along a second direction, wherein for at least some of the lenses, the second direction is different than the first direction.

Embodiment 105 is the imaging system of any of Embodiments 93 to 95, wherein the pixelated light source is a liquid crystal display.

Embodiment 106 is the imaging system of Embodiment 105, wherein the liquid crystal display comprises an at least partially collimating backlight.

Embodiment 107 is the imaging system of any of Embodiments 93 to 95, wherein the pixelated light source is an organic light emitting diode display.

Embodiment 108 is the imaging system of any of Embodiments 93 to 95, further comprising an optical lens system adapted to receive light from the pixelated light source and transmit at least a portion of the received light through an exit pupil.

Embodiment 109 is the imaging system of Embodiment 108, wherein an optical lens system comprises a partial reflector facing the light emitting system and a reflective polarizer facing the exit pupil, the reflective polarizer adjacent to and spaced apart from the partial reflector, the partial reflector having an average optical reflectance of at least 30% in a desired plurality of wavelengths.

Embodiment 110 is the imaging system of Embodiment 109, further comprising a quarter-wave retarder disposed between the partial reflector and the reflective polarizer.

Embodiment 111 is the imaging system of Embodiment 109, wherein at least one of the partial reflector and the reflective polarizer is curved about two orthogonal axes.

Embodiment 112 is the imaging system of Embodiment 109, wherein the reflective polarizer is a thermoformed multi-layer polymeric film curved about two orthogonal axes.

Embodiment 113 is the imaging system of Embodiment 109, wherein the reflective polarizer is a pressure-formed multi-layer polymeric film curved about two orthogonal axes.

Embodiment 114 is the imaging system of Embodiment 108, wherein the optical lens system comprises one or more refractive lenses.

Embodiment 115 is the imaging system of Embodiment 108, wherein a brightness of the imaging system at the exit pupil is at least 30 percent higher than that of an otherwise equivalent imaging system not including the plurality of lenses.

Embodiment 116 is the imaging system of Embodiment 108, wherein a brightness of the imaging system at the exit pupil is at least 100 percent higher than that of an otherwise equivalent imaging system not including the plurality of lenses.

Embodiment 117 is the imaging system of Embodiment 108, wherein a brightness of the imaging system at the exit pupil is at least 200 percent higher than that of an otherwise equivalent imaging system not including the plurality of lenses.

Embodiment 118 is an optical system comprising:
a pixelated surface comprising a plurality of discrete spaced apart pixels; and
a plurality of lenses, each lens corresponding to a different pixel in the plurality of pixels, each lens in the plurality of lenses forming an image of the corresponding pixel in an image surface not parallel to the pixelated surface.

Embodiment 119 is the optical system of Embodiment 118, wherein the pixelated surface is substantially planar.

Embodiment 120 is the optical system of Embodiment 118, wherein the pixelated surface comprises a plurality of substantially planar portions not all disposed in a same plane.

Embodiment 121 is the optical system of Embodiment 118, wherein the pixelated surface is curved about at least one axis.

Embodiment 122 is the optical system of Embodiment 118, wherein the pixelated surface is substantially planar and the image surface is substantially non-planar.

Embodiment 123 is the optical system of Embodiment 118, wherein each image is a virtual image.

Embodiment 124 is the optical system of Embodiment 118, wherein each image is a real image.

Embodiment 125 is the optical system of Embodiment 118, wherein each lens is configured to receive a first diverging light emitted by the pixel corresponding to the lens, the first diverging light having a first cone angle, the lens transmitting the received light as a second diverging light having a second cone angle greater than 15 degrees and less than the first cone angle.

Embodiment 126 is the optical system of Embodiment 118, wherein each lens is configured to receive a first cone of light emitted by the pixel corresponding to the lens, the first cone of light having a first central ray directed along a first direction, the lens transmitting the received light as a second cone of light having a second central ray along a second direction, wherein for at least some of the lenses, the second direction is different than the first direction.

Embodiment 127 is the optical system of Embodiment 126, wherein for at least one of the lenses, an angle between the first and second directions is at least 5 degrees.

Embodiment 128 is the optical system of Embodiment 127, wherein the angle is at least 10 degrees.

Embodiment 129 is the optical system of Embodiment 118, wherein a liquid crystal display comprises the pixelated surface.

Embodiment 130 is the optical system of Embodiment 129, wherein the liquid crystal display comprises an at least partially collimating backlight.

Embodiment 131 is the optical system of Embodiment 118, wherein an organic light emitting diode display comprises the pixelated surface.

Embodiment 132 is the optical system of Embodiment 118, further comprising an optical lens system adapted to receive light from the pixelated surface and transmit at least a portion of the received light through an exit pupil.

Embodiment 133 is the optical system of Embodiment 132, wherein the optical lens system comprises a partial reflector facing the pixelated surface and a reflective polarizer facing the exit pupil, the reflective polarizer adjacent to and spaced apart from the partial reflector, the partial reflector having an average optical reflectance of at least 30% in a desired plurality of wavelengths.

Embodiment 134 is the optical system of Embodiment 133, further comprising a quarter-wave retarder disposed between the partial reflector and the reflective polarizer.

Embodiment 135 is the optical system of Embodiment 133, wherein at least one of the partial reflector and the reflective polarizer is curved about two orthogonal axes.

Embodiment 136 is the optical system of Embodiment 133, wherein the reflective polarizer is a thermoformed multi-layer polymeric film curved about two orthogonal axes.

Embodiment 137 is the optical system of Embodiment 133, wherein the reflective polarizer is a pressure-formed multi-layer polymeric film curved about two orthogonal axes.

Embodiment 138 is the optical system of Embodiment 132, wherein a brightness of the optical system at the exit pupil is at least 30 percent higher than that of an otherwise equivalent optical system not including the plurality of lenses.

Embodiment 139 is the optical system of Embodiment 132, wherein a brightness of the optical system at the exit pupil is at least 100 percent higher than that of an otherwise equivalent optical system not including the plurality of lenses.

Embodiment 140 is the optical system of Embodiment 132, wherein a brightness of the optical system at the exit pupil is at least 200 percent higher than that of an otherwise equivalent optical system not including the plurality of lenses.

Embodiment 141 is the optical system of Embodiment 132, wherein the optical lens system comprises one or more refractive lenses.

Embodiment 142 is an optical system, comprising:
a pixelated display surface comprising a plurality of discrete spaced apart pixels;
an optical stack comprising:
a light redirecting layer adjacent the display surface and comprising at least one light redirecting element, each light redirecting element corresponding to a different group of pixels in the plurality of pixels, each group of pixels comprising at least one pixel;
a partial reflector having an average optical reflectance of at least 30% in a desired plurality of wavelengths; and
a reflective polarizer substantially transmitting light having a first polarization state and substantially reflecting light having an orthogonal second polarization state.

Embodiment 143 is the optical system of Embodiment 142, wherein the pixelated display surface is substantially planar.

Embodiment 144 is the optical system of Embodiment 142, wherein the pixelated display surface comprises a plurality of substantially planar portions not all disposed in a same plane.

Embodiment 145 is the optical system of Embodiment 142, wherein the pixelated display surface is curved about at least one axis.

Embodiment 146 is the optical system of Embodiment 142, wherein each light redirecting element is configured to receive a first cone of light from a pixel in the corresponding group of pixels, the first cone of light having a first central ray along a first direction, the light redirecting element transmitting the received first cone of light as a second cone of light, the second cone of light having a second central ray along a second direction, wherein for at least one light redirecting element, the second direction is different than the first direction.

Embodiment 147 is the optical system of Embodiment 146, wherein for at least one light redirecting element an angle between the first and second directions is at least 5 degrees.

Embodiment 148 is the optical system of Embodiment 146, wherein the angle is at least 10 degrees.

Embodiment 149 is the optical system of Embodiment 146, wherein the first cone of light has a first cone angle and wherein for at least one light redirecting element an angle between the first and second directions is at least 10 percent of the first cone angle.

Embodiment 150 is the optical system of Embodiment 142, each light redirecting element is configured to receive a first diverging light having a first cone angle from a pixel in the corresponding group of pixels and transmit the received light as a second diverging light having a second cone angle greater than 15 degrees and less than the first cone angle.

Embodiment 151 is the optical system of Embodiment 142, wherein the optical stack further comprises a quarter-wave retarder disposed between the partial reflector and the reflective polarizer.

Embodiment 152 is the optical system of Embodiment 142, wherein the reflective polarizer is curved about two orthogonal axes.

Embodiment 153 is the optical system of Embodiment 152, wherein the reflective polarizer comprises a thermoformed multilayer polymeric film.

Embodiment 154 is the optical system of Embodiment 152, wherein the reflective polarizer comprises a pressure-formed multilayer polymeric film.

Embodiment 155 is the optical system of Embodiment 142, wherein a brightness of the optical system at an exit pupil of the optical system is at least 30 percent higher than that of an otherwise equivalent optical system not including the light redirecting layer.

Embodiment 156 is the optical system of Embodiment 142, wherein a brightness of the optical system at an exit pupil of the optical system is at least 100 percent higher than that of an otherwise equivalent optical system not including the light redirecting layer.

Embodiment 157 is the optical system of Embodiment 142, wherein a brightness of the optical system at an exit pupil of the optical system is at least 200 percent higher than that of an otherwise equivalent optical system not including the light redirecting layer.

Embodiment 158 is a display system comprising:
a pixelated system comprising a plurality of pixels;
an optical lens system comprising a partial reflector having an average optical reflectance of at least 30% in a desired plurality of wavelengths, the optical lens system adapted to receive light from the pixelated system and transmit light through an exit pupil,
wherein for each pixel in the plurality of pixels, the pixelated system is adapted to emit a cone of light centered on a cone axis, the cone axis making a cone axis angle to an axis normal to the pixel, the cone axis angle for at least some pixels different than the cone axis angle for at least some other pixels.

Embodiment 159 is the display system of Embodiment 158, wherein the pixelated system comprises a pixelated light source and a light redirecting layer.

Embodiment 160 is the display system of Embodiment 158, wherein the pixelated system comprise a liquid crystal display panel and a backlight.

Embodiment 161 is the display system of Embodiment 160, wherein the backlight is an at least partially collimating backlight.

Embodiment 162 is the display system of Embodiment 161, wherein the pixelated system further comprises a light redirecting layer.

Embodiment 163 is the light emitting system of Embodiment 161, wherein at least 50 percent of a lumen output of the at least partially collimating backlight is in a 50 degree full width cone.

Embodiment 164 is the light emitting system of Embodiment 161, wherein at least 50 percent of a lumen output of the at least partially collimating backlight is in a 40 degree full width cone.

Embodiment 165 is the light emitting system of Embodiment 161, wherein at least 50 percent of a lumen output of the at least partially collimating backlight is in a 30 degree full width cone.

Embodiment 166 is the light emitting system of Embodiment 161, wherein at least 50 percent of a lumen output of the at least partially collimating backlight is in a 25 degree full width cone.

Embodiment 167 is the display system of Embodiment 161, wherein a first portion of the backlight is configured to emit light at least partially collimated in a first direction and a different second portion of the backlight is configured to emit light at least partially collimated in a second different direction.

Embodiment 168 is the display system of Embodiment 161, further comprising a light redirecting layer adjacent the display panel opposite the backlight.

Embodiment 169 is the display system of Embodiment 159, wherein the pixelated light source comprises an organic light emitting diode display panel.

Embodiment 170 is the display system of Embodiment 159, wherein the optical lens system further comprises a reflective polarizer adjacent to and spaced apart from the partial reflector.

Embodiment 171 is the display system of Embodiment 170, wherein the optical lens system further comprises a quarter-wave retarder disposed between the partial reflector and the reflective polarizer.

Embodiment 172 is the display system of Embodiment 159, wherein the optical lens system further comprises a first optical lens, the partial reflector being disposed on a major surface of the first optical lens.

Embodiment 173 is the display system of Embodiment 172, wherein the optical lens system further comprises a second optical lens adjacent to and spaced apart from the first optical lens.

Embodiment 174 is the display system of Embodiment 173, wherein a reflective polarizer is disposed on a major surface of the second optical lens.

Embodiment 175 is the display system of Embodiment 174, wherein a quarter-wave retarder is disposed on the reflective polarizer.

Embodiment 176 is a display system, comprising:
a pixelated display comprising a plurality of discrete spaced apart pixels;
an optical lens system having an acceptance angle and comprising:
   a partial reflector having an average optical reflectance of at least 30% in a desired plurality of wavelengths; and
   a reflective polarizer substantially transmitting light having a first polarization state and substantially reflecting light having an orthogonal second polarization state; and
a light redirecting layer disposed between the pixelated display and the optical lens system, wherein a total luminous energy emitted by the pixelated display that is within the acceptance angle of the optical lens system is at least 30 percent higher than that of an otherwise equivalent display system not including the light redirecting layer.

Embodiment 177 is the display system of Embodiment 176, wherein the total luminous energy emitted by the pixelated display that is within the acceptance angle of the optical lens system is at least 100 percent higher than that of the otherwise equivalent display system.

Embodiment 178 is the display system of Embodiment 176, wherein the total luminous energy emitted by the pixelated display that is within the acceptance angle of the optical lens system is at least 200 percent higher than that of the otherwise equivalent display system.

Embodiment 179 is the display system of Embodiment 176, wherein the optical lens system further comprises a quarter-wave retarder disposed between the partial reflector and the reflective polarizer.

Embodiment 180 is the display system of Embodiment 176, wherein the reflective polarizer is curved about two orthogonal axes.

Embodiment 181 is the display system of Embodiment 180, wherein the reflective polarizer comprises a multilayer polymeric film.

Embodiment 182 is the display system of Embodiment 181, wherein the multilayer polymeric film is formed into a shape curved about two orthogonal axes via thermoforming or pressure forming.

Embodiment 183 is the display system of Embodiment 176, wherein the optical lens system includes at least one optical lens, the at least one optical lens comprising a plurality of major surfaces, the partial reflector being disposed on one of the major surfaces, the reflective polarizer being disposed on a different major surface.

Embodiment 184 is the display system of Embodiment 176, wherein the pixelated display is substantially planar.

Embodiment 185 is the display system of Embodiment 176, wherein the pixelated display comprises a plurality of substantially planar portions not all disposed in a same plane.

Embodiment 186 is the display system of Embodiment 176, wherein the pixelated display comprises a display surface curved about at least one axis.

Embodiment 187 is a display system, comprising:
a pixelated display comprising a plurality of discrete spaced apart pixels;
an optical lens system comprising:
   a partial reflector having an average optical reflectance of at least 30% in a desired plurality of wavelengths; and
   a reflective polarizer substantially transmitting light having a first polarization state and substantially reflecting light having an orthogonal second polarization state;
a light redirecting layer disposed between the pixelated display and the optical lens system; and an exit pupil,
wherein a brightness of the display system at the exit pupil is at least 30 percent higher than that of an otherwise equivalent display system not including the light redirecting layer.

Embodiment 188 is the display system of Embodiment 187, wherein the brightness of the display system at the exit pupil is at least 100 percent higher than that of the otherwise equivalent display system.

Embodiment 189 is the display system of Embodiment 187, wherein the brightness of the display system at the exit pupil is at least 200 percent higher than that of the otherwise equivalent display system.

Embodiment 190 is the display system of Embodiment 187, wherein the optical lens system further comprises a quarter-wave retarder disposed between the partial reflector and the reflective polarizer.

Embodiment 191 is the display system of Embodiment 187, wherein the reflective polarizer is curved about two orthogonal axes.

Embodiment 192 is the display system of Embodiment 191, wherein the reflective polarizer comprises a thermoformed multilayer polymeric film.

Embodiment 193 is the display system of Embodiment 187, wherein the optical lens system includes at least one optical lens, the at least one optical lens comprising a plurality of major surfaces, the partial reflector being disposed on one of the major surfaces, the reflective polarizer being disposed on a different major surface.

Embodiment 194 is the display system of Embodiment 187, wherein the pixelated display is substantially planar.

Embodiment 195 is the display system of Embodiment 187, wherein the pixelated display comprises a plurality of substantially planar display panels not all disposed in a same plane.

Embodiment 196 is the display system of Embodiment 187, wherein the pixelated display comprises a display surface curved about at least one axis.

Embodiment 197 is an optical system comprising:
an optical lens system having an optical axis and comprising:
   a partial reflector having an average optical reflectance of at least 30% in a desired plurality of wavelengths; and
   a reflective polarizer substantially transmitting light having a first polarization state and substantially reflecting light having an orthogonal second polarization state;
a plurality of light redirecting elements, each light redirecting element adapted to receive a first cone of light having a central ray and transmit the received light as a second cone of light towards the optical lens system,
wherein at least some of the light redirecting elements are adapted to bend the central ray toward or away from the optical axis.

Embodiment 198 is the optical system of Embodiment 197, wherein at least some of the light redirecting elements are adapted to bend the central ray toward the optical axis.

Embodiment 199 is the optical system of Embodiment 197, wherein at least some of the light redirecting elements are adapted to bend the central ray away from the optical axis.

Embodiment 200 is the optical system of Embodiment 197, wherein the first cone of light comprises a chief ray which passes through a center of an exit pupil of the optical system and wherein at least some of the light redirecting elements are adapted to reduce an angle between the central ray and the chief ray.

Embodiment 201 is the optical system of Embodiment 197, wherein a brightness of the optical system at an exit pupil of the optical system is at least 30 percent higher than that of an otherwise equivalent optical system not including the light redirecting elements.

Embodiment 202 is the optical system of Embodiment 201, wherein the brightness of the optical system at the exit pupil is at least 100 percent higher than that of the otherwise equivalent optical system.

Embodiment 203 is the optical system of Embodiment 201, wherein the brightness of the optical system at the exit pupil is at least 200 percent higher than that of the otherwise equivalent optical system.

Embodiment 204 is the optical system of Embodiment 197, wherein the optical lens system further comprises a quarter-wave retarder disposed between the partial reflector and the reflective polarizer.

Embodiment 205 is the optical system of Embodiment 197, wherein the reflective polarizer is curved about two orthogonal axes.

Embodiment 206 is the optical system of Embodiment 205, wherein the reflective polarizer comprises a thermoformed multilayer polymeric film.

Embodiment 207 is the optical system of Embodiment 197, wherein the optical lens system includes at least one optical lens, the at least one optical lens comprising a plurality of major surfaces, the partial reflector being disposed on one of the major surfaces, the reflective polarizer being disposed on a different major surface.

Embodiment 208 is the optical system of Embodiment 197, wherein the plurality of light redirecting elements are disposed along a surface.

Embodiment 209 is the optical system of Embodiment 208, wherein the surface is substantially curved.

Embodiment 210 is the optical system of Embodiment 208, wherein the surface is substantially planar.

Embodiment 211 is the optical system of Embodiment 208, wherein the optical axis intersects the surface at an oblique angle.

Embodiment 212 is the optical system of Embodiment 208, wherein the surface is substantially parallel to a surface of a display panel.

Embodiment 213 is the optical system of Embodiment 197, wherein the pixelated display is substantially planar.

Embodiment 214 is the optical system of Embodiment 197, wherein the pixelated display comprises a plurality of substantially planar display panels not all disposed in a same plane.

Embodiment 215 is the optical system of Embodiment 197, wherein the pixelated display comprises a display surface curved about at least one axis.

Embodiment 216 is a lens system comprising:
a partial reflector having an average optical reflectance of at least 30% in a desired plurality of wavelengths;
a reflective polarizer adjacent to and spaced apart from the partial reflector, the reflective polarizer substantially transmitting light having a first polarization state and substantially reflecting light having an orthogonal second polarization state; and
a first optical lens having an outer major surface, the outer major surface comprising a plurality of light redirecting elements, each light redirecting element adapted to receive a first cone of light and transmit the received light as a second cone of light towards the partial reflector.

Embodiment 217 is the lens system of Embodiment 216, wherein the second cone of light has a divergence angle that differs from that of the first cone of light.

Embodiment 218 is the lens system of Embodiment 216, wherein the second cone of light has a central ray direction that differs from that of the first cone of light.

Embodiment 219 is the lens system of Embodiment 216, wherein the second cone of light has a divergence angle and a central ray direction that differs from those of the first cone of light.

Embodiment 220 is the lens system of Embodiment 216, further comprising a second optical lens, the reflective polarizer being disposed on a major surface of the second optical lens.

Embodiment 221 is the lens system of Embodiment 220, wherein a quarter-wave retarder is disposed on the reflective polarizer.

Embodiment 222 is the lens system of Embodiment 220, wherein a quarter-wave retarder is disposed between the second optical lens and the partial reflector.

Embodiment 223 is the lens system of Embodiment 216, wherein a quarter-wave retarder is disposed between reflective polarizer and the partial reflector.

Embodiment 224 is the lens system of Embodiment 216, wherein the reflective polarizer is curved about two orthogonal axes.

Embodiment 225 is the lens system of Embodiment 224, wherein the reflective polarizer comprises a multilayer polymeric film.

Embodiment 226 is the lens system of Embodiment 216, wherein the first optical lens has an inner major surface opposite the outer major surface, the partial reflector being disposed on the inner major surface.

Embodiment 227 is a display system comprising:
the lens system of Embodiment 216;
a pixelated system comprising a plurality of groups of pixels, each group of pixels comprising at least one pixel;
an exit pupil;
each light redirecting element corresponding to a different group of pixels in the plurality of groups of pixels, each pixel emitting a cone of light having a chief light ray passing through a center of the exit pupil and a central light ray, wherein for at least one pixel, the light redirecting element corresponding to the pixel reduces an angle between the central light ray and the chief light ray emitted by the pixel.

Embodiment 228 is the display system of Embodiment 227, wherein a brightness of the display system at the exit pupil is at least 30 percent higher than that of an otherwise equivalent display system not including the light redirecting elements.

Embodiment 229 is the display system of Embodiment 228, wherein the brightness of the display system at the exit pupil is at least 100 percent higher than that of the otherwise equivalent display system.

Embodiment 230 is the display system of Embodiment 228, wherein the brightness of the display system at the exit pupil is at least 200 percent higher than that of the otherwise equivalent display system.

Embodiment 231 is the display system of Embodiment 209, wherein the pixelated system comprises a liquid crystal display panel.

Embodiment 232 is the display system of Embodiment 231, further comprising a backlight configured to provide light to the liquid crystal display panel, wherein a first portion of the backlight is configured to emit light at least partially collimated in a first direction and a different second portion of the backlight is configured to emit light at least partially collimated in a second different direction.

Embodiment 233 is the display system of Embodiment 227, wherein the pixelated system comprises a substantially planar display panel.

Embodiment 234 is the display system of Embodiment 227, wherein the pixelated system comprises a plurality of substantially planar display panels not all disposed in a same plane.

Embodiment 235 is the display system of Embodiment 227, wherein the pixelated system comprises a display panel curved about at least one axis.

Embodiment 236 is a display system comprising:
a pixelated system comprising a plurality of groups of pixels, each group of pixels comprising at least one pixel;
a plurality of light redirecting elements, each light redirecting element corresponding to a different group of pixels in the plurality of groups of pixels; and
an exit pupil;
each pixel emitting a cone of light having a chief light ray passing through a center of the exit pupil and a central light ray, wherein for at least one pixel, the light redirecting element corresponding to the pixel reduces an angle between the central light ray and the chief light ray emitted by the pixel.

Embodiment 237 is the display system of Embodiment 236 centered on an optical axis, wherein for each pixel not positioned on the optical axis, the light redirecting element corresponding to the pixel reduces an angle between the central light ray and the chief light ray emitted by the pixel.

Embodiment 238 is the display system of Embodiment 236, wherein the chief light rays of the cones of light emitted by at least two pixels are not parallel to one another.

Embodiment 239 is the display system of Embodiment 236, wherein the chief light rays of the cones of light emitted by all the pixels are parallel to one another.

Embodiment 240 is the display system of Embodiment 236, wherein a brightness of the display system at the exit pupil is at least 30 percent higher than that of an otherwise equivalent display system not including the light redirecting elements.

Embodiment 241 is the display system of Embodiment 240, wherein the brightness of the display system at the exit pupil is at least 100 percent higher than that of the otherwise equivalent display system.

Embodiment 242 is the display system of Embodiment 240, wherein the brightness of the display system at the exit pupil is at least 200 percent higher than that of the otherwise equivalent display system.

Embodiment 243 is the display system of Embodiment 236, further comprising a partial reflector disposed between the plurality of light redirecting elements and the exit pupil, the partial reflector having an average optical reflectance of at least 30% in a desired plurality of wavelengths.

Embodiment 244 is the display system of Embodiment 243, further comprising a reflective polarizer disposed between the partial reflector and the exit pupil.

Embodiment 245 is the display system of Embodiment 244, wherein the reflective polarizer is curved about two orthogonal axes.

Embodiment 246 is the display system of Embodiment 245, wherein the reflective polarizer comprises a thermoformed multilayer polymeric film.

Embodiment 247 is the display system of Embodiment 244, further comprising a quarter-wave retarder disposed between the reflective polarizer and the partial reflector.

Embodiment 248 is the display system of Embodiment 236, wherein the pixelated system comprises a substantially planar display panel.

Embodiment 249 is the display system of Embodiment 236, wherein the pixelated system comprises a plurality of substantially planar display panels not all disposed in a same plane.

Embodiment 250 is the display system of Embodiment 236, wherein the pixelated system comprises a display panel curved about at least one axis.

Embodiment 251 is a display system comprising a plurality of light emitting pixels, each light emitting pixel comprising:
an optically transparent first light redirecting element having an average optical transmittance of at least 50% in a desired plurality of wavelengths;
an optically reflecting concave second light redirecting element concave toward the first light redirecting element and having an average optical reflectance of at least 50% in the desired plurality of wavelengths; and
a light emitting material disposed between the first and second light redirecting elements, wherein a center of the second light redirecting element lies within the light emitting material.

Embodiment 252 is the display system of Embodiment 251, wherein at least some visible light emitted by the light emitting material is reflected from the second light redirecting element and is transmitted through the first light redirecting element as an at least partially collimated light.

Embodiment 253 is the display system of Embodiment 252, wherein at least half of the at least partially collimated light is within a 30 degree cone angle.

Embodiment 254 is the display system of Embodiment 252, wherein at least half of the at least partially collimated light is within a 25 degree cone angle.

Embodiment 255 is the display system of Embodiment 252, wherein at least half of the at least partially collimated light is within a 20 degree cone angle.

Embodiment 256 is the display system of Embodiment 252, wherein at least 75 percent of the at least partially collimated is within a 20 degree cone angle.

Embodiment 257 is a display system comprising a plurality of light emitting pixels, each light emitting pixel comprising:
an optically transparent first light redirecting element having an average optical transmittance of at least 50% in a desired plurality of wavelengths;
an optically reflecting concave second light redirecting element concave toward the first light redirecting element and having an average optical reflectance of at least 50% in the desired plurality of wavelengths; and
a light emitting material disposed between the first and second light redirecting elements, wherein light emitted by the light emitting material is substantially collimated by the first and second light redirecting elements.

Embodiment 258 is the display system of Embodiment 257, wherein a center of the second light redirecting element lies within the light emitting material.

Embodiment 259 is the display system of any of Embodiments 251 to 258, wherein an at least partially transparent organic light emitting display panel comprises the plurality of light emitting pixels.

Embodiment 260 is the display system of any of Embodiments 251 to 258, further comprising an optical lens system adapted to receive light from the light emitting pixels and transmit at least a portion of the received light through an exit pupil of the display system.

Embodiment 261 is the display system of Embodiment 260, wherein the optical lens system comprises a partial reflector having an average optical transmittance of at least 30% in the desired plurality of wavelengths.

Embodiment 262 is the display system of Embodiment 261, further comprising a reflective polarizer disposed between the partial reflector and the exit pupil.

Embodiment 263 is the display system of Embodiment 262, wherein the reflective polarizer is curved about two orthogonal axes.

Embodiment 264 is the display system of Embodiment 263, wherein the reflective polarizer comprises a thermoformed polymeric multilayer film.

Embodiment 265 is the display system of Embodiment 262, wherein the optical lens system includes at least one optical lens, the at least one optical lens comprising a plurality of major surfaces, the partial reflector being disposed on one of the major surfaces, the reflective polarizer being disposed on a different major surface.

Embodiment 266 is a display system comprising:
a plurality of light emitting pixels, each light emitting pixel comprising:
    a light emitting material; and
    an optically reflecting concave first light redirecting element concave toward the light emitting material and having an average optical reflectance of at least 50% in a desired plurality of wavelengths; and
an optical lens system disposed to receive light reflected by each of the first light redirecting element, the received light being substantially collimated, the optical lens system comprising a partial reflector having an average optical reflectance of at least 30% in the desired plurality of wavelengths, and a reflective polarizer disposed adjacent to and spaced apart from partial reflector.

Embodiment 267 is the display system of Embodiment 266, wherein each light emitting pixel further comprises an optically transparent second light redirecting element having an average optical transmittance of at least 50% in the desired plurality of wavelengths, the second light redirecting element disposed adjacent the light emitting material opposite the first light redirecting element.

Embodiment 268 is the display system of Embodiment 266, wherein the reflective polarizer is curved about two orthogonal axes.

Embodiment 269 is the display system of Embodiment 268, wherein the reflective polarizer comprises a thermoformed polymeric multilayer film.

Embodiment 270 is the display system of Embodiment 266, wherein the optical lens system includes at least one optical lens, the at least one optical lens comprising a plurality of major surfaces, the partial reflector being disposed on one of the major surfaces, the reflective polarizer being disposed on a different major surface.

Embodiment 271 is the display system of Embodiment 266, wherein the optical lens system further comprises a quarter-wave retarder disposed between the partial reflector and the reflective polarizer.

Embodiment 272 is the display system of any of Embodiments 251 to 271, wherein an at least partially transparent organic light emitting diode display panel comprises the light emitting material.

Embodiment 273 is the display system of any of Embodiments 251, 257 or 266, wherein a substantially planar panel comprises the plurality of light emitting pixels.

Embodiment 274 is the display system of any of Embodiments 251, 257 or 266, wherein a plurality of substantially planar panels not all disposed in a same plane comprises the plurality of light emitting pixels.

Embodiment 275 is the display system of any of Embodiments 251, 257 or 266, wherein a panel curved about at least one axis comprises plurality of light emitting pixels.

Embodiment 276 is an imaging system comprising:
a pixelated light source comprising a plurality of pixels, each pixel emitting a first cone of light centered on a first cone axis; and
a plurality of lenses, each lens corresponding to and aligned with a different pixel in the plurality of pixels, each lens adapted to receive the first cone of light from the corresponding pixel and transmit the received first cone of light as a second cone of light centered on a second cone axis, wherein for at least one pixel, the first and second cone axes are not parallel.

Embodiment 277 is the imaging system of Embodiment 276, wherein at least one lens is asymmetric about the first cone axis.

Embodiment 278 is the imaging system of Embodiment 276, wherein the plurality of pixels are disposed along a pixelated surface and at least one lens has a first side that extends further from the pixelated surface along a normal to the pixelated surface than a second side of the lens.

Embodiment 279 is the imaging system of Embodiment 278, wherein each lens in the at least one lens has a curved surface connecting the first and second sides.

Embodiment 280 is the imaging system of Embodiment 279, wherein the curved surface is rotationally symmetric about an axis not parallel to the first cone axis.

Embodiment 281 is the imaging system of Embodiment 276, wherein the plurality of pixels are disposed along a pixelated surface and each lens in a majority of the lenses has a first side that extends further from the pixelated surface along a normal to the pixelated surface than a second side of the lens.

Embodiment 282 is the imaging system of Embodiment 276, wherein for at least one pixel, an angle between the first and second cone axes is at least 5 degrees.

Embodiment 283 is the imaging system of Embodiment 276, wherein for at least one pixel, an angle between the first and second cone axes is at least 10 degrees.

Embodiment 284 is the imaging system of Embodiment 276, wherein for a first pixel in the plurality of pixels, a first angle between the first and second cone axes is greater than 5 degrees, and for a different second pixel in the plurality of pixels, a second angle between the first and second cone axes is greater than 5 degrees and is different from the first angle.

Embodiment 285 is the imaging system of Embodiment 276, wherein for a majority of the pixels in the plurality of pixels, the first and second cone axes are not parallel.

Embodiment 286 is the imaging system of Embodiment 276, wherein for a majority of the pixels in the plurality of pixels, an angle between the first and second cone axes is at least 5 degrees.

Embodiment 287 is the imaging system of Embodiment 276, wherein for a majority of the pixels in the plurality of pixels, an angle between the first and second cone axes is at least 10 degrees.

Embodiment 288 is the display system of Embodiment 276, wherein a substantially planar panel comprises the plurality of pixels.

Embodiment 289 is the display system of Embodiment 276, wherein a plurality of substantially planar panels not all disposed in a same plane comprises the plurality of pixels.

Embodiment 290 is the display system of Embodiment 276, wherein a panel curved about at least one axis comprises plurality of pixels.

Related display systems are described in the following U.S. patent application which is hereby incorporated herein by reference in its entirety: DISPLAY SYSTEM AND LIGHT GUIDE, Ser. No. 62/347,652 filed on Jun. 9, 2016.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system comprising:
a light emitting system comprising:
a pixelated light source comprising a plurality of discrete spaced apart pixels; and
a plurality of light redirecting elements, each light redirecting element corresponding to a different pixel in the plurality of pixels and receiving a first diverging light emitted by the pixel having a first cone angle and transmitting the received light as a second diverging light having a second cone angle greater than 15 degrees and less than the first cone angle; and
an optical lens system adapted to receive light from the light emitting system and transmit at least a portion of the received light, the optical lens system comprising a partial reflector facing the light emitting system and a reflective polarizer facing away from the light emitting system, the reflective polarizer being adjacent to and spaced apart from the partial reflector, the partial reflector having an average optical reflectance of at least 30% in a desired plurality of wavelengths.

2. The optical system of claim 1, wherein for at least one light redirecting element, the first diverging light has a first central light ray having a direction different from that of a second central light ray of the second diverging light.

3. The optical system of claim 1, wherein the pixelated light source is a liquid crystal display comprising an at least partially collimating backlight, and wherein at least 50 percent of a lumen output of the at least partially collimating backlight is in a 50 degree full width cone.

4. The optical system of claim 1, wherein a brightness of the optical system at an exit pupil of the optical system is at least 30 percent higher than that of an otherwise equivalent optical system not including the plurality of light redirecting elements.

5. The optical system of claim 1, wherein a difference between the first cone angle and the second cone angle is at least 10 degrees.

6. The optical system of claim 1, wherein at least some of the light redirecting elements in the plurality of light redirecting elements are prismatic.

7. The optical system of claim 1, wherein at least some of the light redirecting elements in the plurality of light redirecting elements are lenses.

8. The optical system of claim 7, wherein each lens is centered on a lens axis, the lens axis of at least one lens being offset laterally relative to a center of a pixel corresponding to the lens.

9. An optical system comprising:
a light emitting system comprising:
a pixelated light source comprising a plurality of groups of discrete spaced apart pixels; and
a concave light redirecting surface concave toward the light source, each different portion of the light redirecting surface corresponding to a different group of pixels in the plurality of pixels and receiving a first diverging light emitted by a pixel in the group of pixels having a first cone angle and transmitting the received light as a second diverging light having a second cone angle less than the first cone angle wherein no two different groups of pixels contain a common pixel; and
an optical lens system adapted to receive light from the light emitting system and transmit at least a portion of the received light, the optical lens system comprising a partial reflector facing the light emitting system and a reflective polarizer facing away from the light emitting system, the reflective polarizer being adjacent to and spaced apart from the partial reflector, the partial reflector having an average optical reflectance of at least 30% in a desired plurality of wavelengths.

10. The optical system of claim 9, wherein a difference between the first cone angle and the second cone angle is at least 5 degrees.

11. The optical system of claim 9, wherein for at least one portion of the light redirecting surface, the first diverging light has a first central light ray having a direction different from that of a second central light ray of the second diverging light.

12. An optical system comprising:
a display system comprising:
a pixelated display comprising a plurality of discrete spaced apart pixels; and
a plurality of light redirecting elements disposed in front of the plurality of pixels, each light redirecting element corresponding to a different group of pixels in the plurality of pixels and forming a virtual image of the pixel behind the pixel, each group of pixels comprising at least one pixel; and
an optical lens system adapted to receive light from the display system and transmit at least a portion of the received light, the optical lens system comprising a partial reflector facing the display system and a reflective polarizer facing away from the display system, the reflective polarizer adjacent to and spaced apart from the partial reflector, the partial reflector having an average optical reflectance of at least 30% in a desired plurality of wavelengths.

13. The optical system of claim 12, wherein the pixelated display emits a first image and the plurality of light redirecting elements form a virtual second image of the first image behind the plurality of pixels.

14. The optical system of claim 12, wherein the plurality of light redirecting elements comprises a plurality of lenses, each lens corresponding to a different pixel in the plurality of pixels.

15. The optical system of claim 14, wherein each lens is centered on a lens axis, the lens axis of each lens being parallel to a cone axis of the light emitted by the pixel corresponding to the lens, the lens axis of at least one lens being laterally offset relative to the cone axis of the light emitted by the pixel corresponding to the at least one lens.

16. The optical system of claim 12, wherein each light redirecting element is configured to receive a first cone of light emitted by a pixel corresponding to the light redirecting element, the first cone of light having a first central ray directed along a first direction, the light redirecting element transmitting the received light as a second cone of light having a second central ray along a second direction, wherein for at least some of the light redirecting elements, the second direction is different than the first direction.

17. The optical system of claim 12, wherein a brightness of the optical system at an exit pupil of the optical system is at least 30 percent higher than that of an otherwise equivalent optical system not including the plurality of light redirecting elements.

18. A display system, comprising:
- a pixelated display comprising a plurality of discrete spaced apart pixels;
- an optical lens system adapted to receive light from the pixelated display and comprising:
  - a partial reflector having an average optical reflectance of at least 30% in a desired plurality of wavelengths; and
  - a reflective polarizer substantially transmitting light having a first polarization state and substantially reflecting light having an orthogonal second polarization state;
- a light redirecting layer disposed between the pixelated display and the optical lens system; and an exit pupil, wherein a brightness of the display system at the exit pupil is at least 30 percent higher than that of an otherwise equivalent display system not including the light redirecting layer.

19. The display system of claim 18, wherein the light redirecting layer comprises a plurality of light redirecting elements, each light redirecting element corresponding to a different pixel in the plurality of discrete spaced apart pixels and receiving a first diverging light emitted by the pixel having a first cone angle and transmitting the received light as a second diverging light having a second cone angle greater than 15 degrees and less than the first cone angle.

20. The display system of claim 19, wherein for at least one light redirecting element, the first diverging light has a first central light ray having a direction different from that of a second central light ray of the second diverging light.

21. The display system of claim 18, wherein each pixel in the plurality of discrete spaced apart pixels emits a cone of light having a central light ray and a chief light ray passing through a center of the exit pupil, wherein for at least one pixel, the light redirecting layer reduces an angle between the central light ray and the chief light ray.

* * * * *

UNITED STATES PATENT AND TRADEMARK OFFICE
CERTIFICATE OF CORRECTION

PATENT NO. : 10,663,745 B2
APPLICATION NO. : 15/671272
DATED : May 26, 2020
INVENTOR(S) : Ouderkirk et al.

Page 1 of 1

It is certified that error appears in the above-identified patent and that said Letters Patent is hereby corrected as shown below:

In the Specification

Column 29
Line 46, Delete "10," and insert -- $10^{-5}$, --, therefor.

Signed and Sealed this
Twenty-seventh Day of October, 2020

Andrei Iancu
*Director of the United States Patent and Trademark Office*